(12) United States Patent
Kumar et al.

(10) Patent No.: US 11,745,146 B2
(45) Date of Patent: Sep. 5, 2023

(54) METHOD FOR BIOLOGICAL OR BIOMIMETIC CHANNEL-BASED MEMBRANE FABRICATIONS USING LAYER-BY-LAYER STRUCTURE

(71) Applicant: THE PENN STATE RESEARCH FOUNDATION, University Park, PA (US)

(72) Inventors: Manish Kumar, State College, PA (US); Yue-Xiao Shen, Berkeley, CA (US); Woochul Song, State College, PA (US); Tingwei Ren, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 12 days.

(21) Appl. No.: 17/448,607

(22) Filed: Sep. 23, 2021

(65) Prior Publication Data
US 2022/0080364 A1 Mar. 17, 2022

Related U.S. Application Data

(63) Continuation of application No. 16/414,330, filed on May 16, 2019, now Pat. No. 11,154,822.
(Continued)

(51) Int. Cl.
*B01D 69/12* (2006.01)
*B01D 67/00* (2006.01)
(Continued)

(52) U.S. Cl.
CPC ......... *B01D 69/12* (2013.01); *B01D 67/0006* (2013.01); *B01D 67/0093* (2013.01); *B01D 69/02* (2013.01); *B01D 69/105* (2013.01); *B01D 69/125* (2013.01); *B01D 69/1216* (2022.08); *B01D 69/144* (2013.01); *B01D 71/60* (2013.01); *B01D 71/80* (2013.01); *B01D 71/82* (2013.01); *B01D 2323/30* (2013.01);
(Continued)

(58) Field of Classification Search
CPC ...... B01D 69/02; B01D 69/105; B01D 69/12; B01D 69/125; B01D 69/144; B01D 71/60; B01D 71/80; B01D 71/82; B01D 67/0006; B01D 67/0093; B01D 2323/30; B01D 2323/345; B01D 2325/14; B01D 2325/15; B01D 69/1216
See application file for complete search history.

(56) References Cited

U.S. PATENT DOCUMENTS

2009/0007555 A1 1/2009 Jensen
2014/0051785 A1 2/2014 Kumar et al.
(Continued)

OTHER PUBLICATIONS

Mecke et al., "Soft Matter", vol. 2, pp. 751-759, 2006.
(Continued)

*Primary Examiner* — John Kim
(74) *Attorney, Agent, or Firm* — McKee, Voorhees & Sease, PLC

(57) ABSTRACT

The present disclosure describes membrane compositions and methods for preparing membrane compositions. In particular, the methods employ a layer-by-layer approach to membrane preparation. The membrane compositions provide significantly enhanced membrane performance over existing commercial membranes, particularly in terms of permeability and selectivity.

10 Claims, 28 Drawing Sheets

Related U.S. Application Data

(60) Provisional application No. 62/672,351, filed on May 16, 2018.

(51) Int. Cl.

| | |
|---|---|
| *B01D 71/82* | (2006.01) |
| *B01D 69/10* | (2006.01) |
| *B01D 69/14* | (2006.01) |
| *B01D 71/60* | (2006.01) |
| *B01D 71/80* | (2006.01) |
| *B01D 69/02* | (2006.01) |

(52) U.S. Cl.
CPC .... *B01D 2323/345* (2013.01); *B01D 2325/14* (2013.01); *B01D 2325/16* (2013.01)

(56) References Cited

U.S. PATENT DOCUMENTS

| | | |
|---|---|---|
| 2018/0071692 A1 | 3/2018 | Nair et al. |
| 2018/0117538 A1 | 5/2018 | Bruening et al. |
| 2020/0188864 A1 | 6/2020 | Spulber et al. |

OTHER PUBLICATIONS

Hu et al., "Single-Molecular Artificial Transmembrane Water Channels", J. Am. Chem. Soc., vol. 134, pp. 8384-8387, May 10, 2012.
Huang et al., "Graphene oxide nanosheet: an emerging star material for novel separation membranes", J Mater. Chem., vol. 2, pp. 13772-13782, Jun. 13, 2014.
Humphrey et al., "VMD: Visual Molecular Dynamics", Journal of Molecular Graphics, vol. 14, pp. 33-38, 1996.
Itel et al., "Dynamics of Membrane Proteins within Synthetic Polymer Membranes with Large Hydrophobic Mismatch", Nano Lett., vol. 15, pp. 3871-3878, May 27, 2015.
Jap et al., 2D crystallization: from art to science, Ultramicroscopy, vol. 46, pp. 45-84, Jul. 1992.
Jin et al., "Highly stable and self-repairing membrane-mimetic 2D nanomaterials assembled from lipid-like peptoids", Nature Communications, 8 pages, Jul. 12, 2016.
Kale et al., "NAMD2: Greater Scalability for Parallel Molecular Dynamics", Journal of Computational Physics, vol. 151, pp. 283-312, 1999.
Kaucher et al., "Selective Transport of Water Mediated by Porous Dendritic Dipeptides", J. Am. Chem. Soc., vol. 129, pp. 11698-11699, Aug. 12, 2007.
Kelewou et al., "Salts retention by nanofiltration membranes: Physicochemical and hydrodynamic approaches and modeling", Desalination, vol. 277, pp. 106-112, Apr. 3, 2011.
Kim et al., "CHARMM-GUI Ligand Reader and Modeler for CHARMM Force Field Generation of Small Molecules", Journal of Computational Chemistry, vol. 38, pp. 1879-1886, 2017.
Kita-Tokarczyk et al., "Block copolymer vesicles—using concepts from polymer chemistry to mimic biomembranes", Polymer, vol. 46, pp. 3540-3563, Feb. 14, 2005.
Klara et al., "Magnetically Directed Two-Dimensional Crystallization of OmpF Membrane Proteins in Block Copolymers", J. Am. Chem. Soc., vol. 138, pp. 28-31, 2016.
Kleffel et al., "Secondary structure of a channel-forming protein: porin from *E. coli* outer membranes", The EMBO Journal, vol. 4, No. 6, pp. 1589-1592, 1985.
Kocsis et al., "Artificial water channels—deconvolution of natural Aquaporins through synthetic design", Clean Water, 11 pages, Apr. 12, 2018.
Kowal et al., "Planar Biomimetic Membranes Based on Amphiphilic Block Copolymers", ACS Macro Lett., vol. 3, pp. 59-63, Dec. 27, 2014.
Krieg et al., "Salt rejection in nanofiltration for single and binary salt mixtures in view of sulphate removal", Desalination, vol. 171, pp. 205-215, May 5, 2004.
Kumar et al., "Highly permeable polymeric membranes based on the incorporation of the functional water channel protein Aquaporin Z", PNAS, vol. 104, No. 52, pp. 20719-20724, Dec. 26, 2007.
Kumar et al., High-Density Reconstitution of Functional Water Channels into Vesicular and Planar Block Copolymer Membranes, J Am. Chem. Soc., vol. 134, pp. 18631-18637, Oct. 22, 2012.
Lang et al., "Creating cross-linked lamellar block copolymer supporting layers for biomimetic membranes", Faraday Discuss., vol. 209, pp. 179-191, Feb. 26, 2018.
Latimer et al., "Light Scattering at Various Angles: Theoretical Predications of the Effects of Particle Volume Changes", Biophysical Journal, vol. 12, pp. 764-773, 1972.
Lee, A.G., "Lipid-protein interactions in biological membranes: a structural perspective", Biochimica et Biophysica Acta, vol. 1612, pp. 1-40, Feb. 14, 2003.
Licsandru et al., "Salt-Excluding Artificial Water Channels Exhibiting Enhanced Dipolar Water and Proton Translocation", J. Am. Chem. Soc., vol. 138, pp. 5403-5409, Apr. 10, 2016.
Liu et al., "Two-Dimensional-Material Membranes: A New Family of High-Performance Separation Membranes", Angew. Chem. Int. Ed., vol. 55, pp. 13384-13397, 2016.
Luo et al., "Separation of phenolic acids from monosaccharides by low-pressure nanofiltration integrated with laccase pre-treatments", Journal of Membrane Science, vol. 482, pp. 83-91, Feb. 14, 2015.
Maccallum et al., "Distribution of Amino Acids in a Lipid Bilayer from Computer Simulations", Biophysical Journal, vol. 94, pp. 3393-3404, May 2008.
Mackerell et al., "All-Atom Empirical Potential for Molecular Modeling and Dynamics Studies of Proteins", J. Phys. Chem., vol. 102, pp. 3586-3616, Feb. 6, 1998.
Mai et al., "Self-assembly of block copolymers", Chem. Soc. Rev., vol. 41, pp. 5969-5985, Apr. 2, 2012.
Manzo et al., "Enhanced Amphiphilic Profile of a Short β-Stranded Peptide Improves its Antimicrobial Activity", PLOS One, 19 pages, Jan. 24, 2015.
Mehta et al., "Permeability and selectivity analysis for ultrafiltration membranes", Journal of Membrane Science, vol. 249, pp. 245-249, 2005.
Mi, Baoxia, "Graphene Oxide Membranes for Ionic and Molecular Sieving", Science, vol. 343, 4 pages, Feb. 14, 2014.
Mo et al., "Cation-dependent structural instability of graphene oxide membranes and its effect on membrane separation performance", Desalination, vol. 399, pp. 40-46, Aug. 7, 2016.
Mohammad et al., "Redesign of a Plugged β-Barrel Membrane Protein", The Journal of Biological Chemical, vol. 286, No. 10, pp. 8000-8013, Mar. 11, 2011.
Mohammad et al., "Fabrication of Vertically Aligned CNT Composite for Membrane Applications Using Chemical Vapor Deposition through In Situ Polymerization", Journal of Nanomaterials, vol. 2013, Article ID 713583, 5 pages, Jun. 23, 2013.
Moon et al., "Side-chain hydrophobicity scale derived from transmembrane protein folding into lipid bilayers", PNAS, vol. 108, No. 25, pp. 10174-10177, Jun. 21, 2011.
Niedzwiecki et al., "Inspection of the Engineered FhuA ΔC/Δ4L Protein Nanopore by Polymer Exclusion", Biophysical Journal, vol. 103, pp. 2115-2124, Nov. 2012.
Nikaido, H., "Porins and specific channels of bacterial outer membranes", Molecular Microbiology, vol. 6(4), pp. 435-442, 1992.
Nikaido et al., "Transport Proteins in Bacteria: Common Themes in Their Design", Science, vol. 258, No. 5084, pp. 936-942, Nov. 6, 1992.
Palivan et al., "Bioinspired polymer vesicles and membranes for biological and medical applications", Chem. Soc. Rev., vol. 45, pp. 377-411, 2016.
Panganiban et al., "Random heteropolymers preserve protein function in foreign environments", Science, vol. 359, pp. 1239-1243, Mar. 16, 2018.
Park et al., "Maximizing the right stuff: The trade-off between membrane permeability and selectivity", Science, vol. 356, 12 pages, Jun. 16, 2017.
Peinemann et al., "Asymmetric superstructure formed in a block copolymer via phase separation", Nature Materials, vol. 6, pp. 992-996, Dec. 2007.

(56) References Cited

OTHER PUBLICATIONS

Peng et al., "Metal-organic framework nanosheets as building blocks for molecular sieving membranes", Science, vol. 346, Issue 6215, 5 pages, Dec. 12, 2014.
Plakas et al., "A study of selected herbicides retention by nanofiltration membranes—The role of organic fouling", Journal of Membrane Science, vol. 284, pp. 291-300, Jul. 27, 2006.
Rajesh et al., Mixed Mosaic Membranes Prepared by Layer-by-Layer Assembly for Ionic Separations, vol. 8, No. 12, pp. 12338-12345, Dec. 3, 2014.
Rakhmatullina et al., "Solid-Supported Block Copolymer Membranes through Interfacial Adsorption of Charged Block Copolymer Vesicles", Langmuir, vol. 24, pp. 6254-6261, Mar. 25, 2008.
Rathee et al., "A coarse-grained thermodynamic model for the predictive engineering of valence-selective membranes". Mol. Syst. Des. Eng., vol. 1, pp. 301-312, Jul. 28, 2016.
Ren et al., "Membrane Protein Insertion into and Compatibility with Biomimetic Membranes", Adv. Biosys., vol. 1, 10 pages, 2017.
Robeson, Lloyd, "The upper bound revisited", Journal of Membrane Science, vol. 320, pp. 390-400, Apr. 14, 2008.
Robeson, Lloyd, "Correlation of separation factor versus permeability for polymeric membranes", Journal of Membrane Science, vol. 62, pp. 165-185, Feb. 13, 1991.
Barden et al., "Parameterization and atomistic simulations of biomimetic membranes", Faraday Discuss., vol. 209, pp. 161-178, Apr. 13, 2018.
Belegrinou et al., "Biomimetic supported membranes from amphiphilic block copolymers", Soft Matter, vol. 6, pp. 179-186, 2010.
Bellona et al., "The role of membrane surface charge and solute physico-chemical properties in the rejection of organic acids by NF membranes", Journal of Membrane Science, vol. 249, pp. 227-234, 2005.
Bermudez et al., "Molecular Weight Dependence of Polymersome Membrane Structure, Elasticity, and Stability", Macromolecules, vol. 35, pp. 8203-8208, Jul. 26, 2002.
Bezrukov et al., "Dynamics and Free Energy of Polymers Partitioning into a Nanoscale Pore", Macromolecules, vol. 29, pp. 8517-8522, Sep. 20, 1996.
Bhakdi et al., "Alpha-Toxin in *Staphylococcus aureus*", Microbiological Reviews, vol. 55, No. 4, pp. 733-751, Dec. 1991.
Bhakdi et al., "Correlation Between Toxin Binding and Hemolytic Activity in Membrane Damage by *Staphylococcal* α-Toxin", Infection and Immunity, pp. 318-323, Nov. 1984.
Biyani et al. "Focus: The interface between data collection and data processing in cryo-EM", Journal of Structural Biology, vol. 198, pp. 124-133, Mar. 20, 2017.
Blanazs et al., "Self-Assembled Block Copolymer Aggregates: From Micelles to Vesicles and their Biological Applications", Macromol. Rapid Commun., vol. 30, pp. 267-277, 2009.
Boussu et al., "Characterization of commercial nanofiltration membranes and comparison with self-made polyethersulfone membranes", Desalination, vol. 191, pp. 245-253, 2006.
Boussu et al., "Characterization of polymeric nanofiltration membranes for systematic analysis of membrane performance", Journal of Membrane Science, vol. 278, pp. 418-427, 2006.
Bowie, James, "Solving the membrane protein folding problem", Nature, vol. 438, pp. 581-589, Dec. 1, 2005.
Braeken et al., "Transport mechanisms of dissolved organic compounds in aqueous solutions during nanofiltration", Journal of Membrane Science, vol. 279, pp. 331-319 2006.
Bulheller et al., "DichroCalc—circular and linear dichroism online", Bioinformatics, vol. 25, No. 4, pp. 539-540, Jan. 5, 2009.
Caus et al., "The use of integrated countercurrent nanofiltration cascades for advanced separations", J Chem Technol Biotechnol., vol. 84, pp. 391-398, 2009.
Cerritelli et al., "PEG-SS-PPS: Reduction-Sensitive Disulfide Block Copolymer Vesicles for Intracellular Drug Delivery", Biomacromolecules, vol. 8, pp. 1966-1972, Apr. 3, 2007.
Chowdhury et al., "PoreDesigner for tuning solute selectivity in a robust and highly permeable outer membrane pore" Nature Communicaitons, 11 pages, 2018.
Cornelis et al., "Nanaofiltration of Nonionic Surfactants: Effect of the Molecular Weight Cutoff and Contact Angle on Flux Behavior", Ind. Eng. Chem. Res., vol. 44, pp. 7652-7658, 2005.
Cowan et al., "Crystal structures explain functional properties of two *E. coli* porins", Nature, vol. 358, pp. 727-733, Aug. 27, 1992.
De Groot et al., "Water Permeation Across Biological Membranes: Mechanism and Dynamics of Aquaporin-1 and GlpF", Science, vol. 294, pp. 2353-2357, Dec. 14, 2001.
Dean III et al., "Modeling healthy male white matter and myelin development: 3 through 60 months of age", NeuroImage, vol. 84, pp. 742-752, 2014.
Discher et al., "Polymer Vesicles", Science, vol. 297, No. 5583, pp. 967-973 Aug. 9, 2002.
Dolder et al., "The micelle to vesicle transition of lipids and detergents in the presence of a membrane protein: towards a rationale of 2D crystallization", FEBS Letters, vol. 382, pp. 203-208, Feb. 5, 1996.
Dorset et al., "Two-dimensional Crystal Packing of Matrix Porin, A Channel Forming Protein in *Escherichia coli* Outer Membranes", J. Mol. Biol., vol. 165, pp. 701-710, 1983.
Duong et al., Planar biomimetic aquaporin-incorporated triblock copolymer membranes on porous alumina supports for nanofiltration, Journal of Membrane Science, vol. 409-410, pp. 34-43, Mar. 1, 2012.
Efremov et al., "Structure of *Escherichia coli* OmpF porin from lipidic mesophase", Journal of Structural Biology, vol. 178, pp. 311-318, Mar. 20, 2012.
Feroz et al., "Concentrating Membrane Proteins Using Ultrafiltration Without Concentrating Detergents", Biotechnology and Bioengineering, vol. 113, No. 10, pp. 2122-2130 Oct. 2016.
Ferro et al., "Organic solvent extraction as a versatile procedure to identify hydrophobic chloroplast membrane proteins", Electrophoresis, vol. 21, pp. 3517-3526, 2000.
Fornasiero et al., "Ion exclusion by sub-2-nm carbon nanotube pores", PNAS, vol. 105, No. 45, pp. 17250-17255, Nov. 11, 2008.
Freeman, Benny, "Basis of Permeability/Selectivity Tradeoff relations in Polymeric Gas Separation Membranes", Macromolecules, vol. 32, pp. 375-380, 1999.
Fujioka et al., "Nanofiltration of trace organic chemicals: A comparison between ceramic and polymeric membranes", Separation and Purification Technology, vol. 136, pp. 258-264, Aug. 30, 2014.
Garner et al., "Modification of the Optoelectronic Properties of Membranes via Insertion of Amphiphilic Phenylenevinylene Oligoelectrolytes", J. Am. Chem. Soc., vol. 132, pp. 10042-10052, Feb. 24, 2010.
Ge et al., "Vertically-aligned carbon nanotube membranes for hydrogen separation", RSC Advances, vol. 2, pp. 5329-5336, Mar. 27, 2012.
Geise et al., "Water permeability and water/salt selectivity tradeoff in polymers for desalination", Journal of Membrane Science, vol. 369, pp. 130-138, 2011.
Geng et al., "Stochastic transport through carbon nanotubes in lipid bilayers and live cell membranes", Nature, vol. 514, 17 pages, Oct. 30, 2014.
Gessmann et al., "Improving the Resistance of a Eukaryotic β-Barrel Protein to Thermal and Chemical Perturbations", J. Mol. Biol., vol. 413, pp. 150-161, Jul. 23, 2011.
Gouaux et al., "Subunit stoichiometry of *Staphylococcal* α-hemolysin in crystals and on membranes: A heptameric transmembrane pore", Proc. Natl. Acad. Sci. USA, vol. 91, pp. 12828-12831, Dec. 1994.
Grzelakowski et al., "A framework for accurate evaluation of the promise of aquaporin based biomimetic membranes", Journal of Membrane Science, vol. 479, pp. 223-231, Jan. 10, 2015.
Grzelakowski et al., "Terminal groups control self-assembly of amphiphilic block copolymers in solution", Nanoscale, vol. 8, pp. 6674-6683, Feb. 23, 2016.
Habel et al., "Selecting analytical tools for characterization of polymersomes in aqueous solution", RSC Advances 5, pp. 79924-79946, 2015.

(56) References Cited

OTHER PUBLICATIONS

Hasler et al., "2D Crystallization of Membrane Proteins: Rationales and Examples", Journal of Structural Biology, vol. 121, pp. 162-171, Jan. 5, 1998.
Helix-Nielsen, Claus, "Biomimetic Membranes as a Technology Platform: Challenges and Opportunties", Membranes, vol. 8, No. 44, 16 pages, Jul. 17, 2018.
Hinds et al., "Aligned Multiwalled Carbon Nanotube Membranes", Science, vol. 303, pp. 62-65, Jan. 2, 2004.
Holt et al., "Fast Mass Transport Through Sub-2-Nanometer Carbon Nanotubes", Science, vol. 312, No. 5776, pp. 1034-1037 May 19, 2006.
Holt et al., "Fabrication of a Carbon Nanotube-Embedded Silicon Nitride Membrane for Studies of Nanometer-Scale Mass Transport", Nanoletters, 20 pages, Aug. 27, 2004.
Hu et al., "Enabling Graphene Oxide Nanosheets as Water Separation Membranes", Environ. Sci. Technol., vol. 47, pp. 3715-3723, Mar. 14, 2013.
Rohani et al., "A refined one-filtration method for aqueous based nanofiltration and ultrafiltration membrane molecular weight cut-off determination using polyethylene glycols", Journal of Membrane Science, vol. 382, pp. 278-290, Aug. 10, 2011.
Saboe et al., "Role of Pore-Lining Residues in Defining the Rate of Water Conduction by Aquaporin-0", Biophysical Journal, vol. 112, pp. 953-965, Mar. 14, 2017.
Schlesinger et al., "Evaluation of alkali resistant nanofiltration membranes for the separation of hemicellulose from concentraled alkaline process liquors", vol. 192, pp. 303-314, 2006.
Schneider et al., "Columnar Self-Assemblies of Triarylamines as Scaffolds for Artificial Biomimetic Channels for Ion and for Water Transport", J. Am. Chem. Soc., vol. 139, pp. 3721-3727, Feb. 16, 2017.
Shen et al., "Highly permeable artificial water channels that can self-assemble into two-dimensional arrays", PNAS, vol. 112, No. 32, pp. 9810-9815, Aug. 11, 2015.
Shen et al., "Biomimetic membranes: A review", Journal of Membrane Science, vol. 454, pp. 359-381, 2014.
Signorell et al., "Controlled 2D crystallization of membrane proteins using methyl-β-cyclodextrin", Journal of Structural Biology, vol. 157, pp. 321-328, 2007.
Song et al., "Hierarchical Optimization of High-Performance Biomimetic and Bioinspired Membranes", Langmuir, vol. 35, pp. 589-607, 2019.
Song et al., Design Considerations for Artificial Water Channel-Based Membranes, Annu. Rev. Mater. Res., vol. 48, pp. 57-82, Mar. 23, 2018.
Tamm et al., "Structure and Assembly of β-Barrel Membrane Proteins", The Journal of Biological Chemistry, vol. 276, No. 35 pp. 32399-32402, Issue of Aug. 31, 2001.
Tang et al., "Desalination by biomimetic aquaporin membranes: Review of status and prospects", Desalination, vol. 308, pp. 34-40, 2013.
Tang et al., "Tubular ceramic-based multilayer separation membranes using spray layer-by-layer assembly", Polym. Chem., vol. 4, pp. 5621-5628, Jul. 8, 2013.
Thebo et al., "Highly stable graphene-oxide-based membranes with superior permeability", Nature Communications, 9 pages, 2018.
Tunuguntla et al., "Enhanced water permeability and tunable ion selectivity in subnanometer carbon nanotube porins", Science, vol. 357, pp. 792-796, Aug. 25, 2017.
Wang et al., "Layer-by-Layer Assembly of Aquaporin Z-Incorporated Biomimetic Membranes for Water Purification", Environ. Sci. Technol., vol. 49, pp. 3761-3768, Mar. 2, 2015.
Werber et al., "Materials for next-generation desalination and water purification membranes", Nature Reviews, 16 pages, Apr. 5, 2016.
White et al., "Membrane Protein Folding and Stability: Physical Principles", Annu. Rev. Biophys. Biomol. Struct., vol. 28, pp. 319-365 1999.
Wimley, William, "The versatile β-barrel membrane protein", Current Opinion in Structural Biology, vol. 13, pp. 404-411, 2003.
Won et al., "Cryogenic Transmission Electron Microscopy (Cryo-TEM) of Micelles and Vesicles Formed in Water by Poly(ethylene oxide)-Based Block Copolymers", J. Phys. Chem., vol. 106, pp. 3354-3364, Jan. 3, 2002.
Wong et al., "Single molecule measurements of channel proteins incorporated into biomimetic polymer membranes", Nanotechnology, vol. 17, pp. 3710-3717, Jun. 12, 2006.
Xu et al., "Subnanometer Porous Thin Films by the Co-assembly of Nanotube Subunits and Block Copolymers", ACS Nano, vol. 5, No. 2, pp. 1376-1384, 2011.
Xu et al., "A wide range and high resolution one-filtration molecular weight cut-off method for aqueous based nanofiltration and ultrafiltration membranes", Journal of Membranes Science, vol. 525, pp. 304-311 2017.
Xue et al., "Pillararenes, A New Class of Macrocycles for Supramolecular Chemistry", Accounts of Chemical Research, vol. 45, No. 8, pp. 1294-1308, 2012.
Zeidel et al., "Reconstitution of Functional Water Channels in Liposomes Containing Purified Red Cell CHIP28 Protein", Biochemistry, vol. 31, pp. 7436-7440, Jun. 16, 1992.
Zhang et al., "Vesicular perylene dye nanocapsules as supramolecular flourescent pH sensor systems", Nature Chemistry, vol. 1, pp. 623-629, Nov. 2008.
Zhao et al., "Selective anion exchange with nanogated isoreticular positive metal-organic frameworks", Nature Communications, 10 pages, Aug. 16, 2013.
Zhou et al., "Self-assembling subnanometer pores with unusual mass-transport properties", Nature Communications, 9 pages, Jul. 17, 2012.
Zhu et al., "Collective Diffusion Model for Water Permeation through Microscopic Channels", Physcial Review Letters, 4 pages, Nov. 24, 2004.
Zirehpour et al., "Unique membrane process integration for olive oil mill wastewater purification", Separation and Purification Technology, vol. 96, pp. 124-131, May 21, 2012.
Zydney, Andrew, "Stagnant film model for concentration polarization in membrane systems", Journal of Membrane Science, vol. 130, pp. 275-281, 1997.
Feroz et al., "Can Fibrous Mats Outperform Current Ultrafiltration and Microfiltration Membranes", Ind. Eng. Chem. Res., vol. 56, pp. 10438-10447, Aug. 15, 2017.
Fei et al., "A Synthetic Zwitterionic Water Channel: Characterization in the Solid State by X-ray Crystallography and NMR Spectroscopy", Angew. Chem. Int. Ed., vol. 44, pp. 5720-5725, 2005.
Le Duc et al., "Imidazole-Quartet Water and Proton Dipolar Channels", Angew. Chem. Int. Ed., vol. 50, pp. 11366-11372, 2011.
Zhao et al., "Proton Gradient-Induced Water Transport Mediated by Water Wires Inside Narrow Aquapores of Aquafoldamer Molecules", J Am. Chem. Soc., vol. 136, pp. 14270-14276, Sep. 16, 2014.
Barboiu, Mihail, "Artificial water channels—incipient innovative developments", Chem. Commun., vol. 52, pp. 5657-5665, Mar. 23, 2016.
Tunuguntla et al., "Ultrafast proton transport in sub-1-nm diameter carbon nanotube porins", Nature Nanotechnology, vol. 11, 8 pages, Jul. 2016.
Antonietti et al., "Vesicles and Liposomes: A Self-Assembly Principle Beyond Lipids", Adv. Mater., vol. 15, No. 16, pp. 1323-1333, Aug. 2015.
Discher et al., "Polymersomes Tough Vesicles Made from Diblock Copolymers", Science, vol. 284, pp. 1143-1147, May 14, 1999.
Zhang et al., "Natural channel protein inserts and functions in a completely artificial, solid-supported bilayer membrane", Scientific Reports, 7 pages, Jul. 12, 2013.
Horner et al., "Comment on" Enhanced water permeability and tunable ion selectivity in subnanometer carbon nanotube porins, Science, vol. 359, 3 pages Mar. 30, 2018.
Tunuguntla et al., "Response to Comments on Enhanced water permeability and turnable ion selectivity in subnanometer carbon nanotube porins", Science, vol. 359, 3 pages, Mar. 30, 2018.
Haltia et al., "Forces and factors that contribute to the structural stability of membrane proteins", Biochimica et Biophysica Acta, vol. 1228, pp. 1-27, Oct. 17, 1994.

(56) References Cited

OTHER PUBLICATIONS

Jegal et al., "Factors Affecting the Interfacial Polymerization of Polyamide Active Layers for the Formation of Polyamide Composite Membranes", Journal of Applied Polymer Science, vol. 86, pp. 2781-2787, Mar. 14, 2002.
Shen et al., "Achieving high permeability and enhanced selectivity for Angstrom-scale separations using artificial water channel membranes", Nature Communications, 11 pages, 2018.
Wallace et al., "Differential Absorption Flattening Optical Effects Are Significant in the Circular Dichroism Spectra of Large Membrane Fragments", Biochemistry, vol. 26, pp. 65-70, Aug. 1, 1986.
Kelly et al., "How to study proteins by circular dichroism", Biochimica et Biophysica Acta, vol. 1751, pp. 119-139, Jun. 8, 2005.
Abraham et al., "Tunable sieving of ions using graphene oxide membranes", Nature Nanotechnology, vol. 12, 7 pages, Jun. 2017.
Agre, Peter, Aquaporin Water Channels (Nobel Lecture), Angew. Chem. Int. Ed., vol. 43, pp. 4278-4290, 2004.
Azais et al., "Nanofiltration for wastewater reuse: Counteractive effects of fouling and matrice on the rejection of pharmaceutical active compounds", Separation and Purification Technology, vol. 133, pp. 313-327, Jul. 4, 2014.
Baek et al., "High Performance and antifouling vertically aligned carbon nanotube membrane for water purification", Journal of Membrane Science, vol. 460, pp. 171-177, Feb. 25, 2014.

METHOD FOR BIOLOGICAL OR BIOMIMETIC CHANNEL-BASED MEMBRANE FABRICATIONS USING LAYER-BY-LAYER STRUCTURE

CROSS REFERENCE TO RELATED APPLICATIONS

This is a continuation application of U.S. Ser. No. 16/414,330, now U.S. Pat. No. 11,154,822, filed May 16, 2019, which claims priority to provisional application U.S. Ser. No. 62/672,351, filed May 16, 2018, both of which are incorporated herein by reference in their entirety.

GOVERNMENT SPONSORSHIP

This invention was made with government support under Grant Nos. CBET1053575, CBET1552571 and DMR1709522 awarded by the National Science Foundation. The Government has certain rights in the invention.

TECHNICAL FIELD

The invention relates to membrane compositions and methods for preparing membrane compositions. In particular, the methods employ a layer-by-layer approach to membrane preparation.

BACKGROUND

Synthetic polymeric membranes, which are widely used in water purification, gas separations, chemical processing, and bioprocessing, suffer from a ubiquitous trade-off trend: high permeability leads to low selectivity and vice versa. This trade-off manifests due to the structural variations in state-of-the-art membranes, which typically use differences in molecular sizes to affect a separation. In the cases of angstrom-scale separations such as water desalination and gas separations, where nonporous polymeric membranes operate via the solution-diffusion mechanism, the variable size of the free volume elements through which diffusion occurs hampers membrane performance. In porous membranes such as ultrafiltration and microfiltration, this trade-off is primarily due to the broad pore size distribution seen in commercial membranes.

Biological membranes exhibit high permeability and high selectivity combinations because, in addition to possessing various transmembrane proteins with well-defined channel pore sizes, they synergistically combine size, charge, van der Waals, and specific binding interactions within the channels to enhance the transport of target species. For example, size exclusion is the major mechanism for water-over-solute selectivity of biological water channel proteins, aquaporins. Water dipole reorientation through a series of specific hydrogen bonding steps is another selectivity mechanism that prevents protons from crossing the membrane. Aquaporins have been incorporated into membrane matrices for applications in desalination and water purification because of their ability to maintain high permeability and selectivity. However, high costs, difficulties in fabrication, and low stability associated with membrane protein-based materials have hindered the large-scale applications of aquaporin-based membranes.

Biological membrane protein channels, synthetic channels, and carbon nanotubes have emerged as promising platforms for the development of separation membranes with precise molecular selectivity. Artificial channels can be synthesized using simple chemistry, and are solvent compatible, thus allowing manufacturing techniques common in polymer processing to be applied. More importantly, flexibility in design of the chemical structures of artificial channels further allows for specific functionalization to tailor their permeability and selectivity. These precisely designed pore structures are ideal for membranes that can overcome the aforementioned permeability-selectivity trade-off of current commercial membranes. Relative to state-of-the-art commercial membranes, biomimetic membranes incorporating these pore structures are expected to exhibit high permeability and selectivity because they possess a high density of channels with a well-defined pore geometry and functionality designed to exclude or pass specific components from complicated mixtures.

Membrane protein-based biomimetic membranes studied thus far have been limited to small improvements in performance that are much lower than the orders of magnitude enhancement anticipated from early experiments. Current membrane protein-based biomimetic membranes show 2-3 times increases in permeability over commercial membranes with similar or worse selectivity. This has been attributed to the use of vesicular morphologies of channel-reconstituted liposomes and the low protein content in biomimetic matrices used for membrane fabrication. In addition, widespread application of membrane protein-based biomimetic membranes developed so far may be limited due to the use of non-scalable fabrication techniques used for membrane synthesis. Designing membranes with high packing densities of channel proteins with uniform pore sizes of ~0.5-1.5 nm with less material- and time-intensive synthesis techniques could provide a path to meet the ultimate promise of biomimetic membranes in this important solute size range.

BRIEF SUMMARY OF PREFERRED EMBODIMENTS

A preferred embodiment includes novel methods of preparing layered membrane compositions. Preferably, the methods comprise obtaining a porous support having a plurality of pores and a negatively charged surface, adding a positively charged polymer to impart a positive charge, and adding a nanosheet comprising a channel and a polymer functionalized with a deprotonated carboxylic acid.

Preferably, additional positively charged polymers and negatively charged nanosheets are added in a layer-by-layer approach. Preferably, layers are added until the pores are covered. In some embodiments, the addition of the positively charged layer and the negatively charged layer is repeated three or more, four or more times, five or more times, or six or more times.

Preferably, the porous support is a polymeric substrate or an inorganic substrate. In some embodiments, the polymeric substrate is polycarbonate or polyethersulfone. In some embodiments, the inorganic substrate is aluminum oxide. Preferably, the negatively charged surface of the porous support is applied by UV-ozone. Preferably, the plurality of pores have an average pore diameter between about 20 nm and about 1 μm.

Preferably, the nanosheet comprises a polymer functionalized with a deprotonated carboxylic acid with channels embedded therein. Preferably, the polymer functionalized with the deprotonated carboxylic acid is an amphiphilic block copolymer. In some embodiments, the block copolymer comprises one or more hydrophobic blocks of polybutadiene and one or more hydrophilic blocks of polyethylene oxide. Preferably, the channel is a membrane protein or an artificial channel. In some embodiments, the artificial channel is a peptide-appended pillar[5]arene artificial channel.

Preferably, the positively charged polymer comprises an amine group, an amide group, an imide group, an imine group, an azide group, a nitrate group, a nitrite group, a cyanate group, a nitrile group, or a combination thereof. In some embodiments, the positively charged polymer is polyethylenimine.

A preferred embodiment includes adding a crosslinker. Preferably, the crosslinker crosslinks carboxylic acid groups to amine groups. In some embodiments, the crosslinker is 1-Ethyl-3-(3-dimethylaminopropyl)carbodiimide (EDC) and N-hydroxysuccinimide (NHS).

A preferred embodiment includes membrane compositions comprising a porous support, one or more positively charged layers comprising a positively charged polymer, and one or more negatively charged layers comprising a nanosheet. Preferably, the porous support has a negatively charged surface. Preferably, the nanosheet comprises a channel and a polymer functionalized with deprotonated carboxylic acid.

Preferably, the composition comprises sufficient positively charged layers and negatively charged layers to cover the pores. In some embodiments, the compositions comprise three or more, four or more, five or more, or six or more positively charged layers and negatively charged layers.

Preferably, the porous support is a polymeric substrate or an inorganic substrate. In some embodiments, the polymeric substrate is polycarbonate or polyethersulfone. In some embodiments, the inorganic substrate is aluminum oxide. Preferably, the plurality of pores have an average pore diameter between about 20 nm and about 1 μm.

Preferably, the nanosheet comprises a polymer functionalized with a deprotonated carboxylic acid with channels embedded therein. Preferably, the polymer functionalized with the deprotonated carboxylic acid is an amphiphilic block copolymer. In some embodiments, the block copolymer comprises one or more hydrophobic blocks of polybutadiene and one or more hydrophilic blocks of polyethylene oxide. Preferably, the channel is a membrane protein or an artificial channel. In some embodiments, the artificial channel is a peptide-appended pillar[5]arene (PAP) artificial channel.

Preferably, the positively charged polymer comprises an amine group, an amide group, an imide group, an imine group, an azide group, a nitrate group, a nitrite group, a cyanate group, a nitrile group, or a combination thereof. In some embodiments, the positively charged polymer is polyethylenimine (PEI). In some embodiments, the deprotonated carboxylic acid groups are crosslinked to an amine group.

A preferred embodiment includes membrane compositions prepared by the methods and separation devices comprising the membrane compositions.

While multiple embodiments are disclosed, still other embodiments of the inventions will become apparent to those skilled in the art from the following detailed description, which shows and describes illustrative embodiments of the invention.

Accordingly, the figures and detailed description are to be regarded as illustrative in nature and not restrictive.

BRIEF DESCRIPTION OF THE DRAWINGS

The following figures form part of the specification and are included to further demonstrate certain embodiments or various aspects of the invention. In some instances, embodiments of the invention can be best understood by referring to the accompanying figures in combination with the detailed description presented herein. The description and accompanying figures may highlight a certain specific example, or a certain aspect of the invention. However, one skilled in the art will understand that portions of the example or aspect may be used in combination with other examples or aspects of the invention.

FIG. 2A shows a confocal image of giant unilamellar vesicles showing the incorporation of fluorescently-labeled PAP channels into PB23 polymersomes. Block copolymers were not labeled. FIG. 2B shows representative light scattering traces of PB23 polymersomes with different molar channel-to-polymer ratio after a rapid exposure to a hypotonic solution. The hypotonic solution lacked the 100 mM PEG600 used to form the vesicles on a stopped-flow instrument. FIG. 2C shows the water permeability of PAP channel-containing PB23 polymersomes formed with different mCPRs measured under hypotonic conditions. The dash line showed the background permeability level of a control PB23 vesicle. FIG. 2D shows the net water permeability of PAP channels in liposomes (4:1 (mol/mol) phosphatidylcholine/phosphatidylserine (PC/PS), molar channel-to-lipid ratio (mCLR) is 0.005) and in PB23 polymersomes (mCPR=0.005) after subtraction of the background permeability of control vesicles shown in panel C. FIG. 2E shows the single-channel water permeability of PAP channels in PC/PS liposomes and PB23 polymersomes. FIG. 2F shows the insertion efficiency of PAP channels in PC/PS liposomes and PB-PEO polymersomes determined using fluorescence correlation spectroscopy (FCS) measurements. Data shown are the average of triplicates with standard deviation.

FIG. 3A are negative-stain TEM images showing the representative morphologies of aggregates formed at different molar channel-to-polymer ratios (mCPRs). Increasing mCPRs from 0.05, 0.25 to 0.67 resulted in morphology transitions from small vesicles to large vesicles, and finally flat membranes. FIG. 3B are TEM images at high magnification showing the microphase separation in PB12 membranes. The brighter unstained micro-domains of 20-30 nm are PAP channel aggregates. Uranyl selectively stained PB-PEO and the density of these domains increased from low (left, mCPR=0.1) to high (right, mCPR=0.5) channel concentrations. FIG. 3C shows high-resolution scanning TEM (STEM) and energy dispersive spectroscopy (EDS) map supported the microphase separation hypothesis. The left is the high-angle annular dark-field (HAADF) image. The right is the HAADF overlaid with uranyl map (green). The uranyl map aligned well with the PB polymer enriched region. FIG. 3D shows the packing density of PAP channels in PB12 membranes was ~$4.2 \times 10^5$/$\mu m^2$, one order of magnitude higher than that of AQP1 in highly packed 2d crystals ($8.6 \times 10^4$/$\mu m^2$), and more than two orders of magnitude higher that packing density of CNTs ($0.1 \sim 2.5 \times 10^3$/$\mu m^2$) and block copolymer templated nanopore membranes (~$10_3$/$\mu m^2$).

FIG. 4A are SEM images showing approximately 100% coverage of PAP[5] 2D sheets on PC and PES membranes after 3 and 4 cycles of layer-by-layer deposition, respectively. Scale bar is 1 µm. FIG. 4B shows that after 3 and 4 cycles of deposition on PC and PES membranes, the permeabilities were 3.0±1.2 LMH/bar and 64.8±11.3 LMH/bar, respectively. The permeability of the modified PES membranes is approximately one order of magnitude higher that of commercial nanofiltration membrane N30F (3.4±0.3 LMH/bar) and NDX (4.6±0.1 LMH/bar) with a similar molecular weight cutoff (MWCO) as the synthesized membrane. FIG. 4C shows the molecular weight cutoff (MWCO) was approximately 450 Da, 370 Da and 360 Da for the modified PES membrane, commercial N30F and NDX membranes, respectively as determined from filtration of dyes of various molecular weights. The molecular weight cutoff distributions derived from fitting to a sigmoidal model showed the standard deviation ($\sigma$) of modified PES (132 Da) membranes was similar to that of N30F (146 Da) and NDX (125 Da). The pore size distribution is tighter for the PES membrane with a $\sigma$/MWCO ratio of 0.29 compared to 0.35-0.39 for the commercial membranes. The measured rejection values were corrected using a concentration polarization model and all the cutoff data were fit to a sigmoidal function. FIG. 4D shows a comparison of PAP[5] channel based membrane to other commercial NF membranes shows that within the cutoff range (400~500 Da), the channel based membrane has one order of magnitude higher permeability and in general is several times higher that commercial nanofiltration membranes across the complete range of available data on such membranes from literature. FIG. 4E are photographs of feed (F) and permeate (P) containing different dye molecules (decreasing MW from left to right in image) for modified PC membranes. Both positively and negatively charged dyes had similar rejections. Data shown are the average of triplicate measurements with standard deviation.

FIG. 8A shows the results using 50 nm track-etched polycarbonate (PC) membranes as support membranes.

FIG. 8B shows the results using 30 nm polysulfone (PES) ultrafiltration membranes as support membranes. Data shown are the average of triplicate measurements with standard deviation.

FIG. 9A shows the results using 50 nm track-etched polycarbonate (PC) membranes as support membranes. FIG. 9B shows the results using 30 nm polysulfone (PES) ultrafiltration membranes as support membranes. The rejections (3-layer on PC and 4-layer on PES membranes) were corrected by a concentration polarization model. Data shown are the average of triplicate measurements with standard deviation.

FIG. 12A shows the three distinct β-barrel channel proteins that were used: (i) OmpF from *E. coli* (PDB: 2OMF) that excludes proteins but allows small sugars, nutrients and antibiotics to pass through, with in silico estimated pore sizes of 0.8×1.08 nm, (ii) FhuA ΔC/Δ4L from *E. coli* that originally forms part of a larger pore complex for active ferrichrome-iron and antibiotic transports but is engineered with its central alpha-helical plug removed as a passive pore in this work, resultant pore size of 1.31×1.62 nm, (iii) alpha hemolysin, a self-assembled structure created by *Staphylococcus aureus* to porate cell membranes, with an estimated pore size of 1.50×1.50 nm (PDB: 7AHL). FIG. 12B shows two self-assembly methods to construct high density 2D β-barrel channel protein-BCP crystals or nanosheets by self-assembly using (1) detergent dialysis method, a slow detergent removal process with a 6-day dialysis process, and (2) organic solvent extraction method, a 2-hour self-assembly process with addition of chloroform and methanol mixture to protein and polymers, then solvent evaporation, followed by aqueous rehydration. FIG. 12C is a schematic illustration of the layer-by-layer membrane fabrication procedure with densely packed β-barrel channel protein-BCP nanosheets on porous substrates. These scalable channel protein-incorporated biomimetic membranes achieved precise molecular selectivity while demonstrating high water permeability.

FIG. 15A shows one to three layered OmpF-BCP nanosheets supported on the 50 nm track-etched polycarbonate (PC) membrane. FIG. 15B shows four to six layered OmpF-BCP nanosheets fabricated on the polyethersulfone (PES, MP005) substrate.

FIG. 16A shows the molecular weight cutoffs (MWCOs) measured were ~490 Da, ~480 Da, ~930 Da and ~1,130 Da for OmpF (solvent), OmpF (dialysis), αHL (dialysis), FhuA ΔC/Δ4L (dialysis) channel protein-embedded biomimetic membranes, respectively, as determined from filtration of dyes of various molecular weights and fitting to a sigmoidal model. FIG. 16B is a plot of water filtration volume vs time of OmpF, αHL, FhuA ΔC/Δ4L (dialysis) based biomimetic membranes (filtration under 5 psi), NP010 and GE commercial membranes (filtration under 50 psi). FIG. 16C shows the water permeability of three β-barrel channel protein-embedded biomimetic membranes were 293±51 LMH $bar^{-1}$, 724.5±225.9 LMH $bar^{-1}$, and 1,092±79.4 LMH $bar^{-1}$ for OmpF (dialysis), FhuA ΔC/Δ4L (dialysis), αHL (dialysis), demonstrating one or two order of magnitude higher permeability than commercial membranes.

FIG. 17A shows the flux of one-layered OmpF 2D nanosheet-embedded membranes remained almost unchanged for one hour with applied pressure from 5 psi to 50 psi each and FIG. 17B shows the flux of OmpF-membrane increased linearly as the applied pressure increased.

FIG. 18A shows the water permeability of one, two, and three layered OmpF nanosheets supported on the PC substrate were 82.3±4.8, 50.5±11.2, and 24.1±1.7 LMH $bar^{-1}$. FIG. 18B shows the water permeability of four, five, and six layered OmpF nanosheets fabricated on the polyethersulfone (PES, MP005) substrate were 513.6, 301.3, and 206.0 LMH $bar^{-1}$.

FIG. 19A shows the water permeability of 3-layered OmpF-BCP nanosheets supported on PC substrate and that of control PC substrate are 24.1±1.7 and 150±25 LMH $bar^{-1}$, respectively. The water permeability of 6-layered OmpF-BCP nanosheets and αHL-BCP nanosheets supported on a PES (MP005) substrate are 322±12 and 1,092±79.4 LMH $bar^{-1}$, respectively and that of control PES (MP005) membrane is 1,296±64 LMH $bar^{-1}$. These results represent that OmpF crystals performed reasonably high permeability on a PES (MP005) and αHL-BCP nanosheets may need other compatible substrates to manifest their ultimate performance. The water permeability of pure PES (Sterlitech) membrane is 3,039±136 LMH $bar^{-1}$ and that of αHL nanosheets-embedded PES (Sterlitech) membrane is 2,107±235 LMH $bar^{-1}$, indicating that αHL nanosheets possess even higher water permeance. FIG. 19B shows the molecular rejection property of αHL-BCP nanosheets (dialysis)-embedded PES Sterlitech Corp., WA) ultrafiltration membrane demonstrated similar MWCO of 1030 Da as prepared on an aforementioned lower permeability PES (MP005) support.

DETAILED DESCRIPTION

Figure 1:
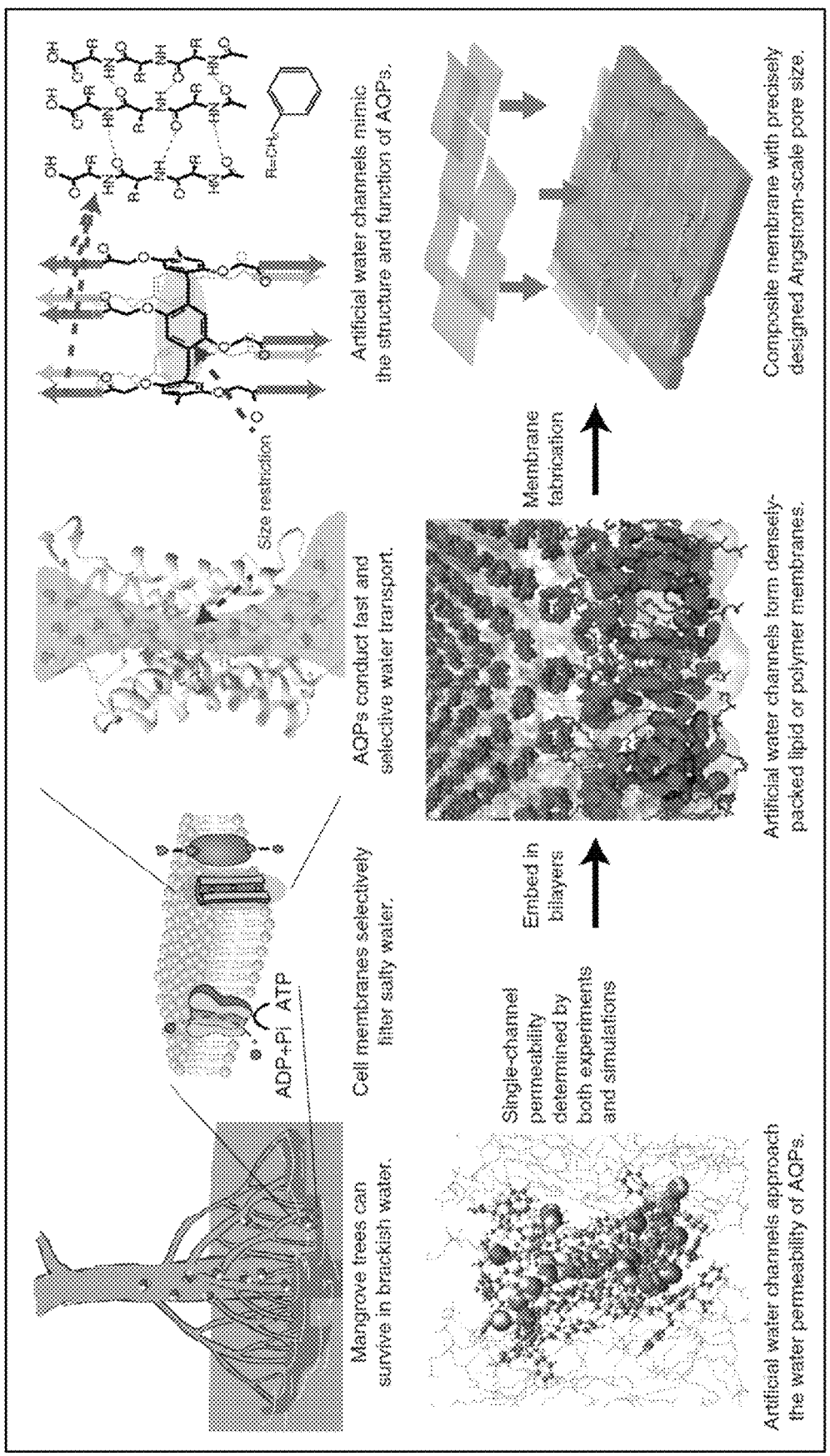
FIG. 1 shows a schematic summarizing the biological inspiration and molecular design of highly selective and permeable water channels, their self-assembly, and eventual translation to macroscale membranes. Biological cell membranes (e.g., mangrove root cell membranes) are capable of efficiently and selectively transporting water through water channel proteins such as aquaporins (AQPs). Artificial water channels, which have a similar hydrophobic outer surface and constrict to Angstrom scale apertures at their narrowest points like AQPs, maintain high permeability and selectivity. They also provide a route toward large-scale applications due to their relatively simple synthesis and chemical and mechanical stability. With carefully designed self-assembly and membrane fabrication procedures, densely packed artificial water channel-based membranes provide molecular separation at the designed pore size while maintaining high permeability.

The present invention relates to membrane compositions and methods for preparing membrane compositions. In particular, the methods employ a layer-by-layer approach to membrane preparation. The methods of preparing the membrane compositions have many advantages over existing methods. For example, the methods provide for the preparation of highly porous biological or biomimetic channel-based membrane fabrications in a scalable membrane structure. Comparing the present methods with conventional methods of preparing biological water channel incorporated membranes, this method can achieve significantly enhanced pore (channel) density per unit area than other channel-based membrane preparation methods, via controlled self-assembly of channels and membrane matrix components which results in 2D micron sized sheet structures. Also, by the layer-by-layer depositions of these 2D sheets, scalable membrane fabrication is possible without any detrimental defects, which is one of the most challenging aspect in water channel-based membrane fabrication at this time. The embodiments of this invention are not limited to particular membranes or methods of using membranes, which can vary greatly without departing from the scope of the invention.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

It is to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring techniques and equipment, with respect to any quantifiable variable, including, but not limited to mass, volume, time, temperature, distance, molecular weight, and water permeability. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, the term "analog" means a molecular derivative of a molecule. The term is synonymous with the terms "structural analog" or "chemical analog."

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

As used herein, the prefix "oligo-" refers to a molecular complex comprised of between two and ten monomeric units. For example, oligosaccharides are comprised of between two and ten monosaccharides. Furthermore, unless otherwise specifically limited, the term "oligo-" shall include all possible isomeric configurations of the molecule, including, but are not limited to isotactic, syndiotactic and random symmetries, and combinations thereof. Furthermore, unless otherwise specifically limited, the term "oligo-" shall include all possible geometrical configurations of the molecule.

The terms "polypeptide," "peptide," and "protein" are used interchangeably to refer to a polymer of amino acid residues. The term also applies to amino acid polymers in which one or more amino acids are chemical analogues or modified derivatives of a corresponding naturally-occurring amino acids.

The term "residue" or "amino acid residue" or "amino acid" are used interchangeably herein to refer to an amino acid that is incorporated into a protein, polypeptide, or peptide (collectively "protein"). The amino acid may be a naturally occurring amino acid and, unless otherwise limited, may encompass non-natural analogs of natural amino acids that can function in a similar manner as naturally occurring amino acids.

The terms "water soluble" and "water miscible" as used herein, means that the component is soluble or miscible in water at 25° C. preferably at a concentration of 0.01 wt. %, more preferably at 0.1 wt. %, and most preferably at 1 wt. %.

The term "channel" as used herein refers to a pathway formed in or through a medium that allows for movement of fluids, such as liquids and gases.

The terms "nanosheet," "two-dimensional nanosheet," and "2D nanosheet", as used herein, refer to a material with a thickness on the nanometer scale or less, and lateral dimensions (e.g., a length and a width) that are each larger than the thickness of the material.

Membrane Compositions and Methods of Preparing the Same

The present disclosure relates to membrane compositions and methods for preparing membrane compositions via a layer-by-layer approach. In a preferred embodiment of the invention, the membrane compositions are highly porous biological or biomimetic channel-based membrane compositions. In an aspect of the invention, the membrane structure is scalable such that the layering approach can be repeated until the desired thickness of the membrane. An advantage of the invention is that the membranes are particularly suitable for precision separations. Thus, the membrane compositions can be used in a variety of separations, biomimetic devices, sensors, drug delivery devices, etc. Precision separations can be performed with the use of the membrane compositions in filtration devices, including, but not limited to, masks, air purifiers, water filters, desalination devices, and biomimetic devices. The compositions described herein can provide substantial energy savings in applications ranging from water treatment to small molecule bioseparations.

The membrane compositions can be prepared by obtaining and/or preparing a porous support. In an aspect of the invention, the porous support is negatively charged. This is can be based on obtaining a porous support that is already negatively charged, or by charging the surface of the porous support with a negative charge. Charging the surface with a negative charge can be done by UV-ozone.

In an aspect of the invention, a positively charged component is then layered on the negatively charged surface. Preferably, the positively charged component comprises a positively charged polymer. In an aspect of the invention, a negatively charged component is then layered on the positively charged surface. Preferably, the negatively charged component comprises a deprotonated carboxylic acid. This process of layering with positively charged groups followed by negatively charged deprotonated carboxylic acids can be repeated as many times as desired. Preferably, the layering process is repeated until sufficient coverage of the porous support is achieved.

Preferably, after any number of positive layers or negative layers are added, a crosslinker is added to crosslink the carboxylic acid groups with an amine group. In a preferred embodiment, the crosslinker is added when the membrane composition has three layers, four layers, five layers, six layers, seven layers, or more. After the addition of the crosslinker, the membrane composition can be further layered to achieve a desired thickness.

In a preferred embodiment, the membrane composition has at least two positive layers, at least three positive layers, at least four positive layers, at least five positive layers, at least six positive layers, at least seven positive layers, at least eight positive layers, at least nine positive layers, at least ten positive layers, at least eleven positive layers, at least twelve positive layers, at least thirteen positive layers, at least fourteen positive layers, at least fifteen positive layers, at least twenty positive layers, at least twenty-five positive layers, at least thirty positive layers, or at least thirty-five positive layers.

In a preferred embodiment, the membrane composition has at least one negative layer, at least two negative layers, at least three negative layers, at least four negative layers, at least five negative layers, at least six negative layers, at least seven negative layers, at least eight negative layers, at least nine negative layers, at least ten negative layers, at least eleven negative layers, at least twelve negative layers, at least thirteen negative layers, at least fourteen negative layers, at least fifteen negative layers, at least twenty negative layers, at least twenty-five negative layers, at least thirty negative layers, or at least thirty-five negative layers.

Preferably, the membrane compositions have specific solute selectivity and high osmotic permeabilities. The improved solute selectivity and high osmotic permeabilities provide an improvement over existing commercial membranes.

In some embodiments, the membrane compositions provide enhanced permeability. Preferably, the water permeability of the membrane compositions can be, for example, at least about 10 LMH bar$^{-1}$, at least about 25 LMH bar$^{-1}$, at least about 50 LMH bar$^{-1}$, at least about 75 LMH bar$^{-1}$, at least about 100 LMH bar$^{-1}$, at least about 150 LMH bar$^{-1}$, at least about 200 LMH bar$^{-1}$, at least about 250 LMH bar$^{-1}$, at least about 300 LMH bar$^{-1}$, at least about 500 LMH bar$^{-1}$, at least about 750 LMH bar$^{-1}$, at least about 1000 LMH bar$^{-1}$, at least about 1500 LMH bar$^{-1}$, at least about 2000 LMH bar$^{-1}$, or more.

In some embodiments, the membrane compositions provide high selectivity. Preferably, the membrane compositions exclude molecules larger than 50 Da, 75 Da, 100 Da, 150 Da, 200 Da, 250 Da, 300 Da, 350 Da, 400 Da, 450 Da, 500 Da, 550 Da, 600 Da, 650 Da, 700 Da, 750 Da, 800 Da, 850 Da, 900 Da, 950 Da, or 1000 Da.

Porous Support

The methods and compositions comprise a porous support. Preferably, the porous structure has a plurality of pores. Preferably, the plurality of pores have an average pore diameter between about 10 nm and about 500 μm, more preferably between about 15 nm and about 100 μm, most preferably between about 20 nm and about 1 μm.

Preferably, the porous support is a polymeric substrate or an inorganic substrate. Preferred polymeric substrate include, but are not limited to, a thermoplastic, a thermoset, or a combination thereof.

The porous support may comprise a synthetic polymer. Examples of synthetic polymers include polysulfones, polyethersulfones, polyvinylidene difluoride (PVDF), polypropylene, acrylic polymers; poly(methyl methacrylate), polyamide (Nylon), polyimide polytetrafluoroethylene (PTFE), polyetherimide, polyacrylonitrile, polyethylene, polycarbonate, polytetrafluoroethylene, poly(dimethylsiloxane), polystyrene, and polyphenylene oxide. In an exemplary embodiment, the polymeric substrate is polyethersulfone or polycarbonate.

The porous support may comprise a natural polymer or modified natural polymer. Examples of natural polymer and modified natural polymer polymers include cellulose esters, cellulose nitrate, cellulose acetate, and regenerated cellulose.

The porous support may comprise an inorganic material. Examples of appropriate inorganic materials include, but are not limited to, aluminum oxide ($Al_2O_3$), metal oxide/ceramic; silicon carbide (SiC), zirconium oxide, silicon dioxide, and titanium dioxide. In an exemplary embodiment, the inorganic substrate is aluminum oxide.

Positively Charged Polymers

The methods and compositions comprise a positively charged polymers. Preferred positively charged polymers include those with a positive functional group such as an amine group, an amide group, an imide group, an imine group, an azide group, a nitrate group, a nitrite group, a cyanate group, a nitrile group, or a combination thereof. Specific examples of the positively charged polymers include polyethyleneimine, polyallylamine, polyvinylamine, polyvinylpyridine, polyethyleneimine-epichlorohydrine reaction products, polyamide-polyamine resins, polyamide-epichlorohydrine resins, chitosan compounds, cationized starch, polyaminesulfone, polyvinylimidazole, polyamidine, dicyanamide-polyalkylene polyamine condensation products, polyalkylene polyamine-dicyandiamide ammonium salt condensation products, dicyandiamide-formalin condensation products, polymers and copolymers of diallyldimethylammonium chloride, vinylpyrrolidone-vinylimidazole copolymers, polymers and copolymers of vinylbenzyltrimethylammonium chloride, polymers and copolymers of dimethylaminoethyl (meth)acrylate, polymers and copolymers of (meth)acryloyloxyalkyltrialkylammonium chloride, polymers and copolymers of (meth)acryloyloxyalkyldialkylbenzylammonium chloride, and acid neutralization products thereof.

Examples of positively charged polymers having an amino group include polyethyleneimine, polyallylamine, and polyvinylamine. The positively charged polymers is preferably polyethyleneimine or polyallylamine, more preferably polyethyleneimine.

Amphiphilic Copolymers

Various types of amphiphilic copolymers can be used. Preferably, the amphiphilic copolymers are functionalized with a deprotonated carboxylic acid. In one embodiment, the copolymer is an ABA copolymer, where A is hydrophilic and B is hydrophobic where A is the same or different hydrophilic segments and B is a hydrophobic B segment. Thus, the term "ABA copolymer" includes an ABC copolymer, where the hydrophilic segments A and C are different.

The block copolymer includes at least one segment B that includes a hydrophobic polymer. Any of a number of hydrophobic polymers can be used, such as, but not limited to, polysiloxane such as polydimethylsiloxane and polydiphenylsiloxane, perfluoropolyether, polystyrene, polyoxypropylene, polyvinylacetate, polyoxybutylene, polyisoprene, polybutadiene, polyvinylchloride, polyalkylacrylate (PAA), polyalkylmethacrylate, polyacrylonitrile, polypropylene, PTHF, polymethacrylates, polyacrylates, polysulfones, polyvinylethers, and poly(propylene oxide), and copolymers thereof.

In some embodiments, the hydrophobic segment contains a predominant amount of hydrophobic monomers. A hydrophobic monomer is a monomer that typically gives a homopolymer that is insoluble in water and can absorb less than 10% by weight of water.

Suitable hydrophobic monomers are C1-C18 alkyl and C3-C18 cycloalkyl acrylates and methacrylates, C3-C18 alkylacrylamides and -methacrylamides, acrylonitrile, methacrylonitrile, vinyl C1-C18 alkanoates, C2-C18 alkenes, C2-C18 haloalkenes, styrene, (lower alkyl)styrene, C4-C12 alkyl vinyl ethers, C2-C10 perfluoro-alkyl acrylates and methacrylates and correspondingly partially fluorinated acrylates and methacrylates, C3 through C12 perfluoroalkylethylthiocarbonylaminoethyl acrylates and methacrylates, acryloxy- and methacryloxyalkylsiloxanes, N-vinylcarbazole, C1 through C12 alkyl esters of maleic acid, fumaric acid, itaconic acid, mesaconic acid, vinyl acetate, vinyl propionate, vinyl butyrate, vinyl valerate, chloroprene, vinyl chloride, vinylidene chloride, vinyltoluene, vinyl ethyl ether, perfluorohexyl ethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilylpropyl methacrylate (TRIS), and 3-methacryloxypropylpentamethyldisiloxane.

In some embodiments, the hydrophobic polymer is one which displays a relatively high oxygen diffusion rate there through, such as, but not limited to, polysiloxanes, perfluoroalkyl ethers, specific unsaturated polymers, and polysulfones. In one embodiment, the hydrophobic polymer is a polysiloxane block having terminal alkylene groups.

In some embodiments, the hydrophobic polymer includes a perfluoroalkyl-polyether block. In other embodiments, the hydrophobic polymer includes an unsaturated polymer, such as a polymer of a conjugated aliphatic or alicyclic diene, which may be substituted by halogen or lower alkyl, a polymer of an alkyne or dialkyne, which may be substituted by lower alkyl or trimethylsilyl, a copolymer of a conjugated diene and a hydrophilic or hydrophobic vinylic monomer, and also partially hydrated derivatives of these compounds.

Specific examples of polymers of conjugated dienes are cis-, trans-, iso- or syndiotactic poly-1,2-butadiene, poly-1, 4-butadiene or polyisoprene, poly-pentenamer, polychloroprene and polypiperylen. Other examples of copolymers are butadiene- or isoprene-copolymers with hydrophilic or hydrophobic vinylic monomers, such as acrylonitrile, styrene, acrylic acid or hydroxyethylmethacrylate. An example of a polyalkyne is poly-1-trimethylsilyl-propyne. In some embodiments, examples of polymers included unsaturated polymers are syndiotactic poly-1,2-butadiene, poly-1,4-butadiene and polyisoprene. An especially preferred unsaturated polymer is poly-1-trimethylsilyl-propyne. Another especially preferred unsaturated polymer is poly-1,4-butadiene. The hydrophobic polymer may include a single type of polymer or more than one type of polymer, such as two or more of those discussed above. The mean molecular weight of one segment B is in the range from about 500 to about 50,000, preferably in the range from about 800 to about 15,000, more preferably in the range of about 1,000 to 12,000, particularly preferably in the range from about 5,000 to about 12,000.

In some embodiments in addition to the hydrophobic segment B, the amphiphilic segmented copolymer includes at least one segment A which includes at least one hydrophilic polymer, such as, but not limited to, polyoxazoline, polyethylene glycol, polyethylene oxide, polyvinyl alcohol, polyvinylpyrrolidone, polyacrylamide, poly(meth)acrylic acid, polyethylene oxide-co-polypropyleneoxide block copolymers, poly(vinylether), poly(N,N-dimethylacrylamide), polyacrylic acid, polyacyl alkylene imine, polyhydroxyalkylacrylates such as hydroxyethyl methacrylate (HEMA), hydroxyethyl acrylate, and hydroxypropyl acrylate, polyols, and copolymeric mixtures of two or more of the above mentioned polymers, natural polymers such as polysaccharides and polypeptides, and copolymers thereof, and polyionic molecules such as polyallylammonium, polyethyleneimine, polyvinylbenzyltrimethylammonium, polyaniline, sulfonated polyaniline, polypyrrole, and polypyridinium, polythiophene-acetic acids, polystyrenesulfonic acids, zwitterionic molecules, and salts and copolymers thereof.

In some embodiments, the hydrophilic segment preferably contains a predominant amount of hydrophilic monomers. A hydrophilic comonomer is a monomer that typically gives a homopolymer that is soluble in water or can absorb at least 10% by weight of water.

Suitable hydrophilic monomers are hydroxyl-substituted lower alkyl acrylates and methacrylates, acrylamide, methacrylamide, (lower alkyl) acrylamides and methacrylamides, N,N-dialkyl-acrylamides, ethoxylated acrylates and methacrylates, polyethyleneglycol-mono methacrylates and polyethyleneglycolmonomethylether methacrylates, hydroxyl-substituted (lower alkyl)acrylamides and methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)-(where the term amino also includes quaternary ammonium), mono(lower alkylamino)(lower alkyl) and di(lower alkylamino)(lower alkyl) acrylates and methacrylates, allyl alcohol, 3-trimethylammonium 2-hydroxypropylmethacrylate chloride (Blemer.QA, for example from Nippon Oil), dimethylaminoethyl methacrylate (DMAEMA), dimethylaminoethylmethacrylamide, glycerol methacrylate, and N-(1,1-dimethyl-3-oxobutyl)acrylamide.

In some embodiments, the segment A includes a polymer displaying a relatively high water or ion diffusion rate there through. Specific examples of hydrophilic monomers from which such polymers can be made are cyclic imino ethers, vinyl ethers, cyclic ethers including epoxides, cyclic unsaturated ethers, N-substituted aziridines, beta-lactones and beta-lactams. Further suitable monomers include ketene acetals, vinyl acetals and phosphoranes. Suitable cyclic imino ethers include 2-oxazoline. If a 2-oxazoline having an alkenyl group in 2 position is used as hydrophilic monomer, a polymerizable unsaturated group is provided within segment A (in a side chain) of the amphiphilic segmented copolymer to serve as the polymerizable unsaturated group necessary for the final polymerization to obtain a polymeric product or as an additional polymerizable unsaturated group which offers the possibility of direct crosslinking in the preparation of the polymer. In some embodiments, the cyclic imino ether is 2-methyloxazoline. The most preferred vinyl ethers are methyl vinyl ether, ethyl vinyl ether and methoxy ethyl vinyl ether.

In some embodiments, the mean molecular weight of one segment A is in the range from about 500 to about 50,000, from about 800 to about 15,000, from about 1,000 to 12,000, particularly from about 5,000 to about 12,000.

Preferred block copolymers, include, but are not limited to, an amphiphilic diblock or triblock block copolymer comprising one or more hydrophobic blocks selected from the group consisting of polybutadiene (PB), polydimethylsiloxane (PDMS), polypropylene (PP), polypropylene oxide (PPO), polyethylethylene (PEE), polyisobutylene (PIB), polyisoprene (PI), polycaprolactone (PCL), polystyrene (PS), fluorinated polymers, and polymethylmethacrylate (PMMA); and one or more hydrophilic blocks selected from the group consisting of polymethyloxazoline (PMOXA), polyethyloxazoline (PEtOXA), and polyethylene oxide (PEO). In particular embodiments of methods herein, the block copolymer comprises one or more hydrophobic blocks of polybutadiene (PB) and one or more hydrophilic blocks of polyethylene oxide (PEO).

Channels

The methods and compositions comprise a channel. In some embodiments, the channel is a membrane protein. One or more types of membrane proteins may be used depending on the effect that is desired in the final membrane. Preferably the membrane protein comprises a channel. As used herein, the term "channel" is intended to encompass both protein channels and protein pores. Membrane protein channels suitable for inclusion in the membranes are for instance selected from, but not limited to, membrane protein channels found in The Transporter Classification Database (TCDB; www.tcdb.org). The TCDB is an International Union of Biochemistry and Molecular Biology (IUBMB)-approved classification system for membrane transport proteins. For example, suitable native, recombinant, and engineered membrane proteins may include but are not limited to ABC transporters, ATPases, G-protein coupled receptors, holins, ion channels, major intrinsic proteins (including aquaporin water channels), mechanosensitive channels, outer membrane pore-forming proteins (porins), pore-forming toxins, rhodopsins, and the like. Additional channels may include mutated or engineered channels with increased thermal or solvent stability, and performance properties such as "always open" channels. In some embodiments, the membrane protein is a native membrane protein, a recombinant membrane protein, an engineered membrane protein, or a combination thereof. The embodiments of this invention are not limited to particular membrane protein, which can vary and are understood by skilled artisans.

In some embodiments, the membrane protein channel is a beta barrel membrane protein or an alpha helical membrane protein. In some embodiments, the membrane protein is a porin, a pore-forming toxin, or an aquaporin.

Porins are beta barrel membrane proteins present in the outer membrane of gram-negative bacteria and some gram-positive Mycobacteria, the outer membrane of mitochondria, and the outer chloroplast membrane. In an exemplary embodiment, the porin is outer membrane protein F (OmpF) from $E.\ coli$. In another exemplary embodiment, the porin is FhuA from $E.\ coli$ that originally forms part of a larger pore complex for active ferrichrome-iron and antibiotic transports. FhuA $\Delta C/\Delta 4L$ is engineered with its central alpha-helical plug removed to function as a passive pore. All known porins are useful in the invention.

Pore-forming toxins (also known as pore-forming proteins) are produced by bacteria as well as other organisms including earthworms, which produce the pore-forming toxin lysenin. Pore-forming toxins may be beta barrel pore-forming toxins (including α-hemolysin, Panton-Valentine leucocidin, Clostridial Epsilon-toxin) or alpha helical pore-forming toxins (including haemolysin E, actinoporins, Corynebacterial porin B). In an exemplary embodiment, the pore-forming toxin is α-hemolysin (αHL), a self-assembled structure created by $Staphylococcus\ aureus$ to porate cell membranes.

Aquaporins (AQPs) are integral membrane proteins from a larger family of major intrinsic proteins (MIPs) that form pores in the membrane of biological cells, mainly facilitating transport of water between cells. Aquaporin proteins are composed of a bundle of six transmembrane α-helices. All known aquaporin water channels (including but not limited to AQP0, AQP1, AqpZ, AQP4, SoPIP2;1, NtAQP1, AQP9, AqpX) are useful in the invention. In an exemplary embodiment, the aquaporin is AqpZ from $Rhodobacter\ sphaeroides$.

In some embodiments, the methods and compositions comprise an artificial channel. Artificial channels include, but are not limited to, carbon nanotube (CNT) porins and peptide-appended pillar[5]arene (PAP) artificial channels.

Crosslinker

Preferably, the methods comprise a crosslinker. Preferred crosslinkers are capable of crosslinking an amine group to the carboxylic acid groups present on the surface of the membrane composition. Preferred crosslinkers include, but are not limited to, 1-Ethyl-3-(3-dimethylaminopropyl)carbodiimide (EDC) and N-Hydroxysuccinimide (NHS).

EXAMPLES

Example 1: Achieving High Permeability and Enhanced Selectivity for Angstrom-Scale Separations Using Artificial Water Channel Membranes Synthetic polymer membranes, critical to diverse energy-efficient separations, are subject to permeability-selectivity trade-offs that decrease their overall efficacy. These tradeoffs are due to structural variations (e.g., broad pore size distributions) in both nonporous membranes used for Angstrom-scale separations and porous membranes used for nano to micron-scale separations. Biological membranes utilize well-defined Angstrom-scale pores to provide exceptional transport properties and can be used as inspiration to overcome this trade-off. Here, we present a comprehensive demonstration of such a bioinspired approach based on pillar[5]arene artificial water channels resulting in artificial water channel-based block copolymer membranes. These membranes have a sharp selectivity profile with a molecular weight cutoff of ~500 Da, a size range challenging to achieve with current membranes, while achieving large improvement in permeability (~65 compared to 4-7 $Lm^{-2} \cdot h^{-1} \cdot bar^{-1}$) over similarly rated commercial membranes.

Figure 2A:
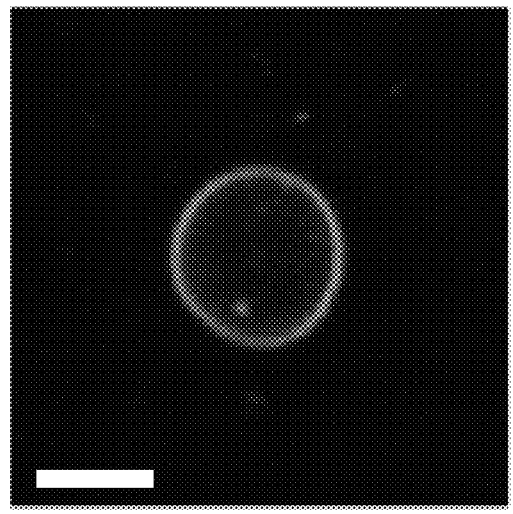
FIGS. 2A-F show peptide-appended pillar[5]arene (PAP) artificial water channels maintain an aquaporin-like single channel permeability in block copolymer vesicles but demonstrate a lower efficiency of insertion than in lipid membranes.
Figure 2B:
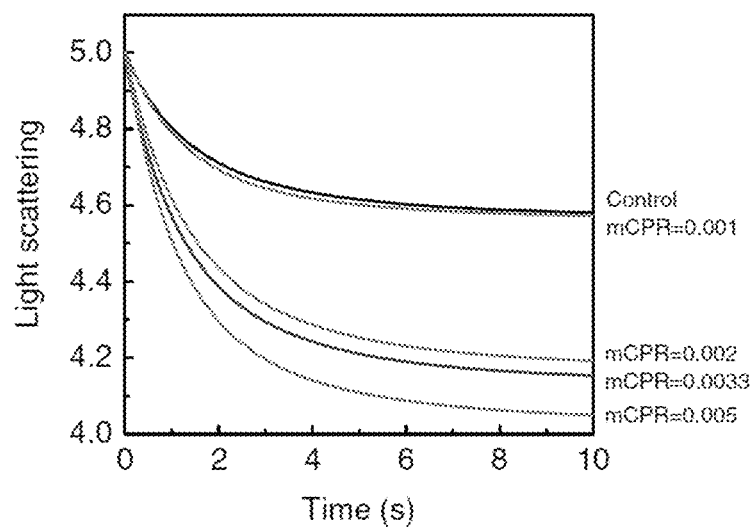
Figure 2C:
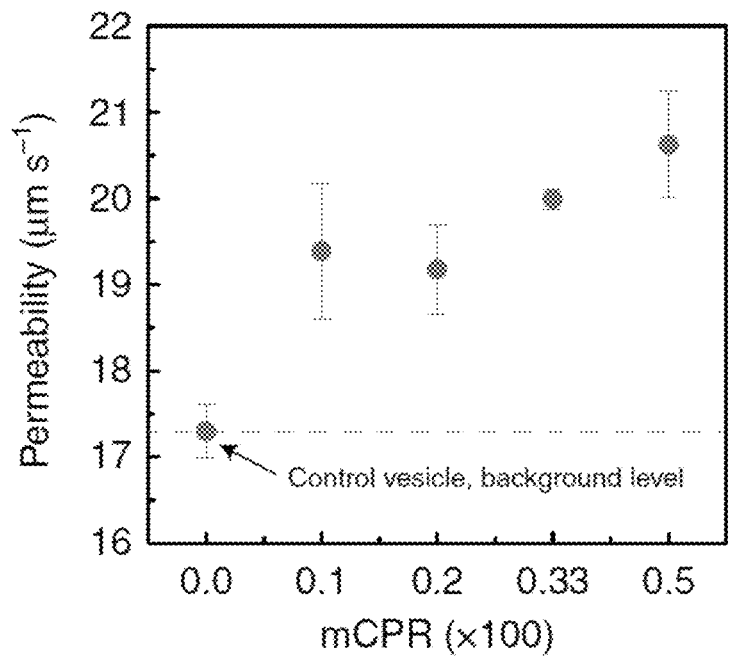
Figure 2D:
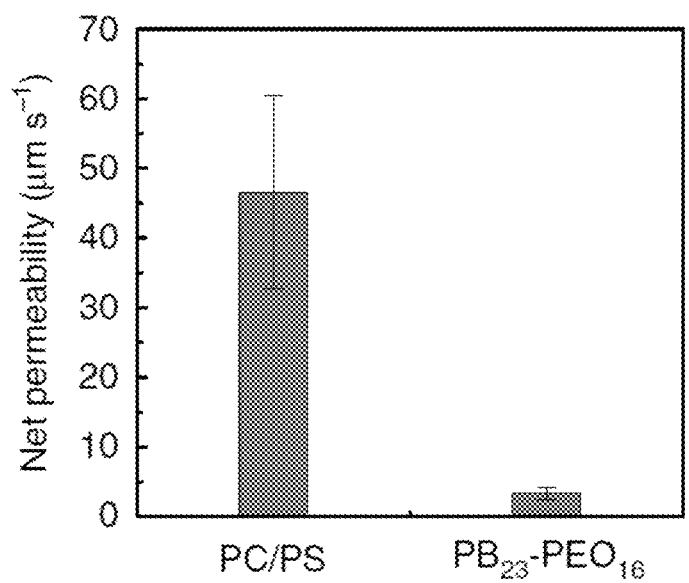
Figure 2E:
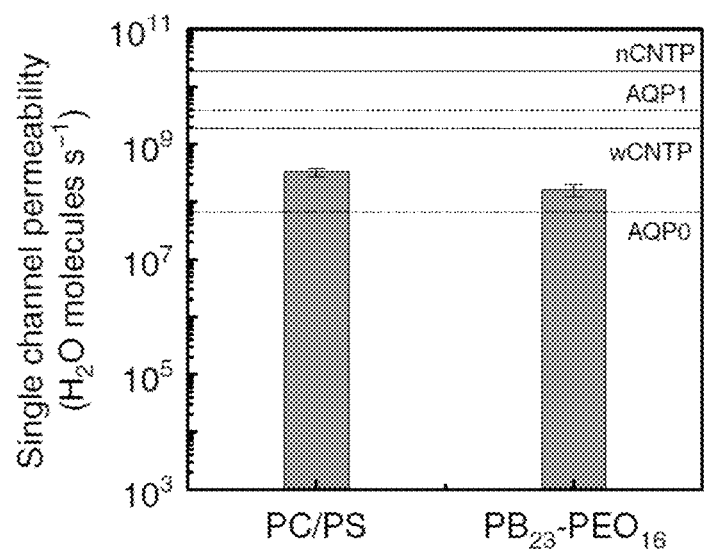

In this example, we present an inception-to-implementation description of highly permeable and selective polymer membranes consisting of well-defined, densely packed artificial water channels (FIG. 1). The design of the channel used in this work, peptide-appended pillar[5]arene (PAP) artificial water channel with a pore size of approximately 5 Å, was inspired by AQPs found in cell membranes including in those of mangrove roots. To date, artificial water channels, including PAP channels and CNT porins, have been carefully characterized primarily in lipid bilayers, which are not ideal for larger scale applications due to their low chemical and mechanical stability. As such, we first systematically investigated the molecular transport of water through PAP channels embedded in amphiphilic block copolymers (BCPs). BCPs form lipid-like bilayer structures, and are more mechanically and chemically stable than lipids, and offer customizable polymer types, membrane thicknesses and terminal functional groups. BCPs are being increasingly used for incorporating membrane proteins into bilayer or bilayer-like matrices for functional studies, drug delivery, and sensors, and self-assembled ultrafiltration membranes. We chose poly(butadiene)-b-poly(ethylene oxide) diblock copolymers (denoted as $PB_n$-$PEO_m$, see Table 1, n and m indicate the number average degree of polymerization for each block) because they have been used to study membrane proteins and demonstrate unique self-assembly properties including the ability to assemble membrane proteins into two-dimensional crystals. The water conductance of PAP channels in BCPs was determined to be in the range of AQPs' ($\sim 10^8$-$10^9$ water molecules/s), confirmed by both experiments and simulations. We also studied the effect of physical hydrophobic mismatch, which is characterized by the difference between the bilayer thickness and channel length, and chemical hydrophobic mismatch, which is indicative of the differences in surface energy between the hydrophobic domains of the bilayers and the outer surface of the channels, on insertion of channels into lipid and polymer bilayers. PAP channels were then densely packed into two-dimensional sheets within PB-PEO polymers through a controlled self-assembly process; and the composite membranes were synthesized by depositing these 2D sheets using a layer-by-layer technique on porous substrates. These membranes preserve the exceptional permeability and selectivity properties of PAP channels determined in molecular transport studies with permeabilities an order of magnitude above corresponding commercial membranes while maintaining a close to ideal selectivity expected from a membrane with monodisperse 5Å pores.

tant decrease in the scattering intensity especially at larger angles. This is because vesicles with a size comparable to the wavelength of light, i.e., sizes >1/10 the wavelength of light, stop acting like point particles and show a decreasing trend in scattering intensity with increasing volume at the scattering angle used for measurements (90°). The light scattering signals decreased faster at higher mCPRs (FIG. 2B), indicative of faster volumetric expansion and thus higher water permeance in the presence of channels (FIG. 2C). The PB23 vesicles, at an mCPR of 0.005, had a net permeability of 3.3±0.9 μm/s (FIG. 2D) after subtracting the background showed in FIG. 2C. The number of PAP channels per polymersome was counted using a fluorescence correlation spectroscopy (FCS) based technique reported previously. PAP channels were first tagged with a fluorophore, tetramethylrhodamine cadaverine. Polymersomes with labeled channels were subjected to FCS analysis before and after detergent solubilization, creating one autocorrelation functions for the vesicles prior to solubilization and another for the solubilized micelles containing PAP channels. A double-species model (used to differentiate labeled PAP channels from residual free fluorophores) was employed to fit each of the autocorrelation curves and to obtain the number of fluorescent vesicles ($N_{Vesicle}$) and solubilized PAP micelles ($N_{Micelles}$). The number of the inserted channels per vesicle ($N_{Channels}$) was calculated as the ratio $N_{Micelles}/N_{Vesicle}$. The number of inserted channels per vehicle at an mCPR of 0.005 was approximately 30. We compared the water conductance of PAP channels in lipid and PB23 membranes (FIG. 2D). At a molar channel-to-lipid ratio of 0.005 (mCLR=0.005), the net permeability of PAP channels in lipid vesicles was 46.6±13.8 μm/s, approximately one order of magnitude higher compared to that in PB23 polymersomes (3.3±0.9 μm/s) at an mCPR of 0.005. However, the number of inserted PAP channels in the lipid system were also found to be ~10 times higher than that in the PB23 vesicles. Combined, the FCS and the stopped-flow permeability data showed that the single channel water permeability of PAP channels in PB23 vesicles was 1.6±0.4×10⁸ $H_2O$ molecules/s (FIG. 2E), which was lower by a factor of ~2

TABLE 1

| Polymer ID | Polymer composition | Molecular weight (g · mol⁻¹) | Hydrophilic Volume fraction ($f_{hydrophilic}$) | Bilayer thickness (nm) | Hydrophobic core thickness (nm) | Area of per chain (nm²)$^d$ |
|---|---|---|---|---|---|---|
| PB12 | $PB_{12}$-$PEO_9$ | 1,050 | 0.32 | 5.1 ± 0.6 | 3.7 | 0.69 |
| Carboxylic PB12 | $PB_{12}$-$PEO_8$-COOH | 1,000 | 0.29 | 5.1 ± 0.6 | 3.7 | 0.69 |
| PB23 | $PB_{23}$-$PEO_{16}$ | 1,980 | 0.30 | 6.0 ± 0.5 | 5.4 | 0.88 |
| PB33 | $PB_{33}$-$PEO_{24}$ | 2,932 | 0.31 | 7.4 ± 0.6 | 6.8 | 1.0 |

Functional Characterization of PAP Channels in PB-PEO Polymer Membranes.

PAP channels could be incorporated into PB-PEO membranes using the film rehydration method (FIG. 2A) previously used for incorporating artificial and biological water channels in lipids. For $PB_{23}$-$PEO_{16}$ (PB23), vesicles with diameters from 200-300 nm were formed, as indicated by both transmission electron microscopy (TEM) and dynamic light scattering size measurements. After incorporating PAP channels into these unilamellar polymersomes at different molar channel-to-polymer ratios (mCPRs), the polymersomes were abruptly exposed to an inwardly-directed osmotic gradient, the subsequent swelling of the polymersomes led to greater destructive interference and a concomicompared to that in liposomes (3.3±0.6×10⁸ $H_2O$ molecules/s) but within the range of AQPs and CNT porins ($\sim 10^8$-$10^{10}$ water molecules/s). Note that in this study membrane permeability is presented in the units of flux at applied osmotic gradient (μm/s) for bilayer membranes or the industry standard (L·m⁻²·h⁻¹·bar⁻¹, denoted as LMH/bar) for synthetic membranes (1 μm/s is equivalent to 2.75×10⁻³ LMH/bar). Single channel permeability is reported as volumetric flow rate per s (cm³/s) or number of water molecules per s (3×10⁻¹⁴ cm³/s is equivalent to 10⁹ water molecules/s). These units were chosen for easy comparison with literature values in the two distinct fields of membrane biophysics and synthetic membrane science.

Figure 2F:
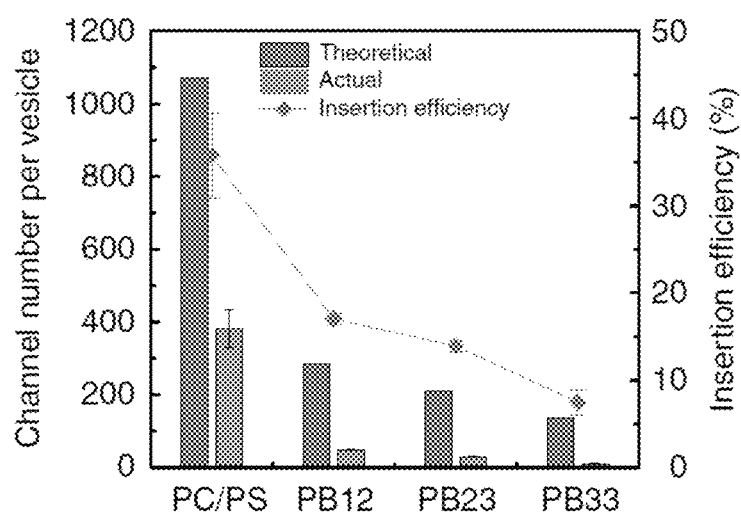

In addition to PB23, we also incorporated channels in $PB_{12}$-$PEO_9$ (PB12) and $PB_{33}$-$PEO_{24}$ (PB33) BCPs with different polymer lengths (Table 1). Although the selected BCPs had a hydrophilic volume fraction '$f_{hydrophilic}$' within the threshold expected to form vesicles (0.35±0.10, Table 1), the rehydration of OH-terminated PB12 resulted only in micelles; COOH functionalized PB12 produced a vesicle and micelle mixture; and PB33 polymers formed worm-like structures with less than 10% proportion of vesicles. After size exclusion chromatography to remove the non-vesicular fractions, COOH functionalized PB12, OH-terminated PB23 and OH-terminated PB33 vesicles were used to study channel insertion efficiency. Insertion efficiency is defined as the actual channel number per vesicle determined by FCS divided by the theoretical insertion number, for which we assumed all PAP channels added to the reconstitution mixture were embedded into the vesicle bilayers (FIG. 2F). In lipid vesicles at an mCLR of 0.005, the number of PAP channels per liposome (383±52 channels in a vesicle of ~160 nm in diameter) corresponded to an insertion efficiency of 35.7±4.9%. The number decreased to 17.0±0.6%, 13.9±0.6% and 7.5±1.5% for PB12, PB23 and PB33 vesicles, respectively.

The insertion of PAP channels was less favorable in PB-PEO polymers than lipids, and was dependent on hydrophobic block length and chemical hydrophobic mismatch with the polymer. From the perspective of physical compatibility, the insertion ability in PB polymers decreased with increasing polymer hydrophobic block lengths. PB12, PB23 and PB33 polymers have a hydrophobic bilayer thickness of 5.1±0.6 nm, 6.0±0.5 nm and 7.4±0.5 nm, respectively, estimated from Cryo-TEM, which were close to the thicknesses estimated from literature (Table 1). The physical mismatch with the height of PAP channels (~4 nm) further supported the observed trend for PAP channels in PB-PEO BCPs. The chemical compatibility was quantified by a water soluble conjugated oligoelectrolyte, 4,4'-bis(4'-(N,N-bis(6"-(N,N,N-trimethylammonium)hexyl)amino)-styryl)stilbene tetraiodide (DSSN+), which is used to probe relative hydrophobicity. DSSN+ has a D-π-D structure and undergoes intramolecular charge transfer, which is influenced by solvent environment, and can be used to probe the hydrophobicity of self-assembled membranes. The insertion of DSSN+ into lipids leads to a blue shift of the emission due to the lower-polarity inner core of a lipid bilayer compared to aqueous environment. The lipid induced a larger blue shift (57.3±0.9 nm) than PB23 BCPs (8.0±1.3 nm) in DSSN+ emission, indicative of a more hydrophobic environment in lipid than in PB polymers. When PAP channels were incorporated into phosphatidylcholine/phosphatidylserine (PC/PS) liposomes, the blue shift increased from 57.3±0.9 nm to 64.0±0.0 nm, while this shift was from 8.0±1.3 nm to 18.0±0.0 nm for PB23 polymersomes. The relative shift was 28.1% and 89.5% for pure liposomes and PB23 polymersomes, respectively, implying the phenylalanine arms of PAP channels were closer in hydrophobicity to the lipid membrane environment rather than the PB membrane environment, resulting in a higher driving force for spontaneous insertion in the hydrophobic phospholipid core. We concluded that the insertion of PAP channels was more favorable in lipid than in PB-PEO membranes from the perspective of chemical compatibility. Thus, opportunities exist to develop other polymers that may be more compatible with PAP channels.

Self-Assembly of PAP Channels in PB-PEO Membranes.

Figure 3A:
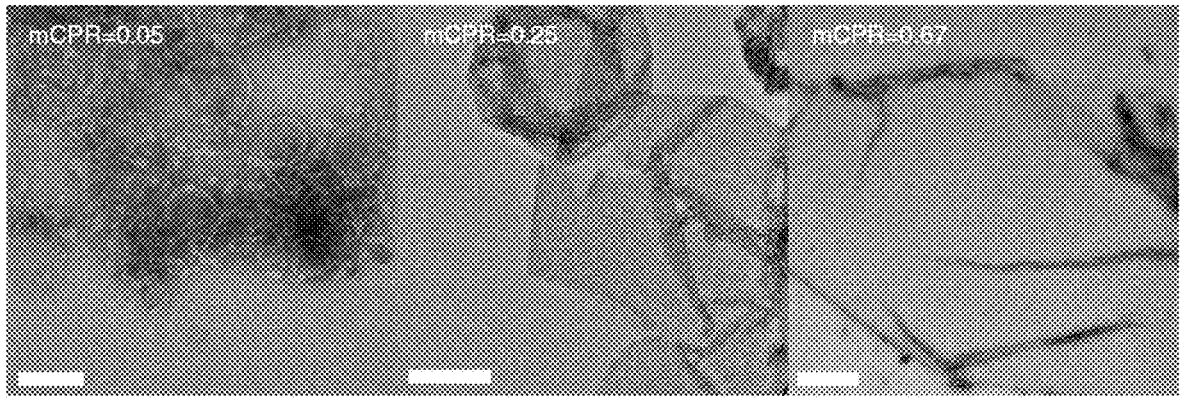
FIGS. 3A-D show that PAP concentration influences the morphology of self-assembled PAP-PB aggregates and PAP channels segregate into 'rafts' in polybutadiene BCP 2D sheet membranes.
Figure 3B:
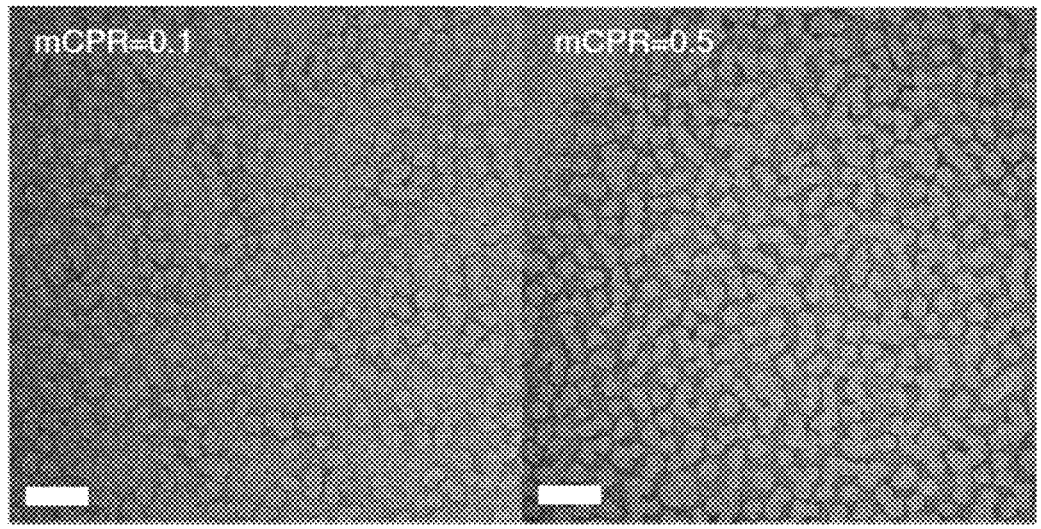
Figure 3C:
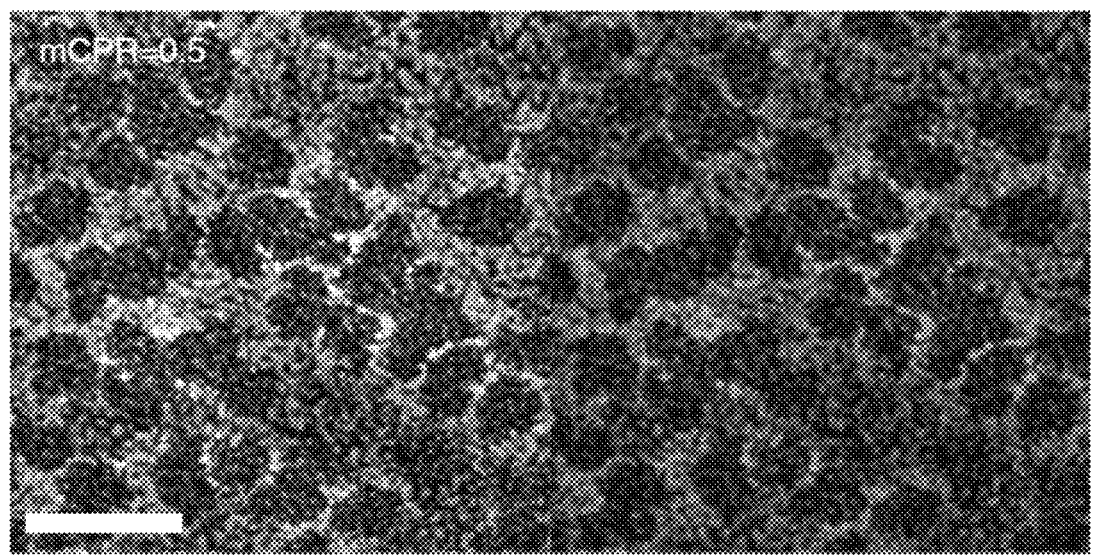

Though PB12 BCPs form micellar structures in aqueous solutions, they can produce highly ordered two dimensional crystals with membrane proteins such as aquaporin 0 (AQP0) and outer membrane protein F after a controlled self-assembly process. Because of the similarity of the bilayer thickness to the length of the PAP channels, we hypothesized that they could be packed with high density in PB12 membranes. We performed dialysis of ternary BCP/PAP channels/detergent mixtures and allowed the detergent to be removed slowly through its critical micelle concentration, which has been shown to be critical for efficient membrane protein insertion. PAP concentration had a significant impact on the morphology of PAP channels/PB12 aggregates after detergent removal. As observed by negative-stain TEM (FIG. 3A), PB12 formed small vesicles at an mCPR of 0.05, large vesicles at an mCPR of 0.1 and large flat sheets at higher mCPR ratios. These transitions in morphology shows that increase in density of PAP channels in the channel-BCPs binary system changed bilayer curvature and resulted in the formation of flat membranes. In contrast to the uniform membrane with packed arrays formed by PAP channels in lipids, PAP channels packed into PB12 membranes exhibited microphase separation as visualized by electron microscopy after negative staining by uranyl formate (FIG. 3B). The uranyl-stained PB-PEO BCPs implied the brighter domains of 20-30 nm in diameter were PAP aggregates and the number of the unstained domains per unit area also increased at higher mCPR ratios (FIG. 3B). Energy filtered TEM and energy dispersive spectroscopy (EDS) (FIG. 3C) mapping confirmed that the microphase separated domains had enriched nitrogen species that are only present in PAP channels and not in PB-PEO BCPs.

Figure 3D:
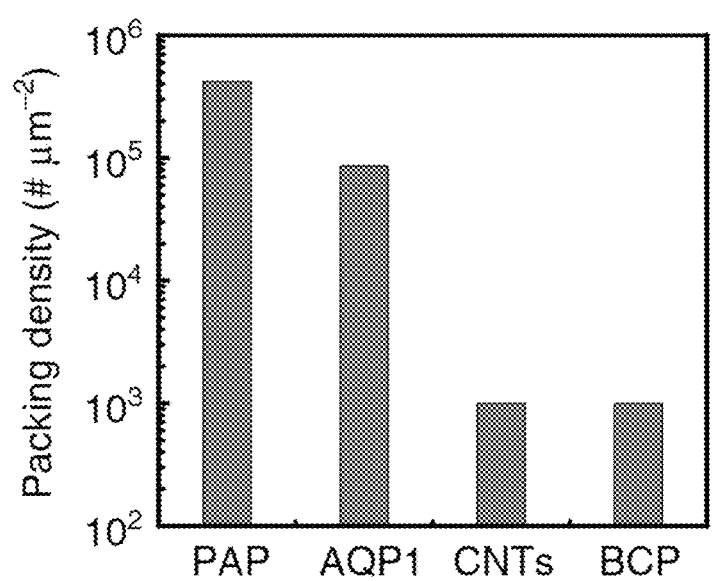

Considering that the entire cross-sectional area of a PAP channel is ~1.5 nm$^2$, the packing density of PAP channels in PB12 membranes at an mCPR of 0.5 (FIG. 3C, right panel) was estimated to be ~4.2×10$^5$/μm$^2$, more than two orders of magnitude higher that packing density of carbon nanotubes (CNTs) (0.1~2.5×10$^3$/μm$^2$) and block copolymer templated nanopore membranes (~10$^3$/μm$^2$) (FIG. 3D). The microphase separation could be attributed to the less favorable interaction between PAP channels and PB12 BCPs compared to those seen between PAP channels and lipids but does not seem to affect the overall packing density of channels which is of similar magnitude to that measured in lipids. We further investigated the lateral diffusion of PAP channels at high concentration in BCPs using fluorescence recovery after photobleaching (FRAP). The FRAP recovery curve of the labeled PAP channels showed two different kinetic regimes: a fast recovery (~40% mobile fraction) with a larger diffusion coefficient of 0.086 μm$^2$/s, and a long recovery (~34% mobile fraction) with a smaller diffusion coefficient of 0.0069 μm$^2$/s. The remaining 26% was the immobile fraction probably due to the interaction between the labeled channels and the support.

PAP[5] Channel 2D Sheet Composite Membranes.

Figure 4A:
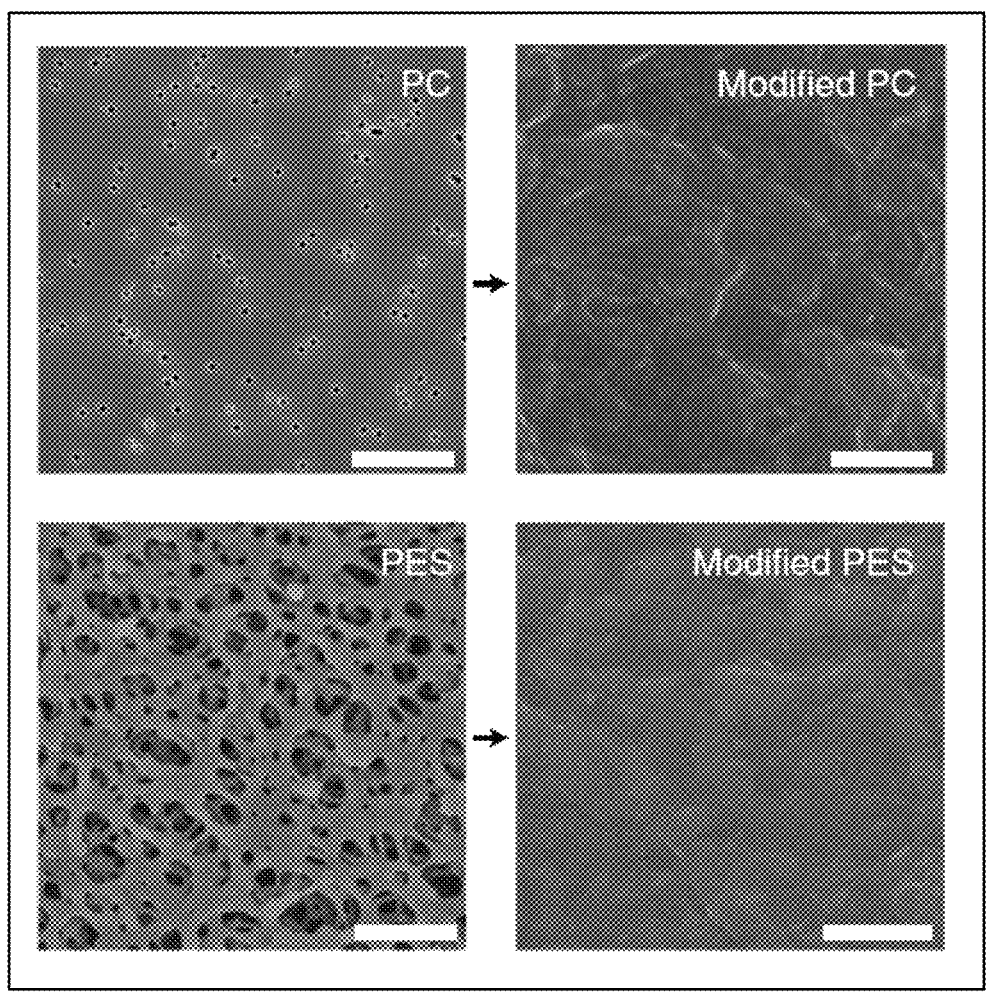
FIGS. 4A-E show 2D sheets of PAP[5] channels could be assembled into composite membranes and demonstrated enhanced performance compared to current commercial membranes in terms of permeability and selectivity.
Figure 4B:
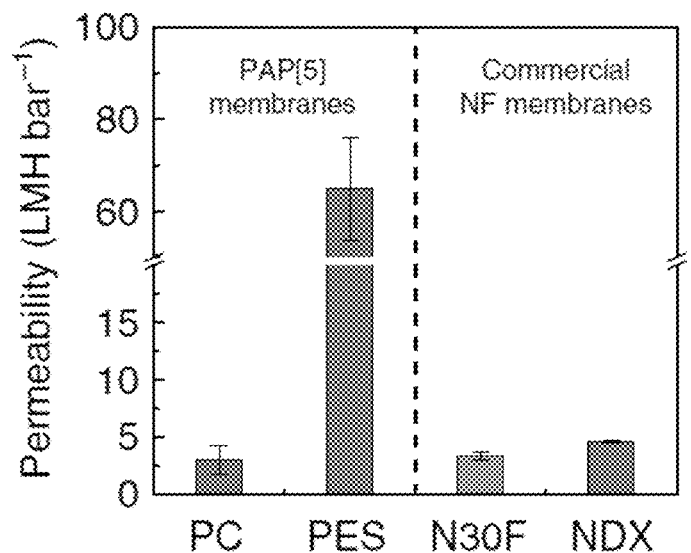
Figure 4C:
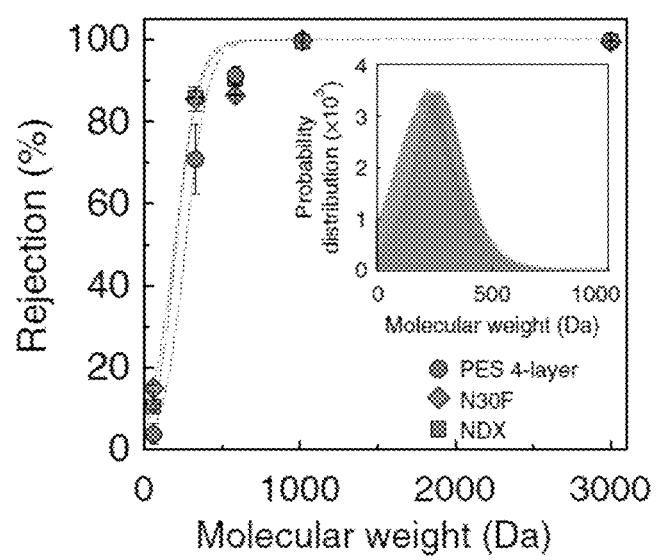
Figure 4D:
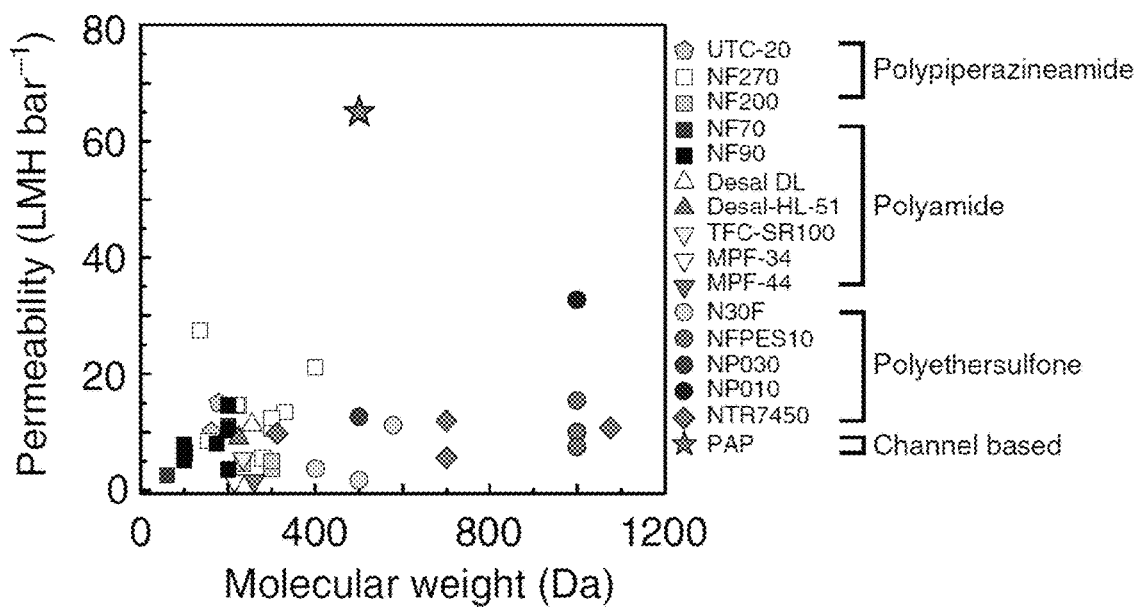
Figure 4E:
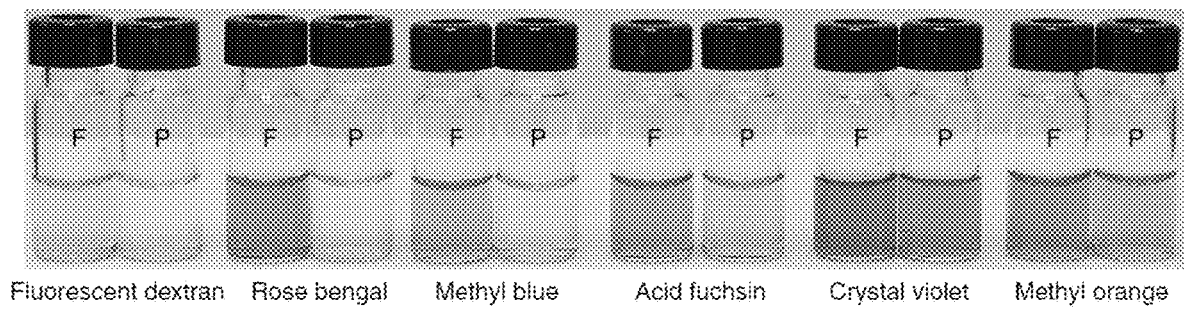
Figure 5:
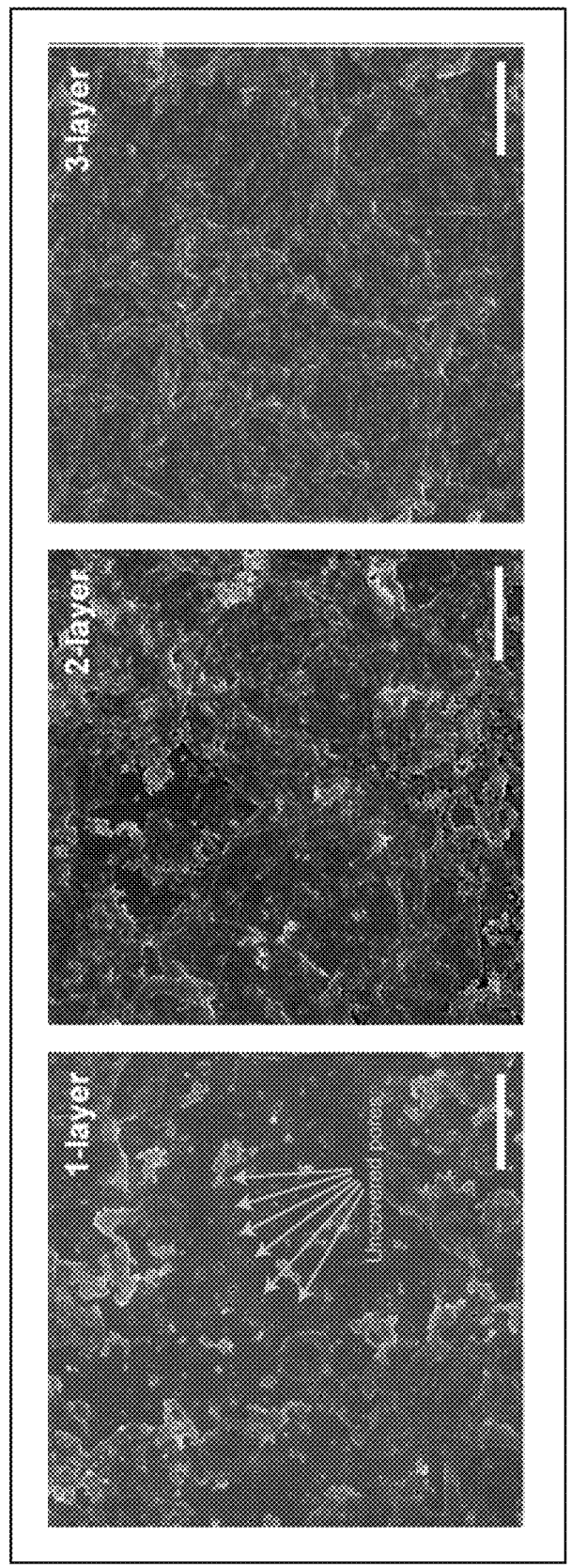
FIG. 5 is a collection of SEM images showing the coverage of PAP[5] 2D sheets on PC membranes after 1, 2 and 3 cycles of layer-by-layer deposition. Scale bar, 2 µm.
Figure 6:
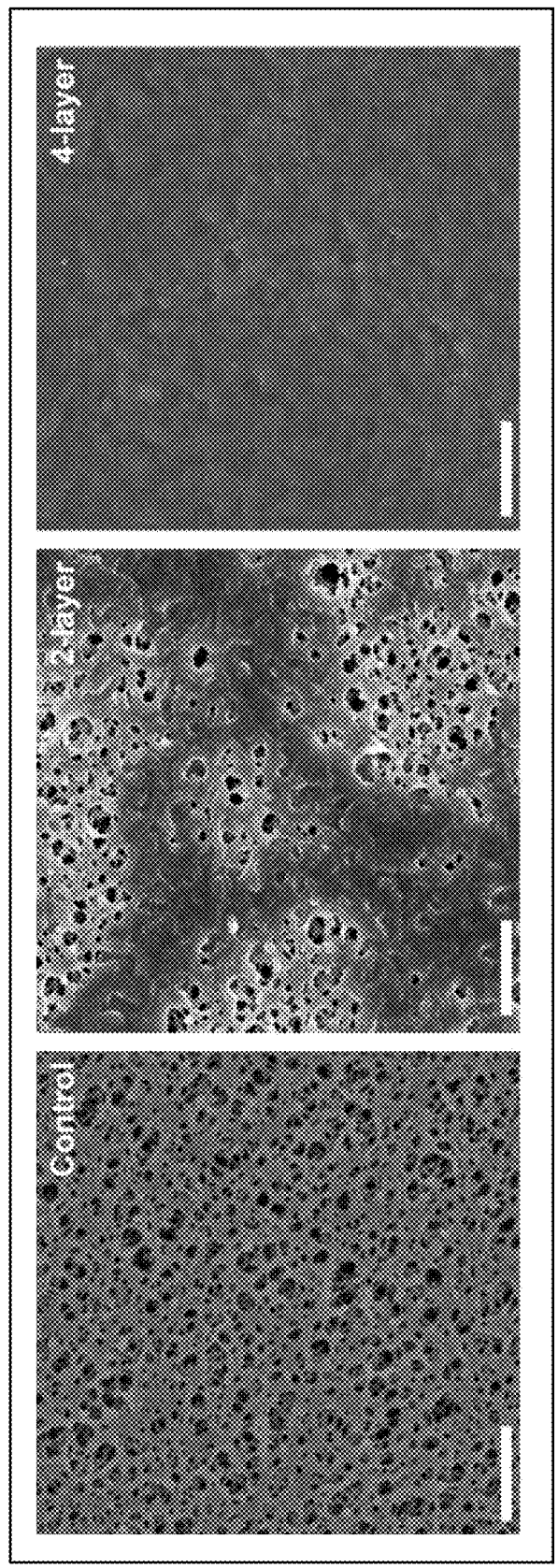
FIG. 6 is a collection of SEM images showing the coverage of PAP[5] 2D sheets on PES membranes after 0, 2 and 4 cycles of layer-by-layer deposition. Scale bar, 2 µm.
Figure 7:
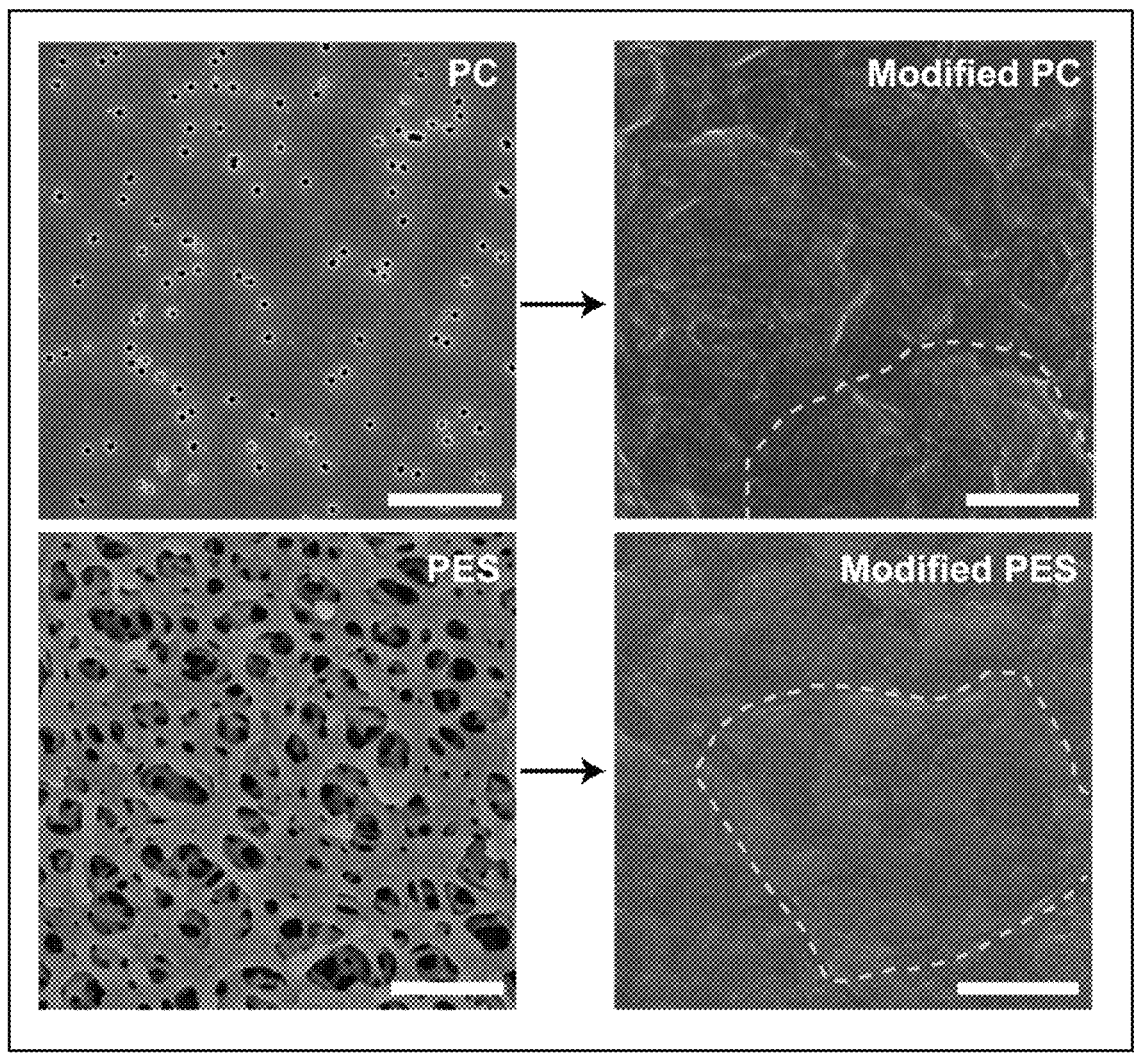
FIG. 7 is a collection of SEM images showing approximately 100% coverage of PAP[5] 2D sheets on PC and PES membranes after 3 and 4 cycles of layer-by-layer deposition, respectively. The dot line indicated PAP[5] 2D sheets. Scale bar, 1 µm.
Figure 8A:
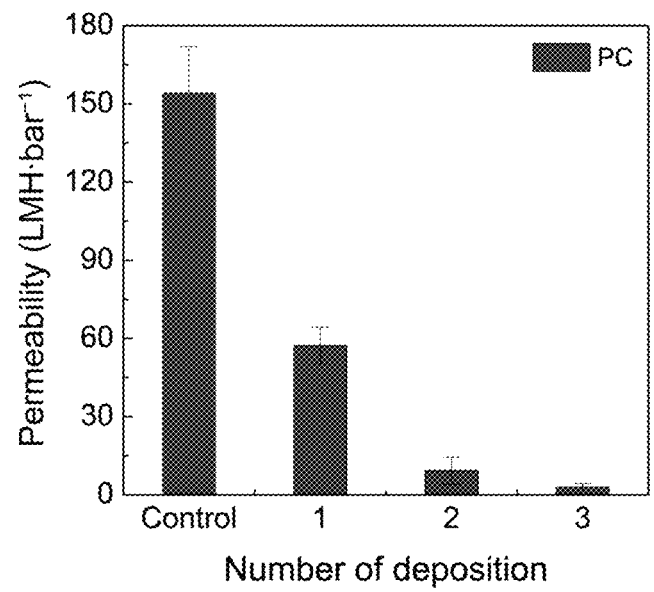
FIGS. 8A-B show that for PAP[5] channels 2D sheet composite membranes, the permeability decreased as the number of depositions increased.
Figure 8B:
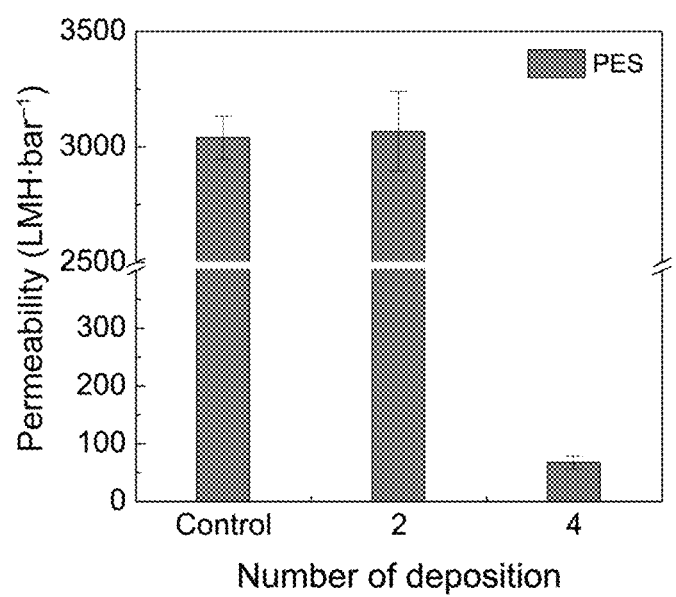
Figure 9A:
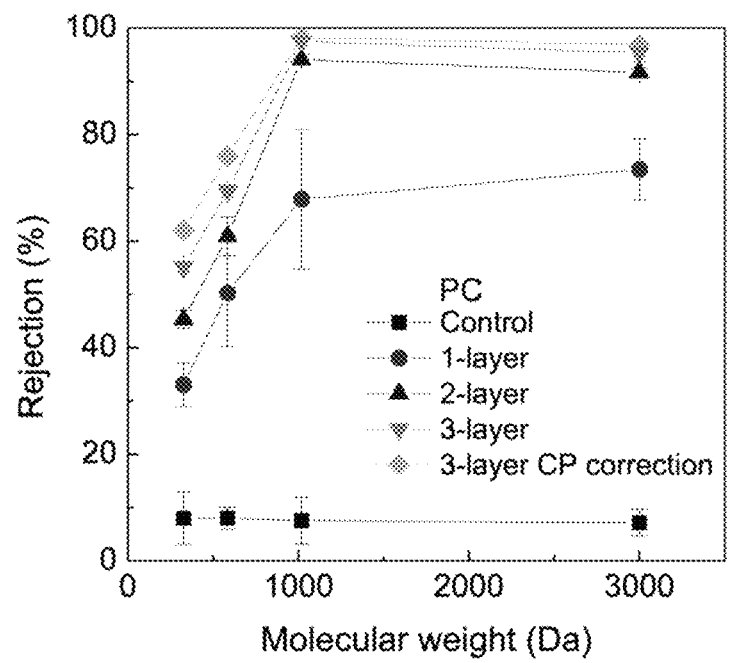
FIGS. 9A-B show that for PAP[5] channels 2D sheet composite membranes, the rejection properties against dye molecules improved as the number of depositions increased. The dye molecules included methyl orange, acid fuchsin, rose bengal and fluorescent dextran.
Figure 9B:
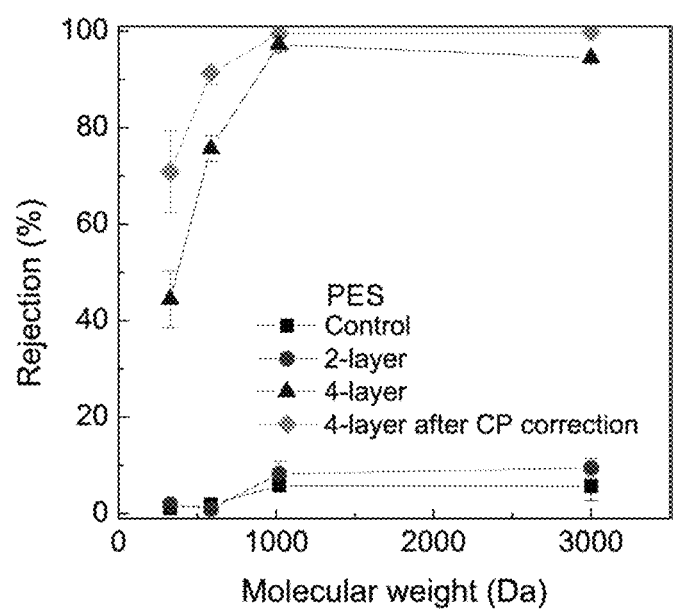
Figure 10:
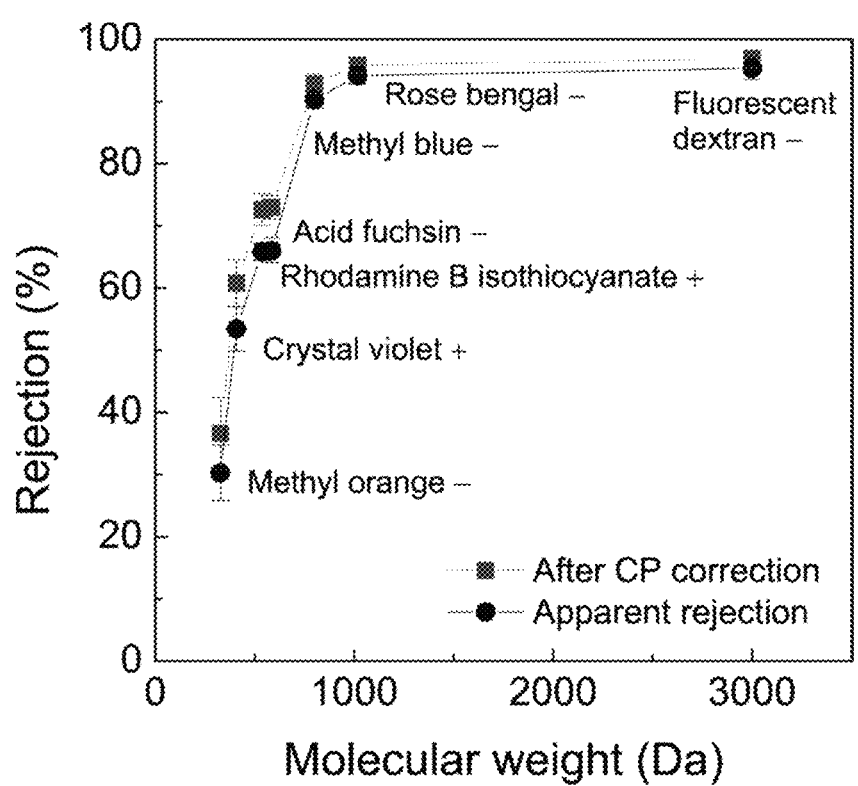
FIG. 10 shows that for PC membranes with 3-layer PAP[5] channels 2D sheet depositions, the rejection properties (both apparent rejection and the rejection after corrected by proposed concentration polarization model) showed a consistent molecular weight cutoff trend to different charged dyes. Data shown are the average of triplicate measurements with standard deviation.
Figure 11:
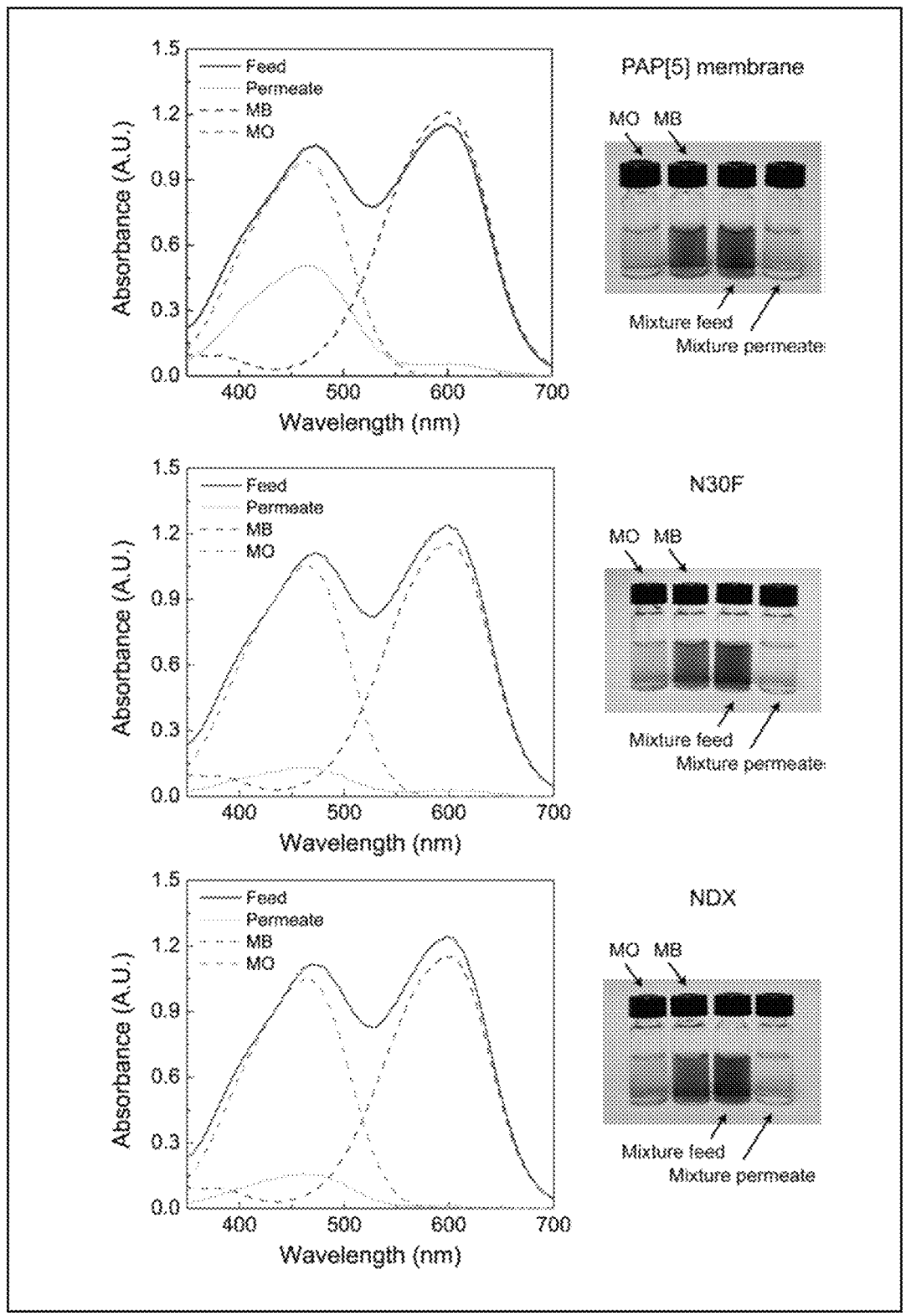
FIG. 11 shows mixed feed filtration experiment with feed solutions containing two dyes (methyl blue (MB), 800 Da and methyl orange (MO), 328 Da) showed complete rejection of methyl blue while showing ~50% passage of methyl orange for PC membranes with 3-layer PAP[5] channels 2D sheet deposition. For commercial membranes N30F and NDX, these membranes almost rejected both two dyes completely although their molecular weight cutoffs are 400-500 Da.

PAP channels formed micron sized 2D sheets or giant collapsed vesicles (FIG. 3), the large aspect ratio of which made them ideal for membrane fabrication. Each PAP channel has 5 carboxylic acid groups at each end of the channel. We functionalized PB12 BCPs with carboxylic groups so that the final 2D sheets were fully carboxylate terminated. A modified layer-by-layer method was then used to immobilize these 2D sheets onto polycarbonate track-etched membranes (PC) and polyethersulfone microfiltration (PES) support membranes with the aid of polyethyleneimine (PEI) (FIG. 1). After 3 and 4 cycles of modification, 2D sheets achieved approximately 100% coverage on PC and PES membranes, respectively as observed by scanning electron microscopy (SEM, FIGS. 5 and 6). The sharp edges of these sheets can be observed in the SEM images at a higher magnifications (FIG. 4A and FIG. 7). The permeability gradually decreased with the increasing cycles of modification (FIG. 8), and reached 3.0±1.2 LMH/bar and 64.8±11.3 LMH/bar for completely covered PC and PES membranes, respectively (FIG. 4B). A series of charged small molecular weight dyes were selected for conducting solute rejection tests. We first performed a filtration test on PEI modified control membranes over a period of 60 minutes to exclude the adsorption effect contributed by polyelectrolytes (FIG. 9) and a similar test protocol was then followed with each of the selected dyes. The rejection properties against dyes improved as the number of depositions increased (FIG. 9). The molecular exclusion limit of PC and PES membranes were ~560 Da and ~450 Da when completely covered with PAP 2D sheets, respectively (FIG. 4C) which is very close to the designed PAP pore which has an exclusion limit of ~500 Da. This size range is significant as only two commercial membranes exist with a MWCO around 500 Da (FIG. 4D) with the whole range of NF membranes shown in FIG. 5D spanning 200-1000 Da exhibiting an average of ~10.0 (±6.6) LMH/bar. The molecular weight cutoff distributions after fitting the solute exclusion data to a sigmoidal curve model showed the composite PES membrane presented a sharper pore size distribution (based on the ratio of standard deviation to average MWCO) compared to two commercial membranes of MWCO around 400-500 Da: N30F and NDX (FIG. 4C), which were also tested using the same dyes. The composite membranes also showed a consistent molecular weight cutoff trend with both positively and negatively charged dyes (FIG. 4E and FIG. 10). Additionally, the channel-based membranes were also able effectively separate a mixture of methyl blue (800 Da) and methyl orange (328 Da) as shown in FIG. 11, while the commercial NF membranes N30F and NDX with a MWCO of 400-500 Da failed to achieve the separation.

Self-Assembly of PAP Channel/Polymer Aggregates

PAP channel/lipid aggregates were produced by a slow dialysis procedure. First, 60 µg PB12 or carboxylic PB12 copolymers and PAP channels (0 to 320 µg) were dissolved in $CHCl_3$ and mixed at different mCPRs. After evaporating $CHCl_3$, the film was dissolved in 60 µl dialysis buffer (10 mM Hepes, 100 mM NaCl and 0.01% (w/v) $NaN_3$ at pH of 7) initially containing 4% (w/v) n-octyl-β-D-glucoside (OG). The PAP channel/polymer mixture was transferred into dialysis buttons with a 12-kDa cut-off membrane, where the final polymer concentration was 1 mg·ml$^{-1}$. The detergent concentration (initially 4%, w/v) was gradually lowered by doubling the dialysis buffer volume with detergent-free buffer every 8 h until the OG concentration in the dialysis buffer reached 0.25% (w/v). The dialysis buffer was then replaced with detergent-free buffer three times every 8 h.

Fabrication and Characterization of PAP[5] 2D Sheets Based Composite Membranes

A modified layer-by-layer method was used to immobilize PAP[5]/PB-PEO 2D sheets on to support membranes. These sheets were made via the slow dialysis method as mentioned above. Carboxylic PB12 copolymers were used so that the final 2D sheets were fully carboxylic terminated. The molar channel to polymer ratio was control within 0.3 to 0.5 to so that the majority of the PAP[5]/PB-PEO aggregates were in the form of giant collapsed vesicles and 2D sheets. The final suspension of 2D sheets contained 0.5 mg·ml$^{-1}$ PAP[5] channels. 50 nm track-etched polycarbonate (PC) membranes and 30 nm polyethersulfone (PES) membranes were used as substrates. They were first treated in a UV/Ozone cleaner for 30 sec in order to ionize the surface (the shiny side) to obtain a negatively charged surface. The cleaned membranes, of 2.5 cm diameter, were placed onto a stainless steel mesh (Transferra Nanosciences Inc., CA) and assembled into a stirred cell. The membranes were covered with 1 ml polyelectrolyte solution containing 40 mM polyethyleneimine (PEI, 60,000 Da) (the concentration was based on the repeat unit molecular weight), 35 mM $CaCl_2$), and 0.5 M NaCl at pH of 5.5. After incubation for 15 min, the solution was discarded, and the membranes were rinsed with DI water and replaced with 10 µl 2D sheets suspension diluted to 1 ml using the same buffer at pH of 8. The suspension was then filtered through the membranes after another 15 min. Thus, 1 layer of PEI and 2D sheets was physically deposited onto the substrates. After a desired number of layers was immobilized, the membranes were incubated overnight with 1 mg·ml$^{-1}$ 1-Ethyl-3-(3-dimethylaminopropyl)carbodiimide (EDC), 1 mg·ml$^{-1}$ N-Hydroxysuccinimide (NHS) and 10 mM potassium phosphate at pH of 7. The incubation chemically-crosslinked the amine groups from PEI and the carboxylic groups from the 2D sheets. We also prepared the membranes only deposited with PEI as control membranes.

Carboxylic PB12 (Table 1) BCPs were used for the block copolymer control membrane fabrication. Free-standing PB-PEO 2D sheets were prepared by a solvent cast method as described elsewhere. Briefly, 3% poly(vinyl alcohol) (PVA) solution in water (w/v %) was spin coated on the top of UV/ozone cleaned silicon substrate at 2,000 rpm. 1% PB-PEO solution in tetrahydrofuran (THF) (w/v %) was prepared by stirring at 600 rpm for over-night, and this solution was drop-casted on the top of PVA layer and the casted PB-PEO layer was annealed during the slow evaporation of THF for over-night. After solvent evaporation, the silicon substrate was gently immersed into water at a tilted angle, allowing the annealed polymer film floating onto the water after dissolution of PVA. The supernatant solution, which is containing free-standing PB-PEO 2D sheets, were used for the block copolymer control membrane fabrication, using the aforementioned layer-by-layer approach.

The modified membranes were dried, sputtered with 8 nm iridium and then characterized on a scanning electron microscope (FEI Nova NanoSEM 630 FESEM, OR) at 5 keV. The d-spacing between PAP[5] based 2D sheets of dry and wet membranes were determined by X-ray diffraction (XRD). The experiments was performed with focused Cu-Ka radiation ($\lambda$=1.5406 Å) at a scan rate of 3° min', with 2θ from 5° to 30° (PANalytical Empyrean, Netherlands). Considering the interference of water molecules on the membrane surface against XRD signals during the state conversion from wet to dry, a tailored protocol was used for wet membrane measurements. Scanning was performed immediately after wetting the membrane, and repeated 4-5 times continuously until a characteristic diffraction peak of dry membrane appeared. The curve with the highest signal intensity before the membrane dried was selected as its lamellar structure. The d-spacing of the modified membranes was calculated using Bragg's law from the characteristic peak.

$$d = \frac{\lambda}{2\sin\theta} \quad (11)$$

Flux was measured at 50 psi, 60 psi and 70 psi, respectively, after the membranes were compressed at 50 psi for 30 min. A series of small molecular weight dyes with different charges were selected for rejection tests. Each dye was dissolved in DI water at a concentration of 35 µM (except for fluorescent dextran, the concentration was 6.7 µM) and loaded into a feed tank (Model RC800, Millipore Corp., MA) that was connected to the 10 ml stirred cell. The stirring speed was 300 rpm. The concentrations of different dye molecules were measured on a UV-Vis spectrophotometer (NanoDrop 2000c, Thermo Scientific, MA). The initial 10 ml filtrate was discarded because of the adsorption by polyelectrolyte PEI. After 10 ml filtration, we observed that the dye concentrations in permeate became constant. The apparent rejection was calculated as $$R = 1 - \frac{c_{permeate}}{c_{feed}} \quad (12)$$

We observed significant dye rejections of the PAP[5] based membranes, which indicated a severe concentration polarization in the stirred cell, despite of the 300 rpm stirring employed. The concentrations of feed should be replaced with the dye concentrations on the membranes. The actual rejection should be calculated as the following equation and can be corrected using the stagnant film model[28,29], $$R' = 1 - \frac{c_{permeate}}{c_{membrane}} = \frac{R}{R + e^{-\frac{J}{k}}(1-R)} \quad (13)$$

Here mass transfer coefficient 'k' for each dye can be determined from Colton-Smith empirical correlation[29-31], $$Sh = 0.285\ Re^{0.567}Sc^{0.33} (8 \times 10^3 < Re \le 3.2 \times 10^4) \quad (14)$$

$$Sh = 0.0443\ Re^{0.746}Sc^{0.33} (3.2 \times 10^4 \le Re < 8.2 \times 10^4) \quad (15)$$

where Reynold number, $Re = \rho \omega r^2 / \mu$, Schmidt number, $Sc = \mu/(\rho D)$ and Sherwood number, $Sh = kr/D$ with $\rho$, $\omega$, $\mu$, $D$ and $r$ being density, rotation speed (in radians per sec), viscosity, diffusivity and stirred cell effective radius (8.5 mm) respectively. J is the volumetric flux through the membrane. Diffusivity D can be calculated from Stokes-Einstein equation, $$D = \frac{kT}{6\pi\mu a} \quad (16)$$

where k, T and a being Boltzmann constant, temperature and molecule radius respectively. Molecule radius a (nm) is estimated from the following equation, $$a = 0.066 M^{1/3} \quad (17)$$

where M being the molecular weight. We assume each dye molecule has the simplest shape, a sphere, and the partial specific volume is similar to that of proteins.

We use a simple logistic function (a type of sigmoid function) to characterize the S-shaped curve of the molecular weight cutoff data and its derivative is a continuous probability distribution, which is a probability density function can be used to determine the pore size distribution.

$$y = \frac{1}{1 + e^{-\gamma x + \beta}} \quad (18)$$

$$y' = \gamma \frac{e^{-\gamma x + \beta}}{(1 + e^{-\gamma x + \beta})^2} \quad (19)$$

The standard deviation ($\sigma$) of this pore size distribution is $$\sigma = \frac{\pi}{\sqrt{3}\gamma} \quad (20)$$

Discussion

The composite membranes (especially modified PES membranes with porosity one order of magnitude higher than that of PC membranes) had a permeability of ~60 LMH/bar and a cutoff of 450 Da. In order to confirm the contribution of channels to molecular exclusion, we first performed a block copolymer control membrane test without PAP channels. Because the $PB_{12}$-$PEO_8$ only forms micelles or small vesicles during aqueous based self-assembly, synthesizing a control membrane using aqueous self-assembly alone was found to be excessively difficult. As an alternative, we adopted a solvent casting based method) and fabricated a fully covered block copolymer control membrane. The control membrane displayed a low permeability (~0.1 LMH/bar), and almost complete rejection (~96%) of the smallest dye used in this work (MO, 328 Da). This indicates that the high water transport permeability and the MWCO of ~500 Da are attributed primarily to the transport characteristics of the PAP channels, and not from the block copolymers themselves. Secondly, the d-spacing between laminar 2D sheets was determined by X-ray diffraction as conducted in similar studies for laminar graphene oxide membranes. This d-spacing was found to be 1.5 nm for wet membranes, a spacing that is expected to allow a globular molecule of ~1 kDa to be accommodated. This result indicates that the rejection from our membranes was mainly contributed by normal flow through PAP channels within these 2D sheets rather the lateral flow between two sheets (defects) and then transverse flow between the sheets as in laminar graphene oxide and graphene membranes. Additionally, we evaluated the effects of a background electrolyte on the rejection of dyes. This was done to assess the potential contributions of electrostatic interactions to the solute rejection mechanism. The filtration experiments were performed at various ionic strengths. At the highest values of ionic strength the Debye length ($\lambda_D$) of the solutions became comparable or even smaller than pore diameter of the PAP channel. In this limit, the electrostatic interactions between the membrane and solutes are effectively screened and electrostatic repulsion does not contribute significantly to the solute rejection mechanism. Both rose bengal and acid fuchsin demonstrated minimal changes in rejection over this wide range of ionic strengths. This observation strongly indicates that the electrostatic interactions between solute and membrane do not contribute significantly to the solute rejection mechanisms of these channel based membranes.

The aforementioned experiments demonstrated that the channel-based size exclusion is the major transport mechanism for our composite membranes. The permeability measured was of the same order of magnitude as calculated values from osmotic permeability measurements from stopped flow experiments, with the measured permeability ~2-3 times larger. Given the uncertainties and differences in testing at these two very different scales ($nm_2$ vs. $cm^2$ scale) and techniques (osmotic shock vs. pressure driven flow with concentration polarization), we consider this agreement excellent. In terms of the rejection profile, the MWCO curve was sharper than those of commercial membranes (FIG. 4C). The obtained sigmoidal model does not completely rule out that some transport could occur through channels or defects of sizes different than the 5 Å pore size of the channels across these composite membranes but nevertheless indicates excellent performance of these first generation membranes. Possible defect mechanisms may include transport through the interlayer of the layer-by-layer structure, leakage through gaps between the block copolymer and the channels, diffusion through the block copolymer polymer matrix itself, and leakage through uncovered substrate pores. During our fabrication, we tried to minimize leakage to the best of our ability. The d-spacing analysis demonstrated the rejection was mainly from the normal flow through PAP pores, but the lateral flow between layers could still have contributed to the overall flow. We also performed multiple layer-by-layer depositions and post chemical crosslinking to enhance the membrane integrity. In the long term, a fully crosslinked polymer matrix with better physical and chemical compatibility with channels is desired, and the fabrication process could be further optimized. However, due to our ability to generate close to defect-free composite membranes, the permeability of the current PAP channel based membrane is several times higher than current commercial nanofiltration and ultrafiltration membranes with MWCOs from 200 Da to 1 kDa (FIGS. 4C and 4D), and its angstrom-scale separation was also demonstrated to be significantly enhanced over that of those commercial NF membranes as seen from an example dye mixture separation experiment (FIG. 11).

In terms of salt rejection, although PAP channels showed a similar order of magnitude ion selectivity ($K^+/Cl^-$ ratio of 10, corresponding to a permselectivity of 0.83) from patch clamp experiments based on anion exclusion as reported in a recently published CNT porin paper ($K^+/Cl^-$ ratio of 80, corresponding to a permselectivity of 0.98), we did not observe high NaCl rejection during hydraulic pressure assisted filtration tests predicted by this recent study despite having a similar functionalization degree at the pore entrance. This difference is indicative of challenges in translating molecular transport properties, especially those from patch clamp experiments for solute transport on channels, to filtration performance. We hypothesize that artificial channels with smaller pore sizes than 5 Å may be needed for complete rejection of salts in a membrane context. We also recognize the possibility of imperfections in the polybutadiene domain of the polymer, particularly where they surround the channel leading to leakage of small solutes such as salts. A better understanding of polymer channel physical and chemical mismatch may allow selection and use of polymers that may be less susceptible to these possible defects.

In summary, we have fabricated a completely biomimetic membrane that consists of densely packed PAP artificial water channels. The resulting membrane maintained high permeability and, more importantly, maintained selectivity expected from the molecular design of these PAP channels. This approach, combining versatile supramolecular chemistry with careful self-assembly and membrane fabrication, could allow membranes with precisely designed angstrom-scale pore size to be constructed for the next-generation liquid and gas separations.

Example 2: Rapid Fabrication of Precise, High-Throughput Filters from Membrane Protein Nanosheets Channel proteins can be regarded as ideal pore geometries because they exhibit transport properties targeted towards specific small molecule separations, which are necessary to maintain cellular functions. In vivo, passive β-barrel channel proteins are used for the exclusion of large molecules (such as proteins) while allowing or inducing ion and small molecule permeation (e.g., sugars and antibiotics). The stability and mutation tolerance of β-barrel proteins make them ideal candidates for the development of channel protein-based membranes. Additionally, the β-barrel structure is a robust scaffold with high thermodynamic stability, and can be incorporated in an oriented and functionally-active form within lipid bilayers and amphiphilic polymers. Their high structural stability can be attributed to the low enthalpies of denaturation of the transmembrane domains. These precisely-sized and stable protein channels were used in this example for the scalable fabrication of high performance biomimetic membranes.

Figure 12A:
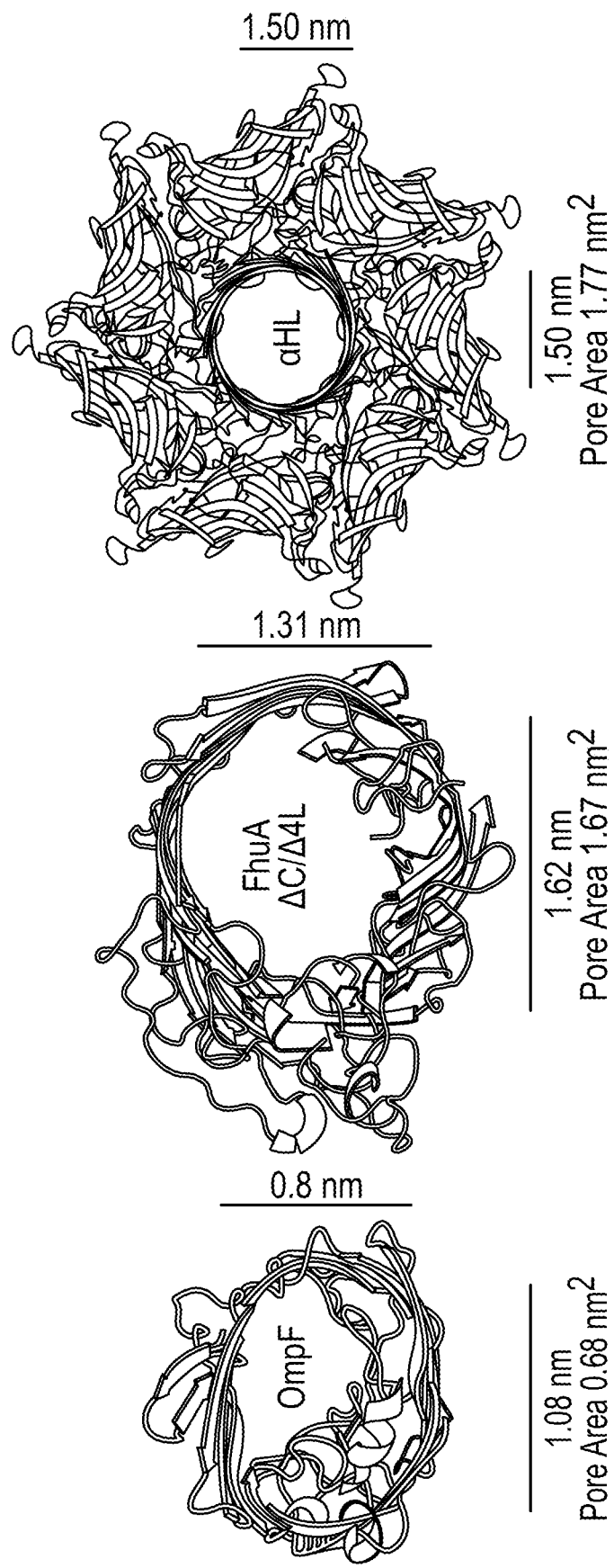
FIGS. 12A-C show stable β-barrel channel protein-polymer-based scalable membranes.
Figure 12B:
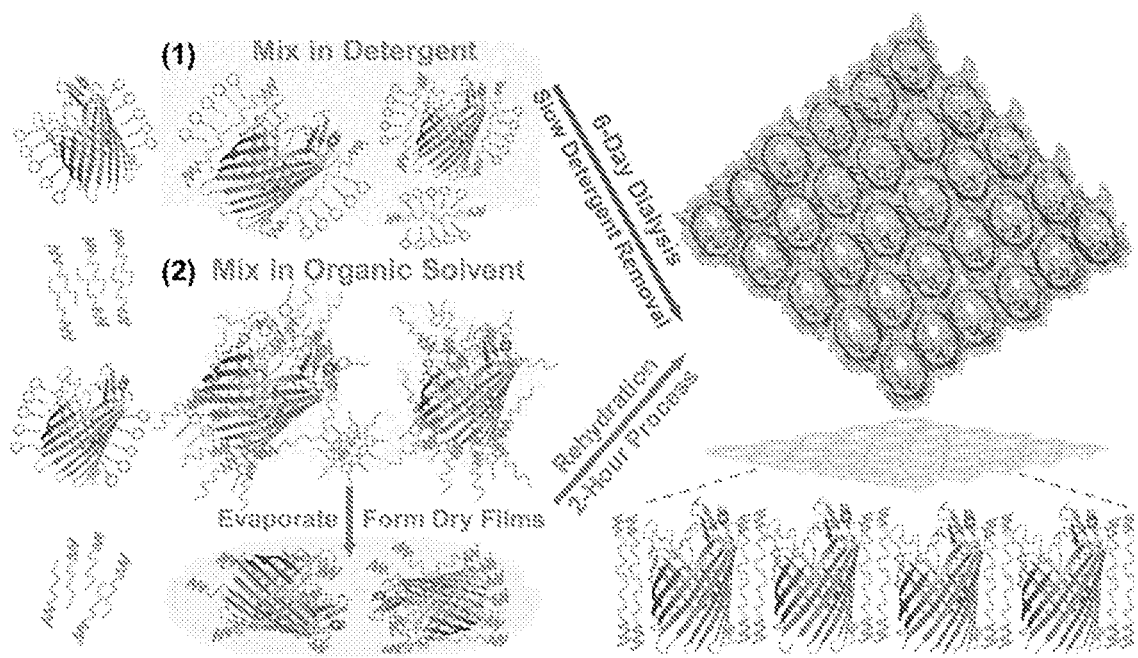
Figure 12C:
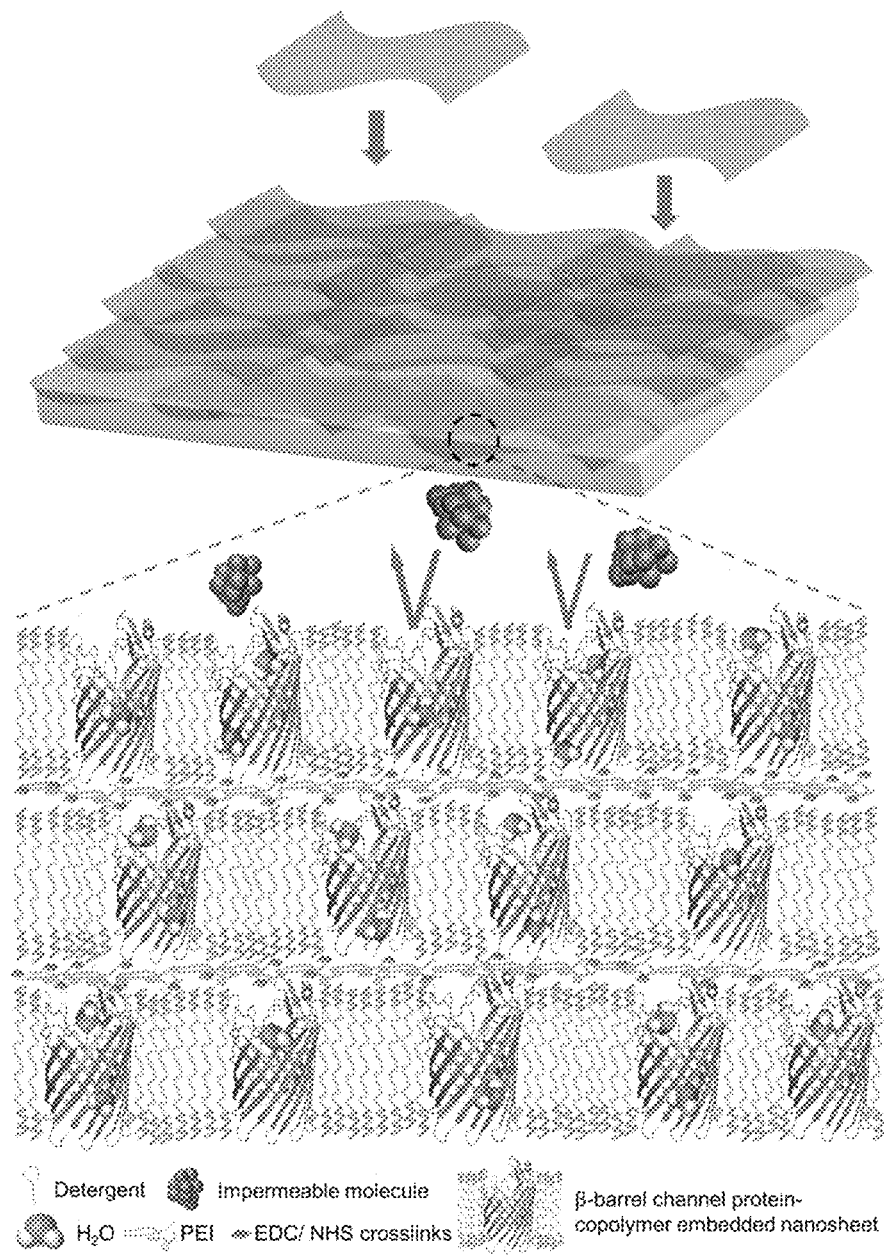

In this example, we present a comprehensive approach to construct biomimetic membranes beginning with the scalable synthesis of two-dimensional (2D) crystals and nanosheets that contain a high packing density of β-barrel proteins. (FIG. 12). The membranes fabricated from these 2D materials showed significant improvements in membrane productivity (water permeability) and maintained designed selectivity as a result of the high porosities and unitary pore shapes of the protein channels. Three different pore-forming β-barrel channel proteins, outer membrane protein F (OmpF), a mutated version of a bacterial ferrichrome outer membrane transporter (designated FhuA ΔC/Δ4L), and a channel forming protein toxin from *Staphylococcus aureus*, alpha-hemolysin (αHL), were selected to demonstrate this approach. These proteins possess unique elliptical pore dimensions of 0.8×1.08 nm, 1.31×1.62 nm, and 1.50×1.50 nm for OmpF, FhuA ΔC/Δ4L, and αHL, respectively (FIG. 12A). Simultaneously achieving precise control over pore sizes in this range, while maintaining uniformity in pore size and achieving a high porosity, is quite difficult using current membranes. Membrane protein (MP) 2D crystal arrays or nanosheets were created by reconstituting these channel proteins into poly(butadiene)-b-poly(ethylene oxide) (PB-PEO) di-block copolymers (BCPs) through two self-assembly strategies: detergent removal by dialysis (dialysis method) and self-assembly from BCP-MP films deposited using organic solvent evaporation (solvent method) (FIG. 12B). The prepared 2D crystals or nanosheets were deposited onto commercial porous support membranes using a layer-by-layer technique to form continuous and defect-free selective layers (FIG. 12C). Water permeability of all tested channel-based membranes showed orders of magnitude improvements (20-1000×) over current polymeric nanofiltration (NF) membranes with comparable molecular exclusion ratings. These permeabilities were 293±51 L $m^{-2}h^{-1}$ $bar^{-1}$ (denoted as LMH $bar^{-1}$), 793±226 LMH $bar^{-1}$, and 2,107±235 LMH $bar^{-1}$ (all values mean±s.d., n≥3) for OmpF, FhuA ΔC/Δ4L, and αHL-based biomimetic membranes, respectively. Additionally, these membranes exhibit the molecular exclusion performance inferred from their structures with molecular weight cut-offs (MWCOs) of ~480, ~1,130, and ~930 Da for OmpF, FhuA ΔC/Δ4L, and αHL-based membranes, respectively. These results demonstrate the potential of utilizing β-barrel channel proteins to tailor membrane selectivity within a critical separation range, while realizing high permeability enhancement.

Reconstitution of β-Barrel Protein Channels into Porous 2D Nanosheets 2D materials with uniformly-sized internal pores have various advantages in terms of membrane development. Porous sheet-like structures can be used to form defect-free but thin selective layers that lead to high productivity. Unitary pore structures can provide desirable molecular selectivity properties based primarily on molecular sieving effects.

Figure 13:
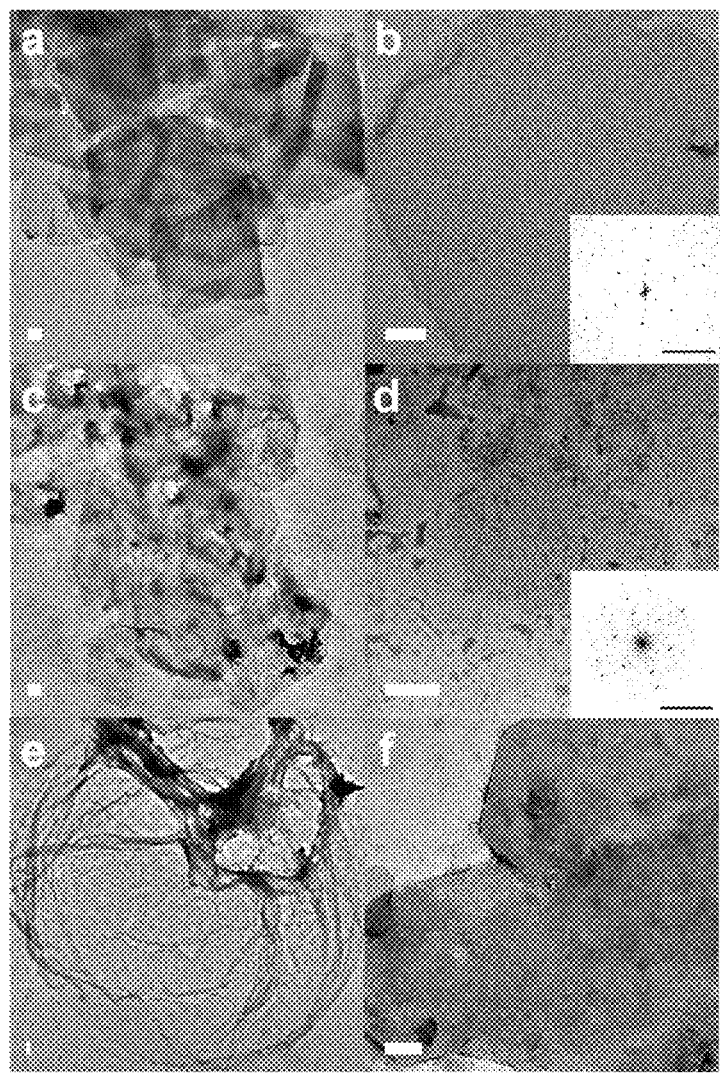
FIG. 13 shows 2D crystals or nanosheets of three β-barrel channel proteins reconstituted in BCP membrane matrices. Negative-stain transmission electron microscopy (TEM) images of OmpF 2D crystals prepared by dialysis (panel a) and solvent method (panel c) illustrates the characteristic morphologies of microscale 2D flat nanosheets. TEM images at high magnification with diffraction spots (insets) by fast Fourier transformation (FFT) of OmpF crystal images formed by dialysis (panel b) and solvent method (panel d) reveal the high degree of protein incorporation and crystalline structures. Negative-stain TEM images of αHL nanosheets (panel e) and FhuA ΔC/Δ4L (panel f) constructed by a dialysis method demonstrate 2D nanosheet formation. The scale bar is 100 nm and the scale bar in the insets is 10 $nm^{-1}$.

Three pore-forming β-barrel membrane proteins, OmpF, FhuA ΔC/Δ4L, and αHL, were selected based on their unique pore dimensions of 0.8×1.08 nm, 1.31×1.62 nm, and 1.50×1.50 nm, respectively, and reconstituted into 2D porous nanosheet structures. Amphiphilic PB-PEO BCPs were used as membrane matrices due to their higher chemical and mechanical stability compared to native lipids as well as their physical and chemical compatibility for membrane protein insertion. We first used a dialysis-based method for the formation of 2D nanosheet structures. In this method, the assembly kinetics of the proteins and BCPs are controlled through the gradual removal of high concentrations of detergents from a ternary mixture of protein, BCP, and detergent via dialysis (FIG. 12B). Assembly of OmpF proteins and PB-PEO BCPs using this method resulted in hexagonally-packed 2D protein crystals at protein to polymer ratios (PoPR, w/w) of 0.2-0.6. As observed by negative-stain transmission electron microscopy (TEM), micron-scale BCP-OmpF crystals were formed using the dialysis methods (FIG. 13). Fast Fourier transform (FFT) analysis of the electron diffraction pattern from TEM with the Focus software (FIG. 13) identified a hexagonal unit cell with lattice dimensions of a=b=~18 nm and γ=120°. These dimensions are similar to those reported in our previous study on BCP-OmpF 2D crystals and indicates a pore packing density of ~3.2×10$^4$ pores μm$^{-2}$. This pore density represents the ultimate packing density of OmpF in block copolymers and demonstrates that the protocols we use for MPs leads to a high performance material and provides a way to get over the limited packing density of ~10$^3$ pores μm$^{-2}$ in vesicle-based systems. A similar dialysis protocol was also applied to FhuA ΔC/Δ4L and αHL proteins with PoPR of 0.2-0.35 and 0.25-0.4, respectively, in order to prepare highly packed MP-BCP 2D nanosheets. Both FhuA ΔC/Δ4L and αHL proteins were successfully integrated into 2D nanosheet structures (FIG. 13). No evidence of crystallinity was seen for these two proteins.

Removing detergents via dialysis is a well-established, but slow method of preparing MP 2D crystals and nanosheets in lipids and more recently in polymers. Generally, this process takes 3~6 days to be completed. Furthermore, MP-BCP 2D crystal formation by dialysis requires a large amount of specialty non-ionic detergent per preparation, which could be a factor limiting the scalability of this technique. Hence, to shorten the time required for 2D nanosheet assembly and minimize the usage of detergents, we explored a new approach to prepare 2D protein crystals and nanosheets, which is referred to as the solvent method in this work. The solvent method utilized included three steps: (1) mixing proteins and BCPs in a methanol/chloroform (MeOH/CHCl$_3$) mixture (50% v/v) at specific PoPRs, (2) evaporating solvents to form protein/BCP films on glass surfaces, and (3) rehydrating the protein-BCP films using aqueous buffer solutions (FIG. 12B). The hydrophobic outer surfaces of the selected MPs allowed them to be readily dissolved in the MeOH/CHCl$_3$ solvent mixture. The solvent method required just ~2 hours with much lower detergent use and is thus more time and resource efficient. The success of using the solvent method in the preparation of porous protein nanosheets was confirmed by TEM analysis. OmpF-BCP nanosheets prepared using the solvent method showed identical crystal forms to the OmpF crystals (hexagonal unit cells as inferred from the FFT patterns) prepared using the dialysis method (FIG. 13). Successful formation of nanosheets of αHL and FhuA ΔC/Δ4L proteins was also identified by TEM analysis.

Integration of Porous Channel Nanosheets into Scalable Membranes

Figure 14:
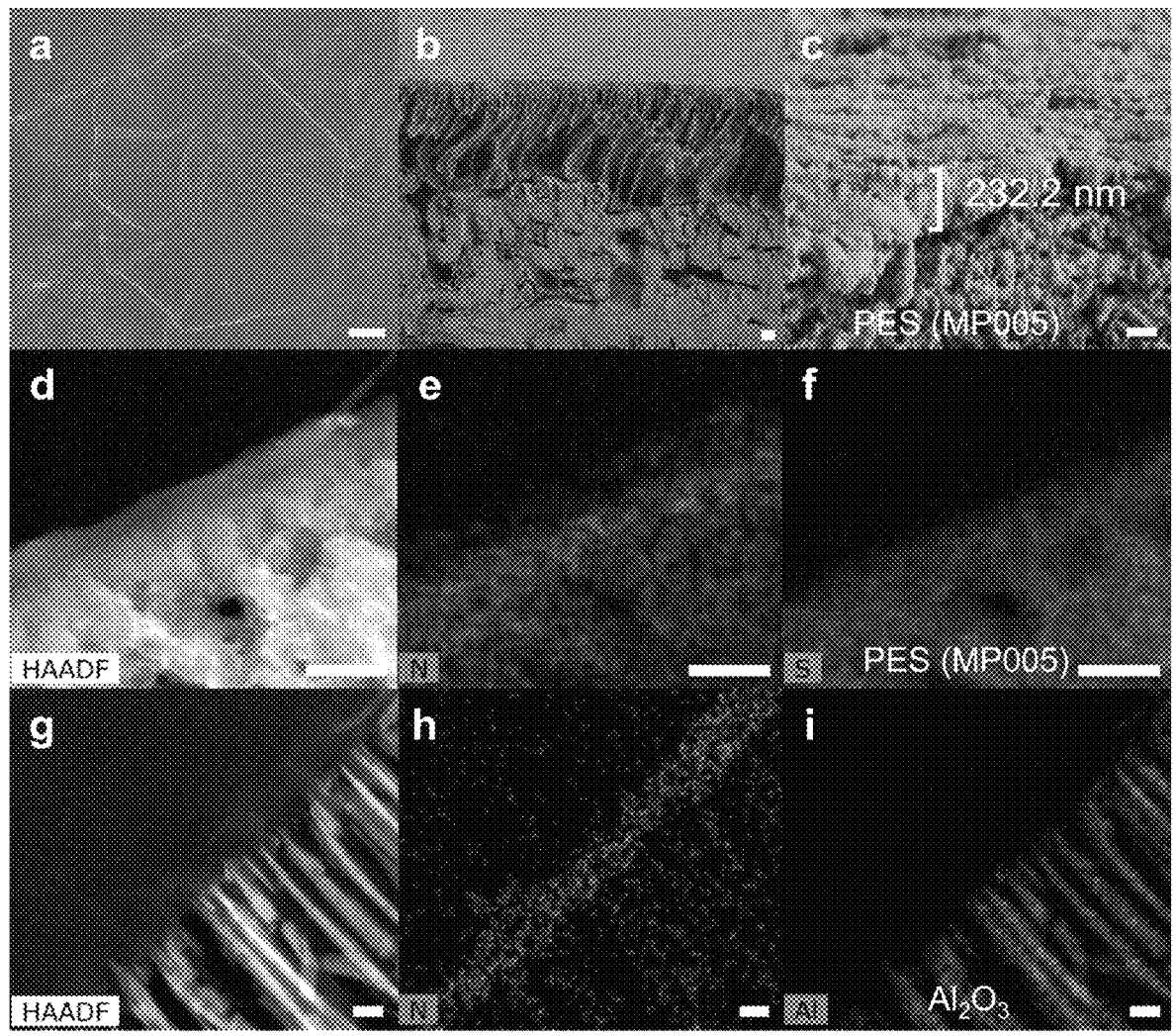
FIG. 14 shows 2D OmpF nanosheets can be assembled on a polycarbonate (PC) and polyethersulfone (PES, MP005) substrate. Panel a is a top view of a scanning electron microscopy (SEM) image of a single OmpF crystal on a PC support. The scale bar is 1 Panel b is an overview of a cross-sectional Cryo-SEM image of OmpF 2D nanosheets on a PES substrate. The scale bar is 20 Panel c is a cross-sectional Cryo-SEM image of a deposited selective layer of OmpF nanosheets on a PES (MP005) substrate, thickness of OmpF-embedded scalable membrane was measured at 232.2±24.8 nm. Panel d shows a high-angle annular dark field (HAADF) STEM image of OmpF 2D nanosheets fabricated on the PES (MP005) substrate with elemental maps of nitrogen (panel e) and sulfur (panel f). Panel g shows a high-angle annular dark field (HAADF) STEM image of OmpF 2D nanosheets fabricated on the aluminum oxide substrate with elemental maps of nitrogen (panel h) and aluminum (panel i). The scale bar is 200 nm.

The formation of thin selective layers created through the deposition of 2D nanosheets on porous support membranes has been demonstrated recently for graphene oxide sheets and metal-organic frameworks nanosheets. Recently, we developed a modified layer-by-layer deposition technique to fabricate artificial water channel-based membranes from 2D sheets of polymer-channel composites (Example 1). This method was adapted for membrane fabrication here. In FIG. 14, a scanning electron microscopy (SEM) micrograph demonstrates the representative deposition of a hexagonal micron-sized OmpF crystal on the surface of a track-etched polycarbonate (PC, Whatman® Nuclepore™, UK) substrate. For molecularly-thin multi-layered membrane development, selective layer stability is a critical challenge that must be addressed because the constituent layers are susceptible to delamination if the interlayer interactions are weak. Therefore, to confer stability to the membranes, PB-PEO BCPs with carboxylic acid-terminated PEO blocks were used in crystal formation. The carboxylic acid groups were chemically crosslinked with the amines of the polyethylenimine (PEI) polymer layers deposited between each layer of nanosheets (FIG. 12C). To optimize the membrane fabrication process, OmpF-membranes prepared with different number of deposition layers were tested and it was identified that at least six-repeating depositions (6-layered membranes) were required to achieve ~100% coverage of nanosheets on the support membranes, as shown in a cross-sectional overview of a cryogenic scanning electron microscopy (cryo-SEM) image (FIG. 14). This claim is further supported by the transport characteristics of the membranes, which are discussed in more detail in the following section. The selective layers of 6-layered OmpF-membranes were around 250 nm thick. High-resolution scanning TEM (STEM) and energy dispersive spectroscopy (EDS) mapping suggested that enriched nitrogen species were present at or near the surface and sulfur elements only appeared at the bottom support, indicating the formation of the OmpF-nanosheet selective layers on top of the a commercial polyethersulfone (PES, MP005, Microdyn Nadir™) support. Some nitrogen species shown within the PES (MP005) membrane may be attributed to the penetration of the N-containing chemical crosslinkers throughout the fabrication process and of some OmpF 2D nanosheets during the pressure-driven deposition process. Further demonstration of OmpF-membrane deposited on an aluminum oxide (Al$_2$O$_3$)-based membrane (0.02 μm Anodisc, Whatman®) showed a clear boundary between OmpF-BCP nanosheet selective layers (nitrogen enriched) and Al$_2$O$_3$ substrates (aluminum enriched) by EDS mapping. The fabrication of OmpF 2D nanosheets on polymeric and inorganic substrates indicates the versatility of the layer-by-layer fabrication process employed.

Membrane Performance of β-Barrel Channel Protein-BCPs Biomimetic Membranes

Figure 15A:
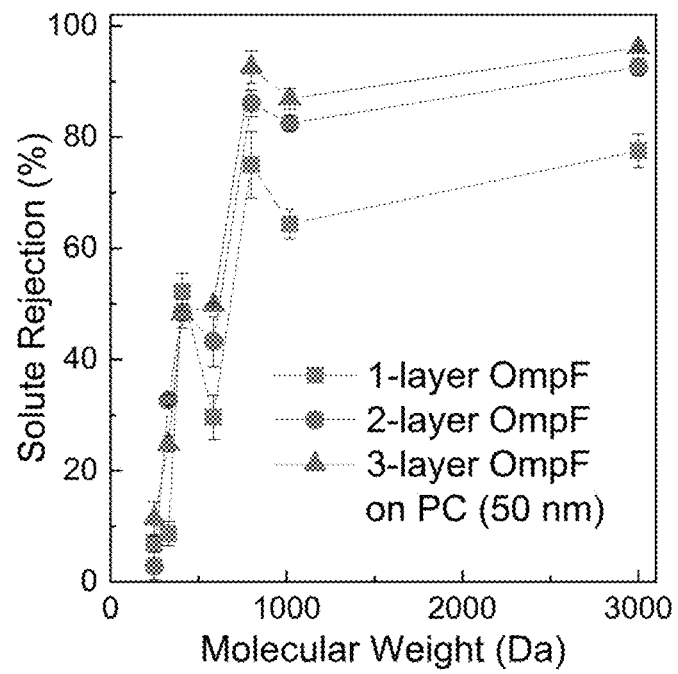
FIGS. 15A-B show the rejection properties of OmpF 2D nanosheet-embedded membranes improved as the number of deposited layers increased.
Figure 15B:
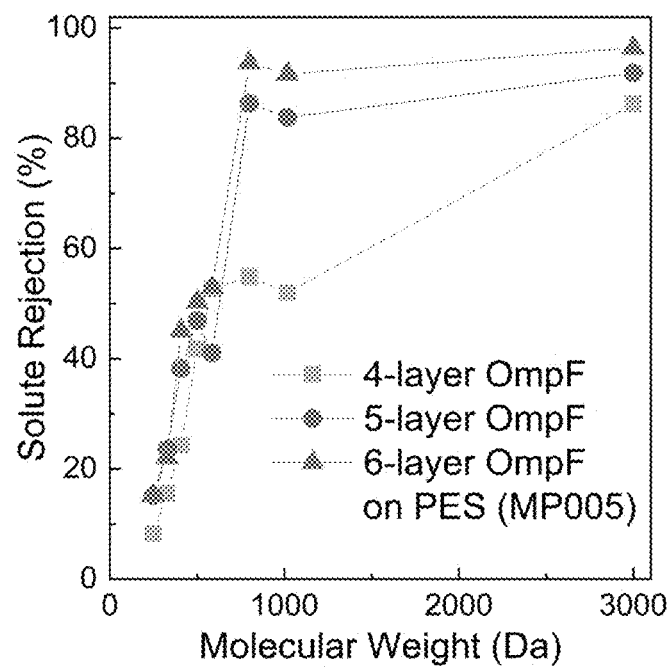
Figure 16A:
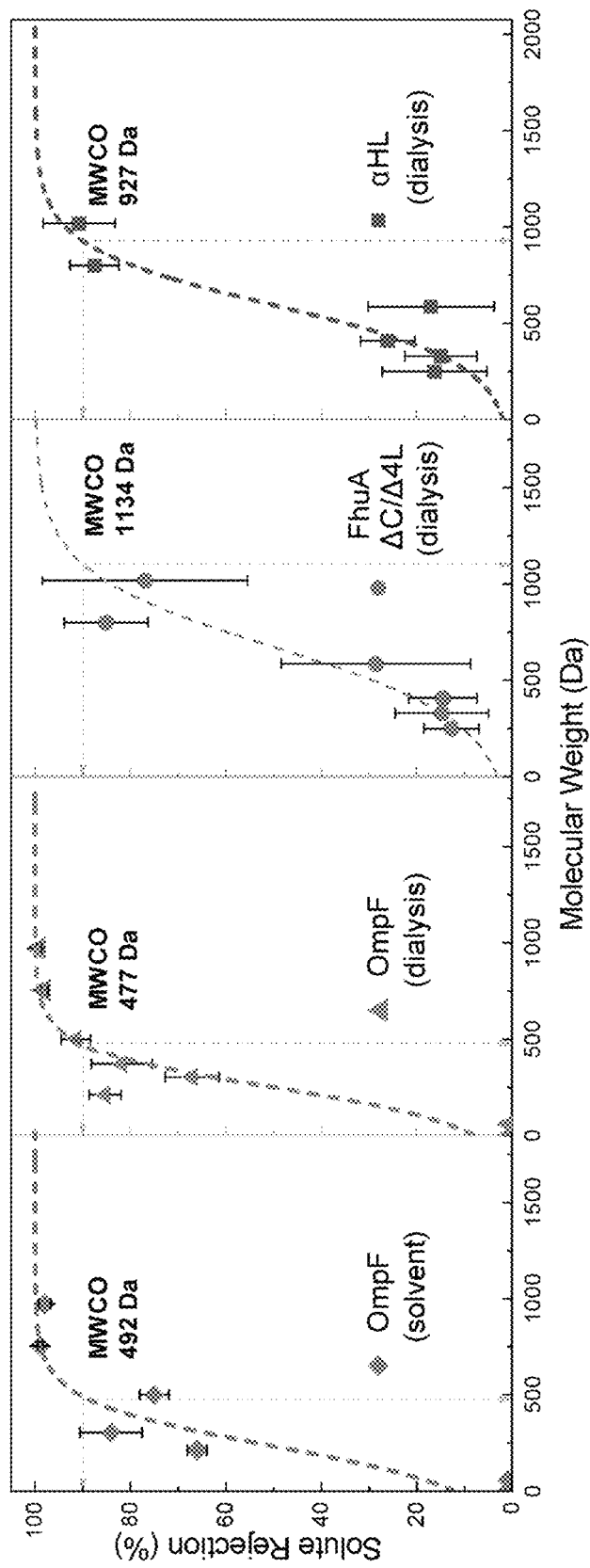
FIGS. 16A-C show three β-barrel channel protein-copolymer based scalable membranes demonstrate distinct molecular separations and enhanced pure water permeability compared with current commercial membranes.

Membrane performance was characterized by measuring water permeation rates and solute rejection for a series of small molecular weight dyes in a dead-end filtration setup. The three β-barrel channel protein-embedded membranes exhibited unique small molecule separation performance with high water permeation rates compared to current commercial membranes. The MWCOs of these membranes were characterized by reporting the MW of the solute that was rejected at 90% under standard operating conditions. The rejection properties of OmpF 2D nanosheet-embedded membranes reached the expected MWCO as more nanosheet layers were deposited (FIG. 15). Specifically, the MWCOs of membranes with 6-layers of nanosheets deposited were ~470 Da and ~500 Da for membranes with nanosheets prepared by the dialysis method and the solvent method, respectively. These values are close to the exclusion limit of native OmpF proteins of ~500-600 Da, determined using an in vitro vesicle reconstitution approach with radioactive hydrophilic solutes. These results demonstrate that OmpF 2D crystal-embedded selective layers were successfully fabricated on a porous PES support and maintained their expected transport performance. Additionally, the performances of the OmpF crystal-membranes formed with dialysis and solvent methods were nearly identical as discussed subsequently. The other two channel protein-based scalable membranes also manifest sharp and unique exclusion limits of ~920 Da and ~1100 Da for αHL (dialysis) and FhuA ΔC/Δ4L (dialysis) membranes, respectively (FIG. 16A). Membranes with 2D sheets created using the solvent method exhibit similar MWCOs. These molecular exclusion limits also confirm that channel proteins conserve their specific pore geometries in BCP membrane matrices with previously proposed MWCO of less than 2,000 Da for FhuA ΔC/Δ4L by poly(ethylene glycol)s (PEGs) partitioning and transport in a patch clamp set up as well as the region of 1,000 to 4,000 Da for αHL.

The small molecular weight dyes used for rejection tests are shown in Table 2. Note that the mass transfer coefficient (k) was determined from Colton-Smith empirical correlation and diffusivity (D) was calculated by the Stokes-Einstein equation. These values were used to correct apparent rejection based on the stagnant film model.

TABLE 2

| Dye | MW (Da) | k (m s$^{-1}$) | D (m$^2$ s$^{-1}$) |
| --- | --- | --- | --- |
| Chrysoidine G | 212.26 | $4.7 \times 10^{-5}$ | $6.2 \times 10^{-10}$ |
| Methyl orange | 304.02 | $4.3 \times 10^{-5}$ | $5.5 \times 10^{-10}$ |
| Crystal violet | 372.55 | $4.2 \times 10^{-5}$ | $5.2 \times 10^{-10}$ |
| Rhodamine B isothiocyanate | 500.63 | $3.9 \times 10^{-5}$ | $4.7 \times 10^{-10}$ |
| Acid fuchsin | 539.04 | $3.8 \times 10^{-5}$ | $4.6 \times 10^{-10}$ |
| Methyl blue | 753.84 | $3.5 \times 10^{-5}$ | $4.1 \times 10^{-10}$ |
| Rose bengal | 971.68 | $3.4 \times 10^{-5}$ | $3.8 \times 10^{-10}$ |
| Fluorescent dextran | 3000 | $2.6 \times 10^{-5}$ | $2.6 \times 10^{-10}$ |
| Blue dextran | 5000 | $2.3 \times 10^{-5}$ | $2.2 \times 10^{-10}$ |

Figure 16B:
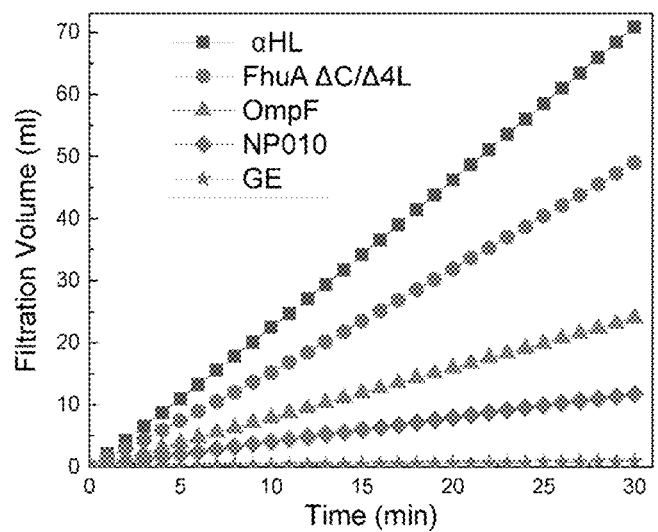
Figure 17A:
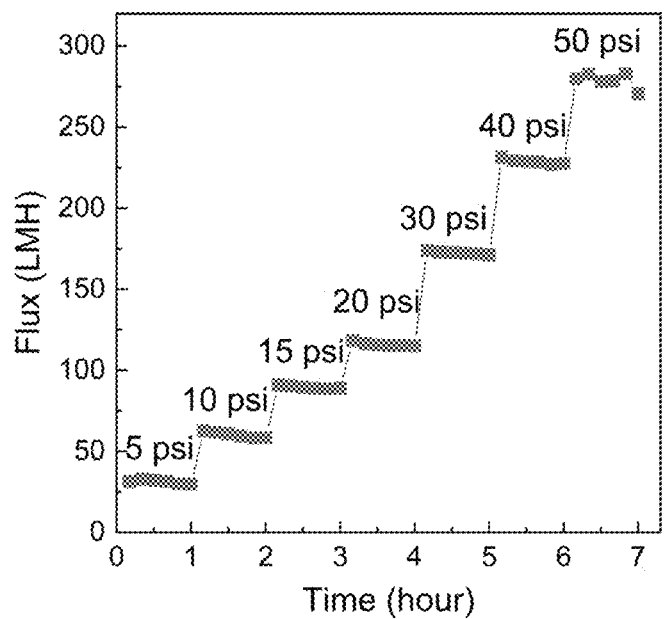
FIGS. 17A-B show the stability of one-layered OmpF 2D nanosheet on a PC substrate.
Figure 17B:
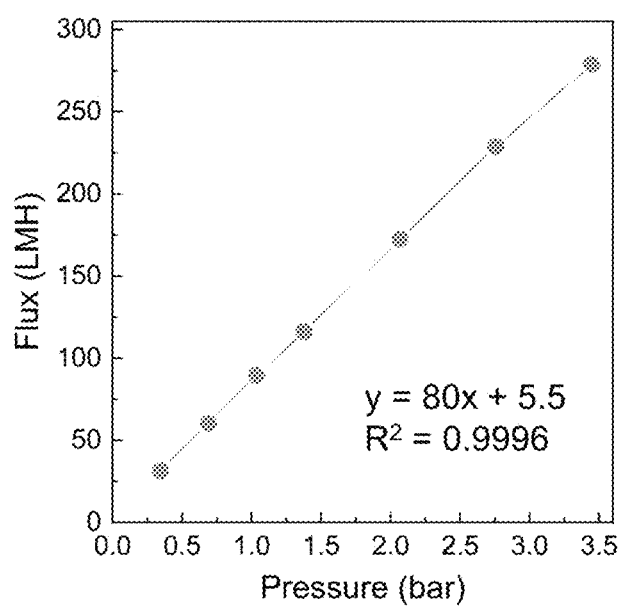
Figure 18A:
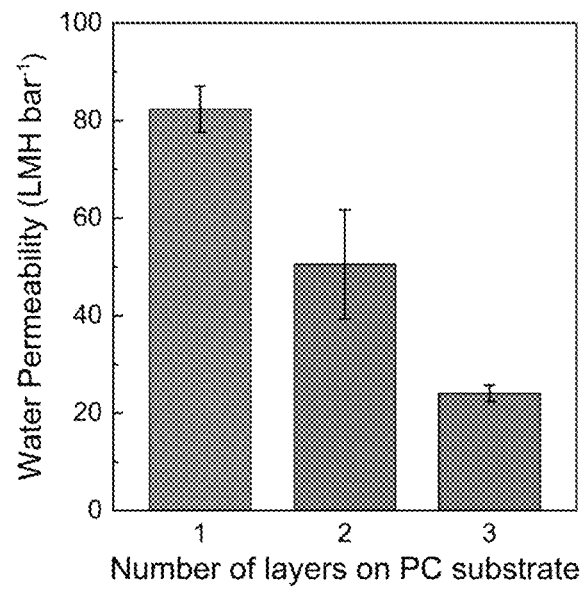
FIGS. 18A-B show the permeability gradually decreased with increasing cycles of depositions on substrates.
Figure 18B:
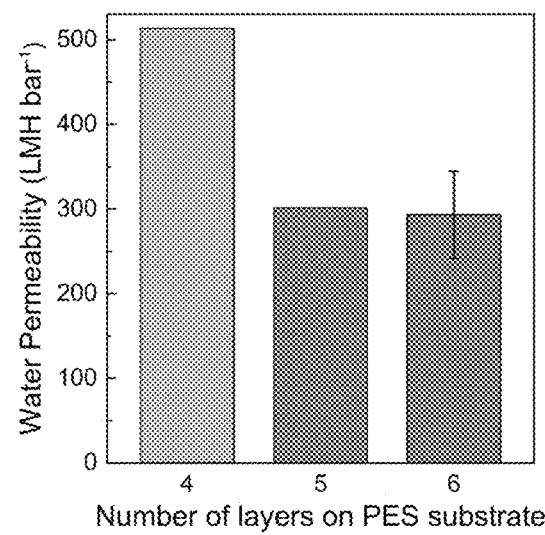

In addition to demonstrating tailored selectivity consistent with the channel protein pore size, the three channel protein-embedded membranes also demonstrated rapid and stable water permeation with applied pressure of 5 psi. Comparatively, commercial membranes with similar MWCOs of ~1,000 Da, NP010 (Microdyn Nadir™) and GE (Osmonics™ GE) had to be tested at an applied pressure of 50 psi to show appreciable flux (FIG. 16B). Data on stability and performance as the number of layers of crystal deposition was increased was also collected to decide on a 6-layer deposition (FIG. 17 and FIG. 18) and these membranes were found to be stable at 50 psi.

Figure 16C:
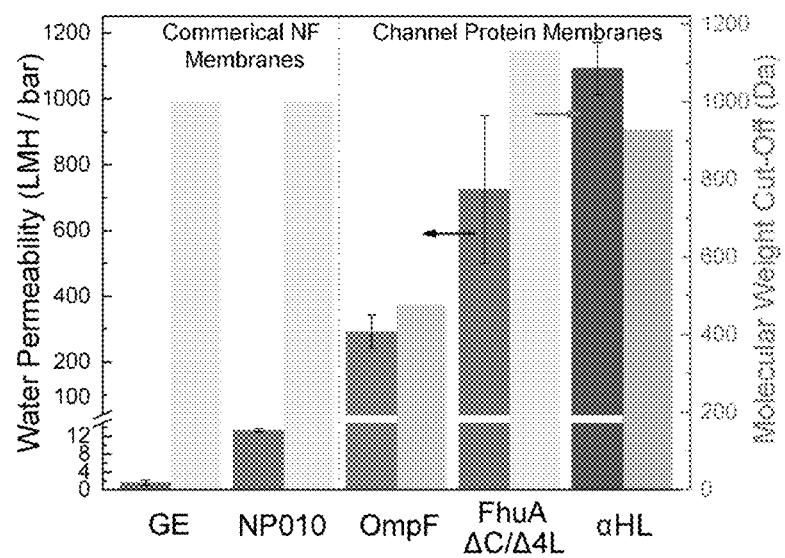

The water permeability of three β-barrel channel protein-embedded biomimetic membranes were ~293±51 LMH bar$^{-1}$ for OmpF (dialysis), 724.5±225.9 LMH bar$^{-1}$ for FhuA ΔC/Δ4L (dialysis), and 1,092±79.4 LMH bar$^{-1}$ for αHL (dialysis)-based scalable membranes (mean±s.d., n=3) (FIG. 16C). Membranes with 2D sheets created using the solvent method also demonstrated similar water permeabilities. These 6-layered protein composite membranes prepared using dialysis and solvent methods showed equivalent membrane performance in terms of separation properties (MWCO) and permeability indicating that the β-barrel pore structures and their function were preserved. These results recapitulate the advantages of solvent method over dialysis, especially from the perspective of process time and cost efficiency for membrane development.

The theoretical OmpF-membrane permeability was estimated at ~86.7 LMH bar$^{-1}$ based on OmpF single porin permeability, its channel packing density from hexagonal crystal structure, as well as PB-PEO block copolymer permeability. The remarkable agreement within a few folds between theoretical and experimental permeability, which were obtained from experiments spanning orders of magnitude length scales from the molecular scale to practice-relevant filtration scales, indicates successful integration of channel proteins into scalable membranes. The expected higher permeability of membranes constructed with the larger sized channels (FhuA and αHL) is also of the right scale when compared to the OmpF channels (their molecular permeability has not been characterized to the level that OmpF has been). The lower permeability for the higher pore size FhuA-based membrane compared to αHL may be a result of molecular interactions between water molecules and the pore wall which could have a higher impact than mere pore size at these nm length scales.

MP-based membranes exhibited orders of magnitude higher permeabilities relative to state-of-the-art polymeric NF membranes (FIG. 16C). For accurate comparison, two commercial membranes, NP010 and GE, which are rated to have MWCOs of ~1000 Da, were tested with the same experimental setup for their permeability values. Even though the commercial membranes had MWCO values similar to the value determined for the protein membranes, the water permeability of the control GE and NP010 membranes were 1.6±0.6 LMH bar$^{-1}$ and 13.2±0.5 LMH bar$^{-1}$, respectively compared to over ~300 LMH bar$^{-1}$ for all the MP-based membranes tested in this study.

Figure 19A:
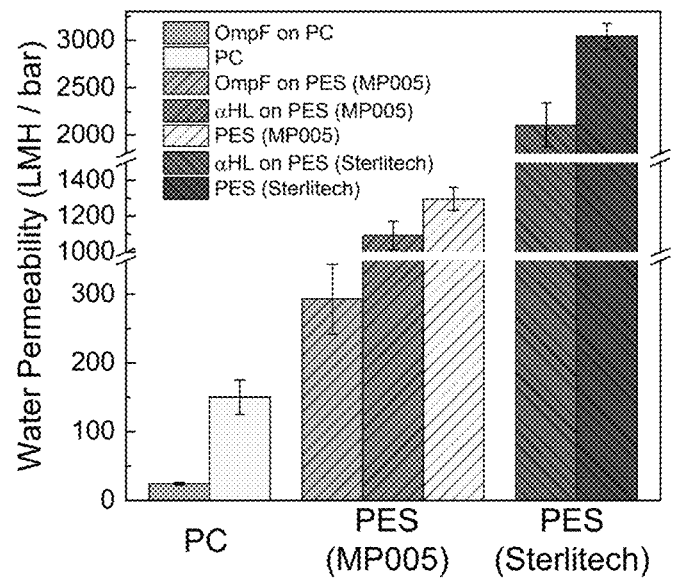
FIGS. 19A-B show l\H-based membranes demonstrated greater performance on a compatible substrate and maintained similar MWCOs.
Figure 19B:
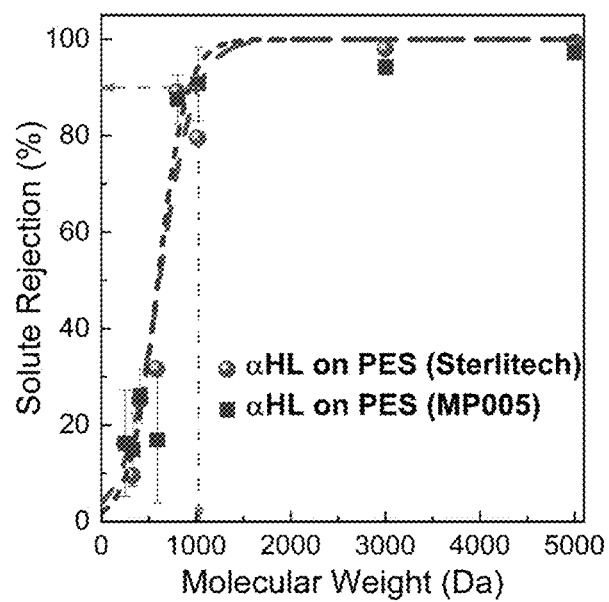

The extremely high permeability of the protein-based membranes led us to ask if the porous support membranes were well matched to our active filtration layer. There have been reports in literature indicating that the design of membrane support has a major impact on the performance of composite membranes. Most experiments in this work were conducted with a PES (MP005) support with a measured permeability of 1,296±64 LMH bar$^{-1}$. While this seems to be a reasonably high permeability for our OmpF composite membranes to be built on (with a permeability of ~300 LMH bar$^{-1}$), we suspected that this support might be limiting for the αHL nanosheets-embedded membranes (permeability of 1,092±79.4 LMH bar$^{-1}$). When αHL nanosheets were supported on a more permeable 0.03 µm PES support (3,039±136 LMH bar$^{-1}$, (Sterlitech Corp., WA), the composite membrane (designated αHL*) demonstrated an even higher water permeance of 2,107±235 LMH bar$^{-1}$, while maintaining a similar MWCO of 1,030 Da as that with the less permeable support. A similar trend in permeability was observed when OmpF crystals were supported on less permeable track etched polycarbonate (PC) support membranes compared to the PES (MP005) membranes (FIG. 19A). Thus, for these highly permeable selective layers derived from 2D MP nanosheets, support selection and design are of critical importance.

Figure 20:
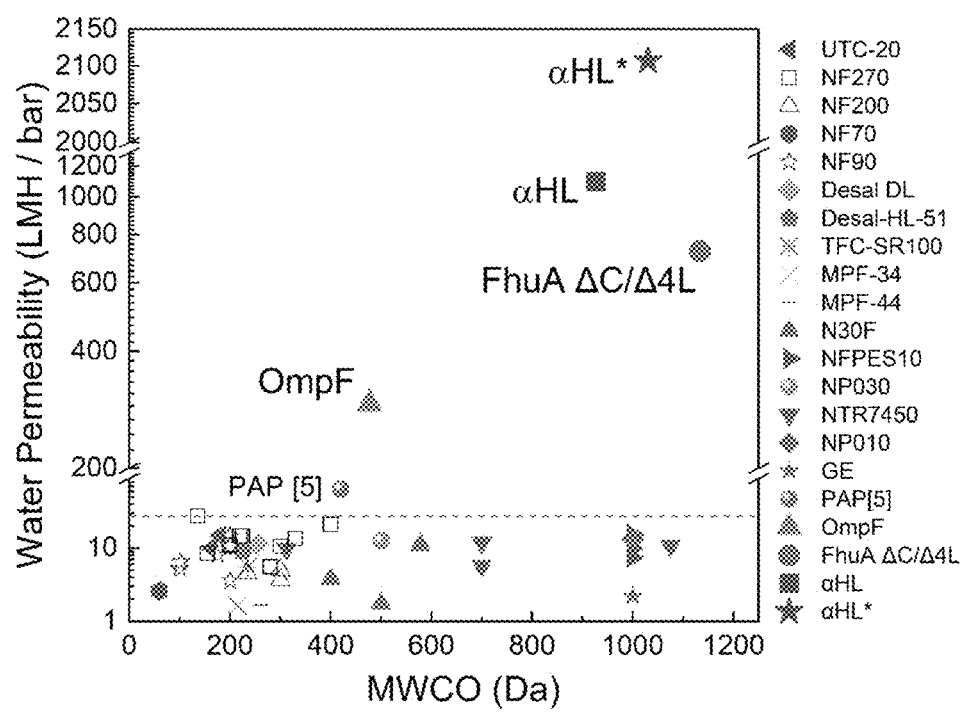
FIG. 20 shows a comparison of water permeability (LMH $bar^{-1}$) and MWCO (Da) of synthesized membranes with literature values on NF membranes reported in literature. The results clearly demonstrate that the β-barrel channel protein-based membranes have an order to almost three orders of magnitude higher permeability than commercial NF membranes with the MWCO ratings from 50 Da to 1,000 Da. αHL* represents composite membranes with αHL nanosheets supported on a highly permeable 0.03 μm PES support as compared to αHL indicating membranes supported on a lower permeability MP005 PES support used for all membranes. The dashed line (at a water permeability value of 27.5 LMH $bar^{-1}$) shows the upper limits of water permeability of current commercial membranes in the challenging sub nm to few nm separation range.

Extensive comparison of OmpF, αHL, and FhuA ΔC/Δ4L-based membranes to commercial membranes highlights significantly enhanced membrane performance of channel-based membranes (FIG. 20). MP channel-based membranes manifested ~20 to 1,000 folds enhanced water productivity over commercial membranes as a result of high pore packing densities of protein channels in the self-assembled 2D crystals and nanosheets. Specifically, the OmpF-membrane has ~25 times greater pure water permeability than the highest permeability commercial membrane, NP030 (water permeability of 14.1 LMH bar$^{-1}$ with MWCO of 500 Da) and ~100 times greater than N30F previously tested on the same experimental setup in our lab. In the separation range between 500 Da to 1,200 Da, αHL nanosheets supported on PES (Sterlitech Corp., WA) membrane demonstrates almost 1,000 fold water permeability of ~2000 LMH bar$^{-1}$ over the GE membrane (water permeability of 1.6±0.6 LMH bar$^{-1}$ with MWCO 1,000 Da).

Remarkably, OmpF-membranes show approximately an order of magnitude higher permeability than our recently reported artificial channel based membranes of a similar MWCO (PAP[5] membranes, MWCO ~500 Da). This corresponds to the tradeoff between expected two order higher single channel permeability of OmpF compared to PAP[5] channels and the one order lower effective cross sectional area of MPs compared to artificial channels. These two opposing trend correspond to the one order increase in permeability of OmpF membranes compared to PAP[5] membranes created using a similar approach.

2D crystallization of β-Barrel Protein Channels into BCPs

2D β-barrel MP-BCP nanosheets and crystals were produced using two self-assembly strategies: dialysis method and solvent method. For the dialysis method, purified MPs were mixed with PB-PEO micelles in 65 µL rehydration buffer (20 mM Hepes, 10 mM MgCl$_2$, 100 mM NaCl and 3 mM NaN$_3$, pH7.4) containing 4% (w/v) OG at PoPr (ranging from 0.17 to 0.6), with final protein concentration at 1 mg mL$^{-1}$. The MP/BCP mixture was transferred into 60 µL dialysis buttons (Hampton Research, CA) covered with a 12-14 kDa cut-off dialysis membrane. Detergents were slowly removed by doubling the crystallization buffer volume with detergent-free rehydration buffer twice a day. When the final OG concentration reached 0.25% (w/v), the crystallization buffer was replaced by detergent-free rehydration buffer three times to further remove the detergent.

For the solvent method, 130 µg purified MPs and BCPs were mixed to a 5 mL MeOH/CHCl$_3$ solvent mixture (50 mL, v/v) at different polymer to protein mass ratio (PoPr) (0.17-0.4). The solvent in the ternary mixture of protein/BCP/detergent was removed by rotary evaporation with 120 rpm for 1-2 h and optionally put into high vacuum chamber overnight to completely remove organic solvent. The resulting MP/BCP dry films were rehydrated in 400 µL rehydration buffer to assemble MP-BCP nanosheets and crystals.

Electron Microscopy and Image Processing

The morphologies of 2D nanosheets and crystals were characterized by negative-stain TEM. The 2D crystal and nanosheet suspensions were adsorbed on 400-mesh glow-discharged carbon-coated TEM grids (G400, Ted Pella Inc., CA) and negatively stained with 0.75% (w/v) uranyl formate. Images were obtained on the Tecnai G2 Spirit BioTwin microscope (FEI) and the Tecnai LaB6 Microscope (FEI) at an accelerating voltage of 200 kV. Images were taken at a magnification between 6,000× to 68,000× using an Eagle 4K×4K HS CCD (FEI) or Orius 2K×2K CCD camera (Gatan). Image processing including Fourier transforms were performed with the electron crystallography section of the Focus software.

To preserve the structures of protein nanosheet-embedded membranes, critical point drying (CPD) method was used to dehydrate biological molecules prior to examination by scanning electron microscopy (SEM) and cryogenic scanning electron microscopy (cryo-SEM). These membranes were dehydrated by a graded series of concentrations of ethanol (30%, 50%, 70%, 90% and 100%) at 10-min intervals. Solvent was completely removed by an automated critical point dryer (EM CPD 300, Leica). The dried membranes were solidified by immersing in liquid nitrogen and were cut with a razor blade to obtain the cross-section of membranes. Cryo-SEM images and conventional SEM images were acquired using the Sigma field emission scanning electron microscopy (Sigma FESEM, Zeiss) and Nova NanoSEM 630 (FEI) at an acceleration voltage of 3 to 5 kV, respectively.

Cross-sectional images of composite membranes were also performed by Scanning Tunneling Electron Microscopy (STEM). Membrane samples were embedded in Spurr's epoxy resin and cured overnight at 70° C. After polymerization, regions of interest were trimmed using a razor blade. Ultrathin sections (90 nm) were prepared using an EM UC6 (Leica) ultramicrotome at room temperature and transferred to Formvar-coated copper grids. All images and data were acquired using a Talos F200X (FEI) operating at 200 kV in scanning transmission electron microscopy (STEM) mode using the high-angle annular dark field (HAADF) detector. HAADF-STEM images were acquired using a spot size of 6, a camera length of 160 mm and a 2 µs dwell time. Energy dispersive X-ray spectroscopy (EDS) data were obtained using a SuperX EDS detector with a 5-min acquisition time.

Fabrication and Characterization of MP-BCP 2D Nanosheet-Embedded Composite Membranes The MP-BCP 2D nanosheets can be further fabricated as continuous selective layers using a modified layer-by-layer technique by pressure-drive lateral deposition as described in Example 1. We first functionalized BCPs with carboxylic acid groups so that these 2D nanosheets were negatively charged and could be furthered chemical crosslinking. The polycarbonate (PC) (Whatman® Nuclepore™, UK) and polyethersulfone (PES) (MP005, substrates were first functionalized by oxidation in UV/ozone cleaner (Ossila Ltd., UK) to ionize the surface as negatively charged and then assembled into a dead-end filtration setup (Model 8010, Millipore Corp., MA). A 1 mL positively charged, amine-enriched polyethyleneimine (PEI) solution (40 mM PEI, 35 mM CaCl$_2$) and 0.5 M NaCl, pH5.5) was deposited on the substrate through electrostatic interactions by incubation for 15 mins. The PEI solution was discarded after 15 mins and the substrate was rinsed with water. 20 µL 2D nanosheets solution after crystallization was diluted to 3 mL using the same buffer and then was added to the filtration setup. After stored for 15 min, the solution was filtered through the substrate with applied pressure of 5 psi. Since one cycle of PEI/2D nanosheet layer was not sufficient to cover the entire substrate surface, repeating 6 cycles of PEI/2D nanosheet was immobilized. After 6-layer deposition, the substrate was incubated with 10 mL, 1-ethyl-3-(3-dimethylaminopropyl) carbodiimide hydrochloride (EDC) and N-hydroxysuccinimide (NETS) mixture, concentration of 1 mg mL$^{-1}$. Eventually, the carboxylic group enriched 2D nanosheet and amine enriched PEI layer was chemically-crosslinked with each other to construct strong mechanical strength active layers on the substrate. Water flux was measured with applied pressure 5 psi or 50 psi for at least 60 mins. Solute rejection tests were performed by filtering a series of small molecular weight dyes (Table 2). Each dye was dissolved in water with a concentration of 35 µM and only fluorescent dextran was prepared as the concentration of 6.7 Dye solution was loaded to the 10 ml dead-end filtration setup with stirring rate of 300 rpm and tested separately. The feed and permeate were collected after 20 ml filtration where the dye concentration of permeate was constant. The concentration of different dye molecules was measured by a UV-Vis spectrophotometer.

Calculations of Predicted Membrane Permeability from Osmotic Permeability

The membrane permeability (ABCP) of the block copolymer membrane can be related to the osmotic water permeability ($P_f$)

$$A_{BCP} = \frac{P_f V_W}{RT}$$

where $V_W$ is the molar volume of water, R is the universal gas constant and T is the absolute temperature.

The packing density of unit cell is ~3.2×10$^4$ µm$^{-2}$, calculated based on the hexagonal lattice dimensions of a=b~18 nm in this work and p3 symmetry of crystal arrays[8]. OmpF crystals-BCPs membranes are fabricated onto the porous substrate with a 1 µm×1 µm membrane. The single channel permeability of OmpF in PC/PS lipids' is ~1×10$^{-12}$ cm$^3$·s$^{-1}$, assuming similar permeability in BCP membrane matrices. We also estimate the permeability of BCPs is ~40 µm·s$^{-1}$.

$$P_{OmpF\ channel\ membrane} = \frac{N_{channel} \times P_{channel} + (S_{membrane} - S_{channel}) \times P_{BCP}}{S_{membrane}} =$$

$$\frac{3.2 \times 10^4\ \mu m^{-2} \times 1 \times 10^{-12}\ cm^3 \cdot s^{-1} + 1\ \mu m^2 \times 0.4 \times 40\ \mu m \cdot s^{-1}}{1\ \mu m^2} =$$

$$32{,}016\ \mu m \cdot s^{-1}$$

$$A_{OmpF\ channel\ membrane} = 32{,}016\ \mu m \cdot s^{-1} \times$$

$$\frac{18\ cm^3 \cdot mol^{-1}}{83.1\ cm^3 \cdot bar \cdot mol^{-1} \times 288.15\ K} = 24.07\ \mu m \cdot s^{-1} \cdot bar^{-1}$$

$$A_{OmpF\ channel\ membrane} = 24.07\ \mu m \cdot s^{-1} \cdot bar^{-1} \times$$

$$\frac{1\ m/10^6\ \mu m}{1\ h/3{,}600\ s} \times \frac{L/0.001\ m^3}{1\ m^2} = 86.7\ LMH \cdot bar^{-1}$$

CONCLUSIONS AND OUTLOOK

In summary, pore-forming membrane protein channels, OmpF, αHL and FhuA ΔC/Δ4L, were successfully integrated into membranes at close to practice-relevant centimeter size scales, along with development of a preparation method to create highly packed channel-nanosheets using a rapid organic solvent-based technique. Resulting biomimetic membranes demonstrated one to three orders of magnitude higher water permeability than commercial nanofiltration membranes with similar separation ratings while maintaining their expected high small solute selectivity. This result implies that membrane performance could be precisely designed through functional channel modification and their integration into membranes. This approach of combining channel proteins and BCPs through scalable self-assembly and further development of the layer-by-layer MP membrane fabrication technique highlights the promise of developing MP-based biomimetic membranes for future applications where the exquisite specificity and functionality of channel proteins can provide effective small molecule separations.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A membrane composition comprising:
    a porous support having a plurality of pores, wherein the porous support has a negatively charged surface;
    one or more positively charged layers comprising a positively charged polymer; and
    one or more negatively charged layers comprising a nanosheet, wherein the nanosheet comprises a channel and a polymer functionalized with a negatively charged component.

2. The composition of claim 1, wherein the composition comprises sufficient positively charged layers and negatively charged layers to cover the pores.

3. The composition of claim 1, wherein the composition comprises three or more, four or more, five or more, or six or more positively charged layers and negatively charged layers.

4. The composition of claim 1, wherein the porous support is a polymeric substrate or an inorganic substrate.

5. The composition of claim 1, wherein the channel is a membrane protein or an artificial channel.

6. The composition of claim 1, wherein the negatively charged component comprises a deprotonated carboxylic acid.

7. The composition of claim 1, wherein the polymer functionalized with negatively charged component is an amphiphilic block copolymer.

8. The composition of claim 1, wherein the positively charged polymer comprises an amine group, an amide group, an imide group, an imine group, an azide group, a nitrate group, a nitrite group, a cyanate group, a nitrile group, or a combination thereof.

9. The composition of claim 6, wherein the deprotonated carboxylic acid is crosslinked to an amine group.

10. A separation device comprising the membrane composition of claim 1.

* * * * *